United States Patent
Iuchi et al.

(10) Patent No.: US 11,467,682 B2
(45) Date of Patent: *Oct. 11, 2022

(54) TOUCH DETECTION DEVICE, DISPLAY DEVICE WITH TOUCH DETECTION FUNCTION, AND CONTROL METHOD THEREOF

(71) Applicant: Japan Display Inc., Tokyo (JP)

(72) Inventors: Shinya Iuchi, Tokyo (JP); Masahiro Togashi, Tokyo (JP); Hayato Kurasawa, Tokyo (JP); Michio Yamamoto, Tokyo (JP); Tatsunori Nagai, Tokyo (JP)

(73) Assignee: Japan Display Inc., Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 17/002,081

(22) Filed: Aug. 25, 2020

(65) Prior Publication Data

US 2020/0393933 A1 Dec. 17, 2020

Related U.S. Application Data

(63) Continuation of application No. 15/432,257, filed on Feb. 14, 2017, now Pat. No. 10,788,932.

(30) Foreign Application Priority Data

Feb. 19, 2016 (JP) .................. 2016-029958

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G06F 3/0418* (2013.01); *G06F 3/0443* (2019.05); *G06F 3/0445* (2019.05); *G06F 3/0446* (2019.05); *G06F 3/0447* (2019.05); *G06F 3/04164* (2019.05); *G06F 3/04182* (2019.05);
(Continued)

(58) Field of Classification Search
None
See application file for complete search history.

(56) References Cited

U.S. PATENT DOCUMENTS

2014/0253518 A1* 9/2014 Takano ................ G06F 3/0443
345/178
2014/0285465 A1* 9/2014 Hayashi ............. G06F 3/04166
345/174

(Continued)

*Primary Examiner* — Fred Tzeng
(74) *Attorney, Agent, or Firm* — Michael Best & Friedrich LLP

(57) ABSTRACT

According to an aspect, a touch detection device includes: first detectors that output first signal values corresponding to contact of detection target objects with first regions; at least one second detector that outputs at least one second signal value corresponding to at least one first force applied by the detection target objects to press at least one second region corresponding to the first regions; and a controller that calculates at least one third signal value corresponding to at least one second force applied by at least one of the detection target objects to the at least one second region, based on the first signal values, the at least one second signal value, and at least one reference value corresponding to a third force per at least one of the first signal values.

5 Claims, 27 Drawing Sheets

(52) U.S. Cl.
CPC .... *G06F 3/04184* (2019.05); *G06F 3/041662* (2019.05); *G06F 2203/04101* (2013.01); *G06F 2203/04104* (2013.01); *G06F 2203/04105* (2013.01); *G06F 2203/04108* (2013.01)

(56) References Cited

U.S. PATENT DOCUMENTS

| | | | | |
|---|---|---|---|---|
| 2015/0212724 | A1* | 7/2015 | Manba | G06F 3/0484 |
| | | | | 715/794 |
| 2016/0195985 | A1* | 7/2016 | Shinya | G06F 3/0418 |
| | | | | 345/173 |
| 2016/0328597 | A1* | 11/2016 | Abiko | H04N 5/2257 |
| 2018/0028906 | A1* | 2/2018 | Tang | A63F 13/426 |

* cited by examiner

TOUCH DETECTION DEVICE, DISPLAY DEVICE WITH TOUCH DETECTION FUNCTION, AND CONTROL METHOD THEREOF

CROSS-REFERENCE TO RELATED APPLICATIONS

This application is a continuation of U.S. patent application Ser. No. 15/432,257, filed on Feb. 14, 2017. Further, this application claims priority from Japanese Application No. 2016-029958, filed on Feb. 19, 2016, the contents of which are incorporated by reference herein in its entirety.

BACKGROUND

1. Technical Field

The present invention relates to a touch detection device and a display device with a touch detection function that are capable of detecting an external proximate object, and to a control method thereof.

2. Description of the Related Art

In recent years, attention has been attracted to a touch detection device commonly called a touch panel that is capable of detecting an external proximate object. The touch panel is mounted on a display device, such as a liquid crystal display device, or as integrated with the display device, and is used as a display device with a touch detection function. The display device with a touch detection function displays, for example, various button images on the display device so as to allow information input using the touch panel as a substitute for typical mechanical buttons.

Japanese Patent Application Laid-open Publication No. 2015-041160 (JP-A-2015-041160) describes a touch panel that can detect a force in addition to a force applying position on an operation surface.

In the touch panel described in JP-A-2015-041160, a plurality of regions corresponding to respective third electrodes each serve as a unit region that can detect a pressing force. When a plurality of objects press one unit region, the touch panel described in JP-A-2015-041160 cannot detect, pressing forces of the respective objects.

For the foregoing reasons, there is a need for a touch detection device and a display device with a touch detection function that can calculate signal values corresponding to forces applied by a plurality of detection target objects to press an input surface, and a control method thereof.

SUMMARY

According to an aspect, a touch detection device includes: a plurality of first, detectors configured to output a plurality of first signal values corresponding to contact of a plurality of detection target objects with a plurality or first regions; at least one second detector configured to output at least one second signal value corresponding to at least one first force applied by the plurality of detection target objects to press at least one second region corresponding to the plurality of first regions; and a controller configured to calculate at least one third signal value corresponding to at least one second force applied by at least one of the plurality of detection target objects to the at least one second region, based on the plurality of first signal values, on the at least one second signal value, and on at least one reference value corresponding to a third force per at least one of the plurality of first signal values detected from at least one of the plurality of first regions.

According to another aspect, a display device with a touch detection function includes: a plurality of first detectors configured to output a plurality of signal values corresponding to contact of a plurality of detection target objects with a plurality of first regions; a display unit configured to display an image toward an input surface; at least one second detector configured to output at least one second signal value corresponding to at least one first force applied by the plurality of detection target objects to press at least one second region corresponding to the plurality or first regions; and a controller configured to calculate at least one third signal value corresponding to at least one second force applied by at least one of the plurality of detection target objects to the at least one second region, based on the plurality of first signal values, on the at least one second signal value, and on at least one reference value corresponding to a third force per at least one of the plurality of first signal values detected from at least one of the plurality of first regions.

According to another aspect, a control method includes, based on a plurality of first signal values output from a plurality of first detectors and corresponding to contact of a plurality of detection target objects with a plurality of first regions, on at least one second signal value output from at least one second detector and corresponding to at least one first, force applied by the plurality of detection target objects to press at least one second region corresponding to the plurality of first regions, and on at least one reference value corresponding to a third force per at least one of the plurality of first signal values detected from at least one of the plurality of first regions, calculating at least one third signal value corresponding to at least one second force applied by at least one of the plurality of detection target objects to the at least one second region.

BRIEF DESCRIPTION OF THE DRAWINGS

FIG. 2 is an explanatory diagram illustrating an example of a capacitance generated in a touch detection device;

FIG. 9 is a perspective view illustrating a configuration example of drive electrodes and touch detection electrodes of the display unit with a touch detection function;

FIG. 13 is a sectional view illustrating a structure example of the display device with a touch detection function;

FIG. 23 is a plan view illustrating another example of the force sensor;

DETAILED DESCRIPTION

Figure 1:
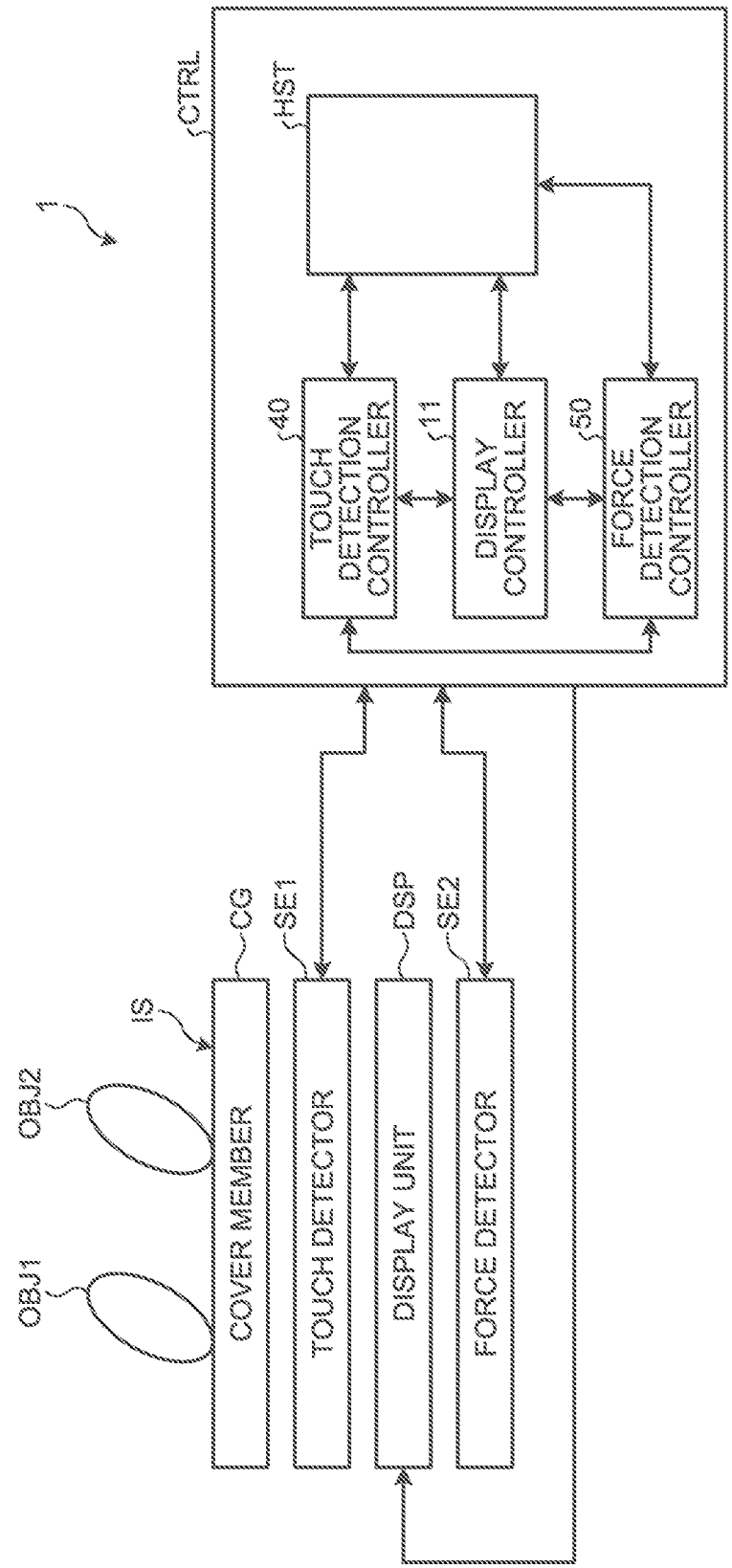
FIG. 1 is a block diagram illustrating a configuration of a display device with a touch detection function according to an embodiment of the present invention.

A mode (embodiment) for carrying out the present invention will be described in detail with reference to the drawings. The present invention is not limited to the description of the embodiment to be given below. Components to be described below include those easily conceivable by those skilled in the art, and those substantially the same. The components to be described below can also be combined as appropriate. The disclosure is merely an example, and the present invention naturally encompasses appropriate modifications maintaining the gist of the invention that is easily conceivable by those skilled in the art. To further clarify the description, widths, thicknesses, shapes, and the like of various parts may be schematically illustrated in the drawings as compared with actual aspects thereof. However, they are merely examples, and interpretation of the invention is not limited thereto. The same element as that illustrated in a drawing that has already been discussed is denoted by the same reference numeral through the description and the drawings, and detailed description thereof will, not be repeated in some cases where appropriate.

EMBODIMENT

FIG. 1 is a block diagram illustrating a configuration of a display device with a touch detection function according to an embodiment of the present invention.

The display device with a touch detection function 1 according to the present embodiment includes a touch detector SE1, a display unit DSP, a force detector SE2, and a controller CTRL. The touch detector SE1, the force detector SE2, and the controller CTRL in the display device with a touch detection function 1 constitute a touch detection device.

The touch detector SE1 detects contact or proximity of a plurality of detection target objects OBJ1 and OBJ2 with or to an input surface IS of a cover member CG.

Specifically, the touch detector SE1 outputs, to the controller CTRL, a signal value corresponding to the contact or proximity of the detection objects OBJ1 and OBJ2 with or to respective regions where the detection target objects OBJ1 and OBJ2 overlap the input surface IS in a direction orthogonal thereto. The touch detector SEX corresponds to a plurality of first detectors of the present invention.

Each of the detection target objects OBJ1 and OBJ2 may be a first type object that is deformed upon contact with the input surface IS, or may be a second type object that is not deformed, or is deformed by a relatively smaller amount than the first type object, upon contact with the input surface IS. Examples of the first type object include, but are not limited to, a finger. Examples of the second type object include, but are not limited to, a stylus pen made of a resin or a metal.

If the detection target object OBJ1 or OBJ2 is the first type object, the contact area between the detection target, object OBJ1 or OBJ2 and the input surface IS increases with increase in the force applied from the detection target object OBJ1 or OBJ2 to press the input surface IS.

If the detection target object OBJ1 or OBJ2 is the second type object, the contact area between the detection target object OBJ1 or OBJ2 and the input surface IS does not increase or increases by a relatively smaller amount than in the case of the first type object, with the increase in the force applied from the detection target object OBJ1 or OBJ2 to press the input surface IS.

The number of detection target objects detectable by the touch detector SE1 is not limited to two. The touch detector SE1 may be capable of detecting one or three or more detection target objects.

Examples of the touch detector SE1 include, but are not limited to, a sensor using a capacitance method and a sensor using a resistive film method. Examples of the capacitance method include a mutual capacitance method and a self-capacitance method.

The display unit DSP displays an image toward the input surface IS. Examples of the display unit DSP include, but are not limited to, a liquid crystal display device and an organic electroluminescent (EL) display device.

The touch detector SE1 and the display unit DSP may be integrated together into what is called an in-cell device. The touch detector SE1 and the display unit DSP may be what is called an on-cell device, in which the touch detector SE1 is mounted above the display unit DSP.

The force detector SE2 detects forces applied by the detection target objects OBJ1 and OBJ2 to press the input surface IS. Specifically, the force detector SE2 outputs, to the controller CTRL, signal values corresponding to the respective forces applied by the detection target objects OBJ1 and OBJ2 to press the input surface IS. The force detector SE2 corresponds to at least one second detector of the present invention.

Examples of the force detector SE2 include, but are not limited to, a sensor using a capacitance method, a strain gauge and an optical sensor.

The controller CTRL calculates at least one third signal value corresponding to at least one second force applied by at least one of the detection target objects OBJ1 and OBJ2 to press at least one second region, based on a plurality of first signal values corresponding to the contact of the detection target objects OBJ1 and OBJ2 with a plurality of first regions, at least one second signal value corresponding to at least one first force applied by the detection target objects OBJ1 and OBJ2 to press at least one second region corresponding to the first regions, and at least one reference value corresponding to a third force per at least one of the plurality of first signal values detected from at least one of the first regions.

The controller CTRL includes a display controller 11, a touch detection controller 40, a force detection controller 50, and a host HST.

Examples of the display controller 11 include an integrated circuit (IC) chip mounted on a glass substrate of the display unit DSP. Examples of the touch detection controller 40 include an IC chip mounted on a printed circuit board (such as a flexible printed circuit board) coupled to the glass substrate of the display unit DSP. Examples of the force detection controller 50 include an IC chip mounted on the glass substrate of the display unit DSP. Examples of the host HST include a central processing unit (CPU). The display controller 11, the touch detection controller 40, the force detection controller 50, and the host HST collaborate with one another to control the touch detector SE1, the display unit DSP, and the force detector SE2.

The processing performed by the controller CTRL to calculate the third signal value corresponding to the second force applied by at least one of the detection target objects OBJ1 and OBJ2 to press the at least one second region may be performed by the display controller 11 by the touch detection controller 40, by the force detection controller 50, by the host HST, or by two or more of the display controller 11, the touch detection controller 40, the force detection controller 50, and the host HST in a collaborating manner.

The following describes specific configuration examples of the touch detector SE1, the display unit DSP, and the force detector SE2. The configuration examples are merely examples, and do not limit the embodiment.

First Configuration Example of Touch Detector and Display Unit

Figure 2:
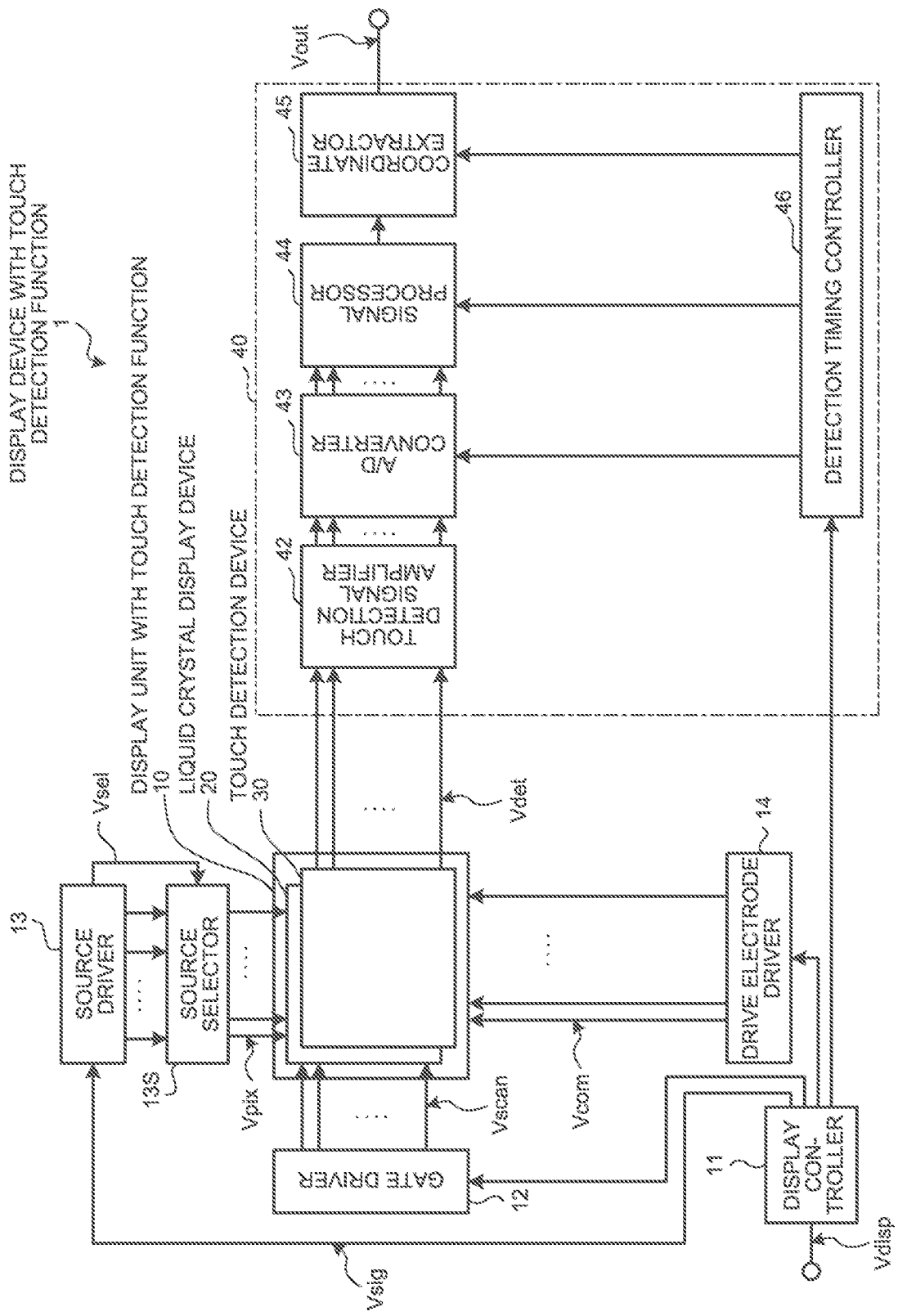
FIG. 2 is a block diagram illustrating a first configuration example of a touch detector and a display unit of the display device with a touch detection function.

FIG. 2 is a block diagram illustrating a first configuration example of the touch detector and the display unit of the display device with a touch detection function. The display device with a touch detection function 1 illustrated in FIG. 2 is a device that uses what is called the mutual capacitance method to detect coordinates and the contact area of each of the detection target objects OBJ1 and OBJ2.

The display device with a touch detection function 1 includes a display unit with a touch detection function 10, the display controller 11, a gate driver 12, a source driver 13, a source selector 13S, a drive electrode driver 14, and the touch detection controller 40.

The display unit with a touch detection function 10 is what is called an in-cell device in which a capacitive touch detection device 30 is built into and integrated with a liquid crystal display device 20 that uses liquid crystal display elements as display elements. The configuration in which the capacitive touch detection device 30 is built into and integrated with the liquid crystal display device 20 includes, for example, commonly using some members of substrates and electrodes that are used as the liquid crystal display device 20 and some members of substrates and electrodes that are used as the touch detection device 30.

The liquid crystal display device 20 corresponds to the display unit DSP of FIG. 1. The touch detection device 30 corresponds to the touch detector SE1 of FIG. 1.

The display unit with a touch detection function 10 may be what is called an on-cell display device in which the capacitive touch detection device 30 is mounted above the liquid crystal display device 20 that uses the liquid crystal display elements as the display elements. In the case of the on-cell display device, the touch detection device 30 may be provided directly on the liquid crystal display device 20, or may be provided not directly on but above the liquid crystal display device 20 with another layer interposed therebetween.

Although the present configuration example employs the liquid crystal display device 20 as the display unit DSP, the display unit DSP may have a configuration employing an organic EL element. In this case, one of the anode and the cathode of the organic EL element may serve as a drive electrode COML for touch detection (to be described later).

As will be described later, the liquid crystal display device 20 is a device that performs display by sequentially scanning one horizontal line according to a scan signal Vscan supplied from the gate driver 12.

The display controller 11 is a circuit that supplies a control signal to each of the gate driver 12, the source driver 13, the drive electrode driver 14, and the touch detection controller 40 based on an video signal Vdisp supplied from the host HST so as to control them to operate in synchronization with one another. The display controller 11 generates, from the video signal Vdisp for one horizontal line, an image signal Vsig obtained by time-division multiplexing the pixel signals Vpix of a plurality of sub-pixels SPix in the liquid crystal display device 20, and supplies the resultant to the source driver 13.

The controller CTRL in the present disclosure includes the display controller 11, the gate driver 12, the source driver 13 and the drive electrode driver 14.

The gate driver 12 has a function to sequentially select one horizontal line to be driven for display by the display unit with a touch detection function 10, based on the control signal supplied from the display controller 11.

The source driver 13 is a circuit that supplies the pixel signal Vpix to each pixel Pix (sub-pixel SPix) of the display unit with a touch detection function 10, based on the control signal supplied from the display controller 11. The source driver 13 is supplied with the image signal Vsig having, for example, 6 bits of red (R), green (G), or blue (B).

The source driver 13 receives the pixel signal Vsig from the display controller 11, and supplies the image signal Vsig to the source selector 13S. The source driver 13 generates a switch control signal Vsel required for separating the pixel signal Vpix multiplexed into the image signal Vsig, and supplies the switch control signal Vsel together with the pixel signal Vpix to the source selector 13S. The source selector 13S can reduce the number of wiring lines between the source driver 13 and the display controller 11. The source selector 13S may be omitted. The source driver 13 may be partially controlled by the display controller 11, or only the source selector 13S may be disposed.

The drive electrode driver 14 is a circuit that supplies a drive signal for touch detection (touch drive signal, but hereinafter called a drive signal) VcomAC and a display drive voltage VcomDC serving as a voltage for display to the drive electrode COML (to be described later) of the display unit with a touch detection function 10, based on the control signal supplied from the display controller 11.

The touch detection device 30 operates based on the basic principle of mutual capacitance touch detection, and outputs touch detection signals Vdet.

Figure 3:
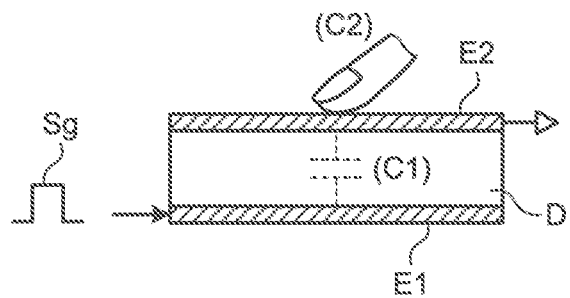
Figure 4:
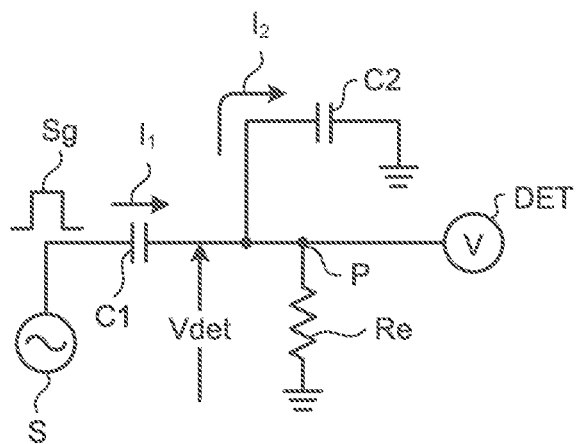
FIG. 4 is an explanatory diagram illustrating an exemplary equivalent circuit of the touch detection device.
Figure 5:
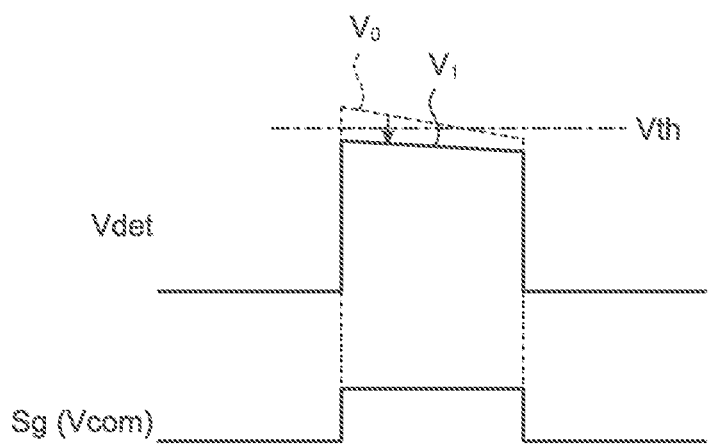
FIG. 5 is a diagram illustrating an example of waveforms of a drive signal and a touch detection signal.

The following describes the basic principle of the mutual capacitance touch detection performed by the display device with a touch detection function 1 of the present configuration example, with reference to FIGS. 3 to 5.

FIG. 3 is an explanatory diagram illustrating an example of a capacitance generated in the touch detection device. FIG. 4 is an explanatory diagram illustrating an exemplary equivalent circuit of the touch detection device. FIG. 5 is a diagram illustrating an example of waveforms of the drive signal and the touch detection signal. FIG. 4 illustrates also a detection circuit.

For example, as illustrated in FIG. 3, a capacitive element C1 includes a pair of electrodes, that is, a drive electrode E1 and a touch detection electrode E2 that are arranged facing each other with a dielectric material D interposed therebetween. As illustrated in FIG. 4, the capacitive element C1 is coupled, at one end thereof, to an alternating-current signal source (drive signal source) S, and coupled, at another end P thereof, to a voltage detector (touch detector) DET. The capacitive element C1 is, at the other end P, grounded through a resistor Re. The voltage detector DET is, for example, an integration circuit included in a touch detection signal amplifier 32 illustrated in FIG. 2.

When an alternating-current (AC) rectangular wave Sg having a predetermined frequency (such as roughly several kilohertz to several hundred kilohertz) is applied from the alternating-current signal source S to the drive electrode E1 (one end of the capacitive element C1), an output waveform (touch detection signal Vdet) appears through the voltage detector DET coupled to the touch detection electrode 32 side (the other end of the capacitive element C1). The AC rectangular wave Sg corresponds to the drive signal. VcomAC (to be described later).

In the state (non-contact state) where the finger is not in contact with (or in proximity to; the touch detection electrode, a current $I_0$ corresponding to the capacitance value of the capacitive element C1 flows in association with charge and discharge of the capacitive element C1. At this time, the potential waveform at the other end P of the capacitive element C1 is, for example, as illustrated by a waveform $V_0$ in FIG. 5, and the voltage detector DET illustrated in FIG. 4 detects the waveform $V_0$.

In the state (contact state) where the finger is in contact with (or in proximity to) the touch detection electrode, an electrostatic capacitance formed by the finger acts as if being added as a capacitive element C2 to the capacitive element C1. The capacitive element C2 is virtually added in series to the capacitive element C1, as illustrated by dotted lines in FIG. 3. In this state, currents $I_1$ and $I_2$ respectively flow through the capacitive elements C1 and C2 in association with charge and discharge of the capacitive elements C1 and C2.

At this time, the potential waveform at the other end of the capacitive element C1 is, for example, as illustrated by a waveform $V_1$ in FIG. 5, and the voltage detector DET detects the waveform $V_1$. At this time, the potential at the other end P is a divided potential determined by values of the currents $I_1$ and $I_2$ flowing through the capacitive elements C1 and C2, respectively. Due to this, the waveform $V_1$ has a smaller value than that of the waveform $V_0$ in the non-contact state.

The voltage detector DET compares a detected voltage with a predetermined threshold voltage Vth, end determines that the state is the non-contact state if the detected voltage is equal to or higher than the threshold voltage Vth, or determines that the state is the contact state if the detected voltage is lower than the threshold voltage Vth. The touch detection is enabled in this way.

The touch detection device 30 illustrated in FIG. 2 is configured to perform the touch detection by sequentially scanning one detection block according to a drive signal Vcom (drive signal VcomAC to be described later) supplied from the drive electrode driver 14.

The touch detection controller 40 is a circuit that detects whether the touch detection device 30 is touched (in the contact state described above), based on the control signal supplied from the display controller 11 and the touch detection signals Vdet supplied from the touch detection device 30 of the display unit with a touch detection function 10, and, when the touch detection device 30 is touched, obtains the coordinates and the contact, area of the touch in a touch detection region.

The touch detection controller 40 includes the touch detection signal amplifier 42, an analog-to-digital (A/D) converter 43, a signal processor 44, a coordinate extractor 45, and a detection timing controller 46.

The touch detection device 30 is configured to output the touch detection signals Vdet for each detection block from a plurality of touch detection electrodes TDL (to be described later) through the voltage detector DET illustrated in FIG. 4 to the touch detection signal amplifier 42 of the touch detection controller 40.

The touch detection signal amplifier 42 amplifies the touch detection signals Vdet supplied from the touch detection device 30. The touch detection signal amplified by the touch detection signal amplifier 42 is supplied to the A/D converter 43. The touch detection signal amplifier 42 may include a low-pass analog filter that removes high-frequency components (noise components) included in the touch detection signals Vdet to extract touch components, and outputs the respective touch components. The touch detection controller 40 may not include the touch detection signal amplifier 42. That is, the touch detection signals Vdet from the touch detection device 30 may be supplied to the A/D converter 43.

The A/D converter 43 is a circuit that samples analog signals output from the touch detection signal amplifier 42 at timing in synchronization with the drive signal VcomAC, and converts the sampled analog signals into digital signals.

The signal processor 44 includes a digital filter that reduces frequency components (noise components) included in the output signals of the A/D converter 43 other than those of the frequency at which the drive signal VcomAC is sampled.

The signal processor 44 is a logic circuit, that detects, based on the output signals of the A/D converter 43, whether the touch detection device 30 is touched. The signal processor 44 performs processing to extract only a signal of difference caused by the finger. This signal of difference caused by the finger corresponds to an absolute value |ΔV| of the difference between the waveform V0 and the waveform V1 described above.

The signal processor 44 may perform a calculation of averaging the absolute values |ΔV| for one detection block to obtain the average value of the absolute values |ΔV|. This calculation allows the signal processor 44 to reduce the influence of the noise.

The signal processor 44 compares the detected signal of difference caused by the finger with the predetermined threshold voltage Vth, and, if the detected signal of difference is equal to or higher than the threshold voltage Vth, determines that the state is the non-contact state of the external proximate object.

The signal processor 44 compares the detected signal of difference with the predetermined threshold voltage Vth, and, if the detected signal of difference is lower than the threshold voltage Vth, determines that the state is the contact state of the external proximate object. The touch detection controller 40 can perform the touch detection in this manner.

The coordinate extractor 45 is a logic circuit, that obtains touch panel coordinates of a touch when the touch is detected by the signal processor 44. The detection timing controller 46 controls the A/D converter 43, the signal processor 44, and the coordinate extractor 45 so as to operate them in synchronization with one another. The coordinate extractor 45 outputs the touch panel coordinates as a signal output Vout.

Figure 6:
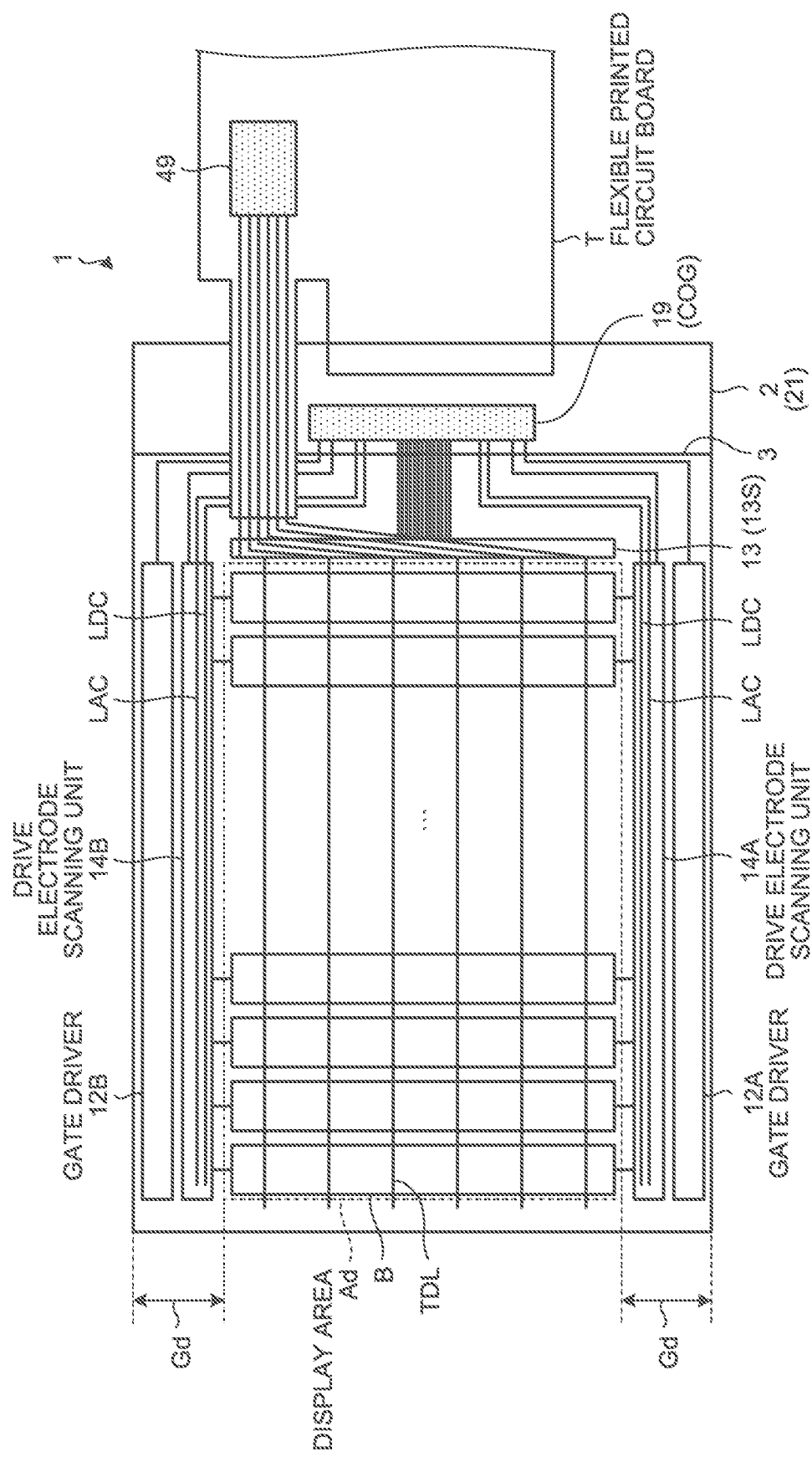
FIG. 6 is a diagram illustrating an exemplary module on which the display device with a touch detection function is mounted.

FIG. 6 is a diagram illustrating an exemplary module on which the display device with a touch detection function is mounted. The display device with a touch detection function 1 includes a first substrate (such as a pixel substrate 2) and a printed circuit board (such as a flexible printed circuit board) T.

The pixel substrate 2 includes a first insulating substrate (such as a thin-film transistor (TFT) substrate 21). The TFT substrate 21 is, for example, a glass substrate or a film substrate. A driver IC chip (such as a chip on glass (COG) 19) is mounted on the TFT substrate 21. A display area Ad and a frame Gd of the liquid crystal display device 20 are formed on the pixel substrate 2 (TFT substrate 21).

The COG 19 is an IC chip serving as a driver mounted on the TFT substrate 21, and is a control device incorporating circuits required for display operations, such as the display controller 11 illustrated in FIG. 2.

In the present configuration example, the source driver 13 and the source selector 13S are formed on the TFT substrate 21. The source driver 13 and the source selector 13S may be built into the COG 19.

Drive electrode scanning units 14A and 14B, which are components of the drive electrode driver 14, are formed on the TFT substrate 21.

The gate driver 12 is formed as gate drivers 12A and 12B on the TFT substrate 21.

The COG 19 of the display device with a touch detection function 1 may incorporate circuits, such as the drive electrode scanning units 14A and 14B and the gate driver 12. The COG 19 is merely an exemplary configuration in which various circuits are mounted, and the present embodiment is not limited to thereto. For example, a configuration having the same function as that of the COG 19 may be implemented as a chip on film, or chip on flexible (COF) on the flexible printed circuit board T.

As illustrated in FIG. 6, drive electrode blocks B of the drive electrodes COML and the touch detection electrodes TDL are formed so as to three-dimensionally intersect each other in a direction orthogonal to a surface of the TFT substrate 21.

The drive electrodes COML are divided into a plurality of stripe-like electrode patterns extending in one direction. When the touch detection operation is performed, the drive electrode driver 14 sequentially supplies the drive signal VcomAC to each of the electrode patterns. Each of the stripe-like electrode patterns of the drive electrodes COML that are simultaneously supplied with the drive signal VcomAC corresponds to each of the drive electrode blocks B illustrated in FIG. 6.

The drive electrode blocks B (drive electrodes COML) are formed in a direction parallel to short sides of the display unit with a touch detection function 10. The touch detection electrodes TDL (to be described later) are formed in a direction intersecting the extending direction of the drive electrode blocks B, such as in a direction parallel to long sides of the display unit with a touch detection function 10.

The touch detection electrodes TDL are coupled to a touch IC 49 that is mounted on the flexible printed circuit board T coupled to a short side of the display unit with a touch detection function 10. The touch IC 49 is an IC chip serving as a driver mounted on the flexible printed circuit board T, and is a control device incorporating circuits required for the touch detection operation, such as the touch detection controller 40 illustrated in FIG. 2. In this manner, the touch IC 49 is mounted on the flexible printed circuit board T, and is coupled to the respective touch detection electrodes TDL arranged in parallel. The flexible printed circuit board T only needs to be a terminal, and is not limited to a board. In this case, the touch IC 49 is provided outside the module. The touch IC 49 is not limited to the case of being disposed on the flexible printed circuit board T, but may be disposed on the TFT substrate 21 or a second insulating substrate 31.

In the present configuration example, the touch IC 49 is a control device serving as the touch detection controller 40. However, some of the functions of the touch detection controller 40 may be provided as functions of another microprocessor unit (MPU).

Specifically, a circuit, such as the MPU, provided separately from the 1C chip serving as the touch driver may perform some functions (such as donoising; among various functions, such as the A/D conversion and the denoising that can be provided as functions of the IC chip serving as the touch driver. If the IC chip serving as the driver is configured as one chip (single-chip configuration), the detection signals may be transmitted, for example, to the IC chip serving as the touch driver on an array substrate through wiring of, for example, the flexible printed circuit board T.

The source selector 13S is formed using TFT elements near the display area Ad on the TFT substrate 21. A larger number of pixels Pix (to be described later) are arranged in a matrix in the display area Ad. The frame Gd is an area in which the pixels Pix are not disposed on the surface of the TFT substrate 21 when viewed from a direction orthogonal thereto. The gate driver 12 and the drive electrode scanning units 14A and 14B of the drive electrode driver 14 are disposed in the frame Gd.

The gate driver 12 includes, for example, the gate drivers 12A and 12B, which are formed using TFT elements on the TFT substrate 21. The gate drivers 12A and 12B are disposed to sandwich the display area Ad in which the sub-pixels SPix (pixels) (to be described later) are arranged in a matrix, and thus can perform driving from both sides of the display area Ad. Scanning lines are arranged between the gate drivers 12A and 12B. As a result, the scanning lines are arranged so as to extend in parallel with the extending direction of the drive electrodes COML in the direction orthogonal to the surface of the TFT substrate 21.

In the present configuration example, the two circuits, that is, the gate drivers 12A and 12B are provided as the gate driver 12. This is, however, merely an exemplary specific configuration of the gate driver 12. The specific configuration thereof is not limited to this example. The gate driver 12 may be, for example, one circuit provided on only one end side of the scanning lines.

The drive electrode driver 14 includes, for example, the drive electrode scanning units 14A and 143, which are formed using TFT elements on the TFT substrate 21. The drive electrode scanning units 14A and 14B are supplied, from the COG 19, with the display drive voltage VcomDC through display wiring LDC, and with the drive signals VcomAC through touch wiring LAC.

The drive electrode scanning units 14A and 14B are configured to be capable of driving the respective drive electrode blocks B arranged in parallel from both sides thereof. The display wiring LDC for supplying the display drive voltage VcomDC and the touch wiring LAC for supplying the touch drive signals VcomAC are arranged in parallel with each other in the frame Gd, Gd. The display wiring LDC is arranged closer to the display area Ad than the touch wiring LAC.

With this structure, the display drive voltage VcomDC supplied through the display wiring LDC stabilizes potential states at ends of the display area Ad. This stabilizes the display of, in particular, a liquid crystal display device using liquid crystals of a horizontal electric field mode.

In the present configuration example, the two circuit, that is, the drive electrode scanning units 14A and 14B are provided as the drive electrode driver 14. This is, however, merely an exemplary specific configuration of the drive electrode driver 14. The specific configuration thereof is not limited to this example. The drive electrode driver 14 may be, for example, one circuit provided on only one end side of the drive electrode blocks B.

The display device with a touch detection function 1 outputs the touch detection signals Vdet from the short side of the display unit with a touch detection function 10. This facilitates routing of wiring in the display device with a touch detection function 1, when the display unit with a touch detection function 10 is coupled to the touch detection controller 40 through the flexible printed circuit board T serving as a terminal unit.

Figure 7:
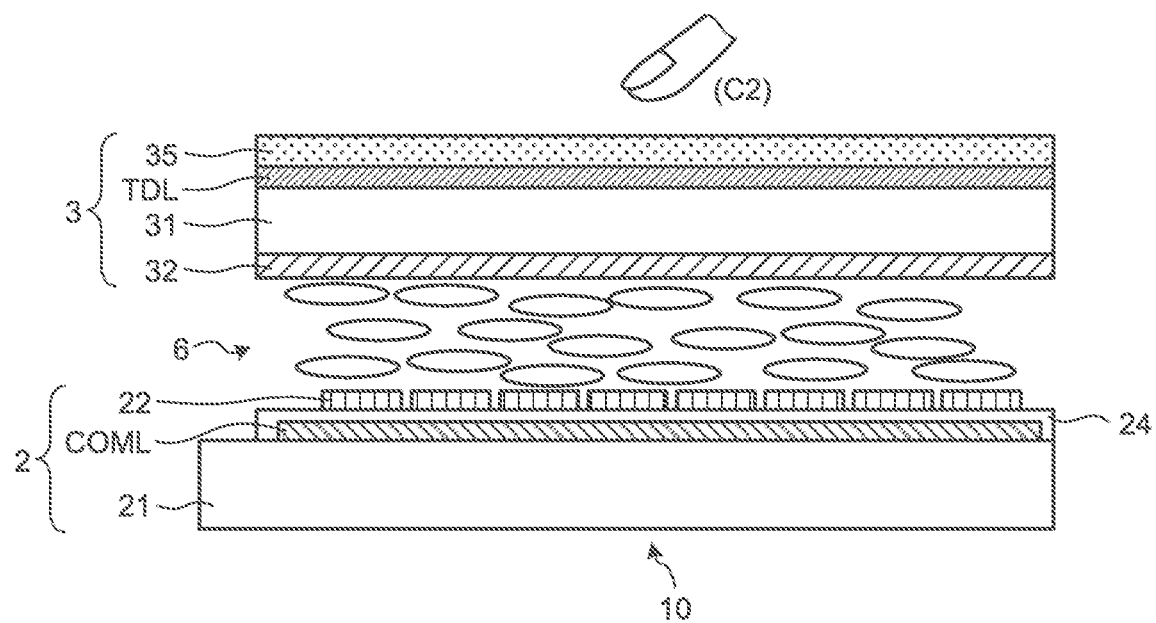
FIG. 7 is a sectional view illustrating a schematic sectional structure of a display unit with a touch detection function.
Figure 8:
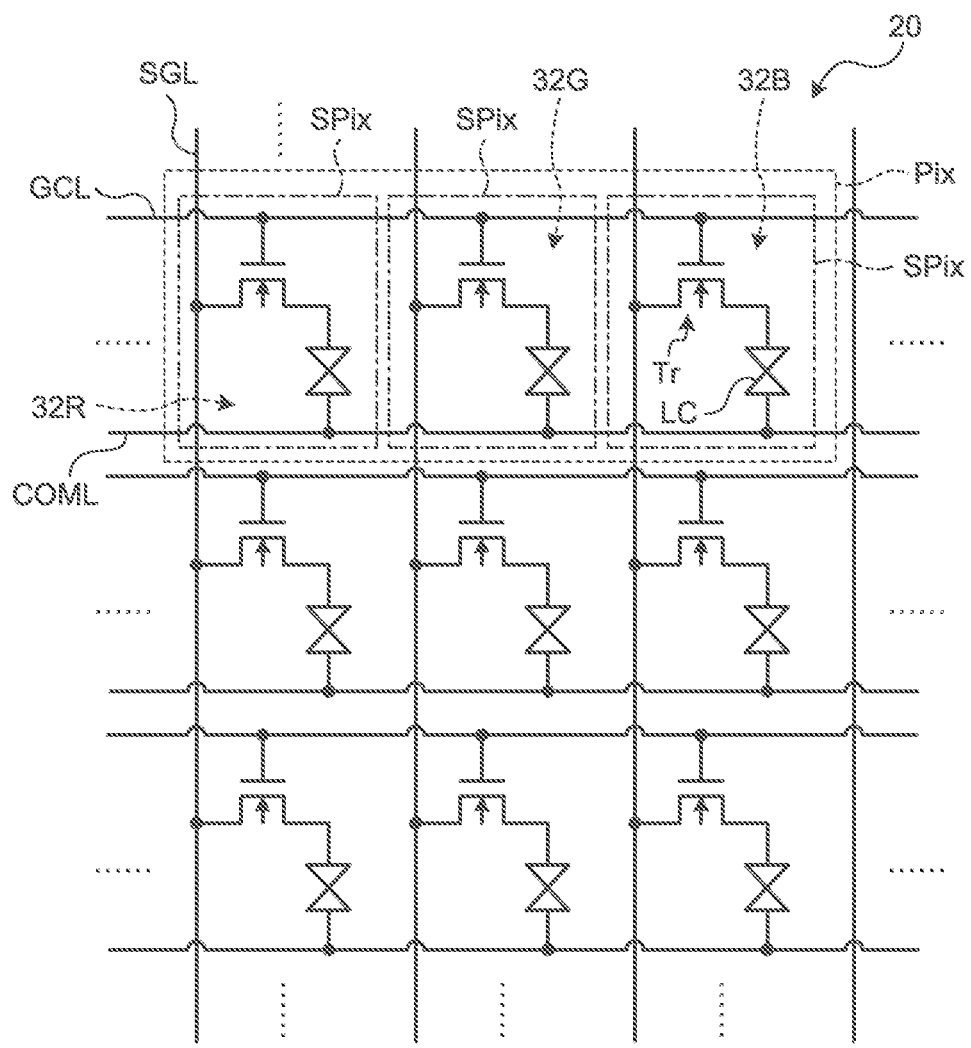
Figure 9:
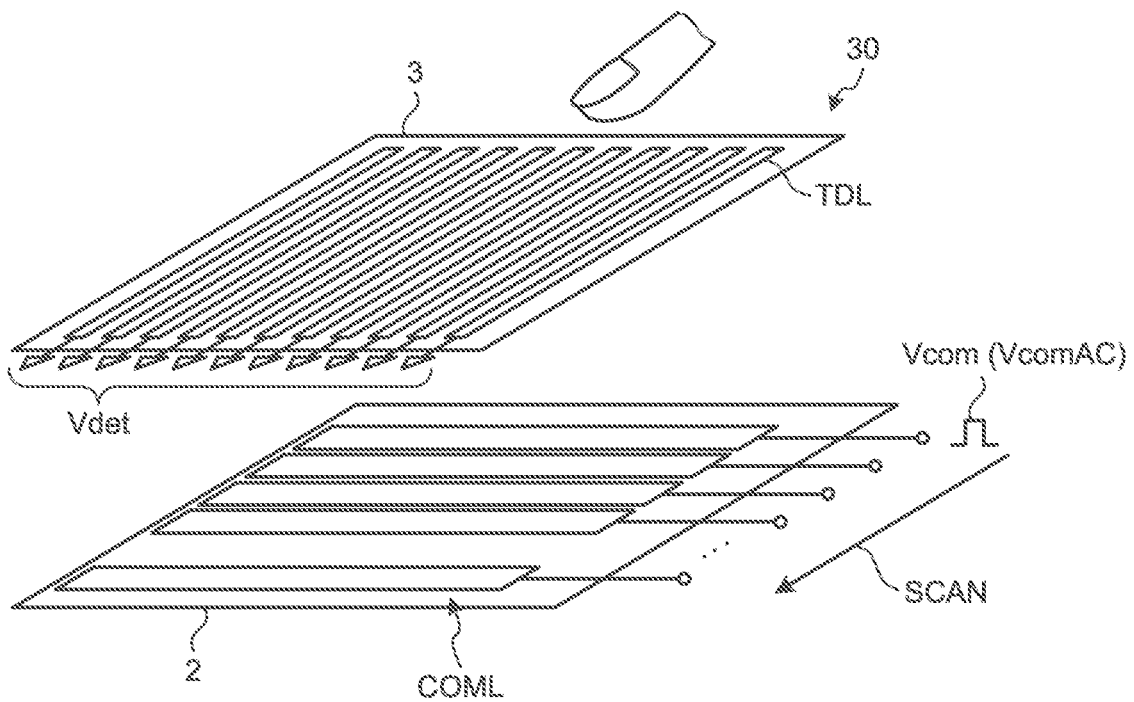
FIG. 9 is a circuit diagram illustrating a pixel arrangement of the display unit with a touch detection function.

FIG. 7 is a sectional view illustrating a schematic sectional structure of the display unit with a touch detection function. FIG. 8 is a circuit diagram illustrating a pixel arrangement of the display unit with a touch detection function. The display unit with a touch detection function 10 includes the pixel substrate 2, a second substrate (such as a counter substrate 3) that is disposed so as to face a surface of the pixel substrate 2 in a direction orthogonal thereto, and a display functional layer (such as a liquid crystal layer 6; that is interposed between the pixel substrate 2 and the counter substrate 3.

The pixel substrate 2 includes the TFT substrate 21 serving as a circuit substrate, a plurality of pixel electrodes 22 that, are arranged in a matrix on the TFT substrate 21, the drive electrodes COML that are formed between the TFT substrate 21 and the pixel electrodes 22, and an insulating layer 24 that insulates the pixel electrodes 22 from the drive electrodes COML.

As illustrated in FIG. 8, thin-film transistor (TFT) elements Tr of the respective sub-pixels SPix and wiring, such as pixel signal lines SGL that supply the pixel signals Vpix to the respective pixel electrodes 22 illustrated in FIG. 7 and scan signal lines GCL that drive the respective TFT elements Tr, are formed on the TFT substrate 21. The pixel signal lines SGL extend in a plane parallel to the surface of the TFT substrate 21, and supply the pixel signals Vpix for displaying an image to the sub-pixels SPix. The sub-pixel SPix represents a constitutional unit controlled by the pixel signal Vpix. The sub-pixel SPix also represents a constitutional unit that is surrounded by the pixel signal line SGL and the scan signal line GCL and that is controlled by the TFT element Tr.

As illustrated in FIG. 8, the liquid crystal display device 20 includes the sub-pixels SPix that are arranged in a matrix. The sub-pixel SPix includes the TFT element Tr and a liquid crystal element LC. Each TFT element Tr is constituted by a thin-film transistor, and in this example, is constituted by an n-channel metal oxide semiconductor (MOS) TFT.

One of the source and the drain of the TFT element is coupled to the pixel signal line SGL, the gate thereof is coupled to the scan signal line GCL, and the other of the source and the drain thereof is coupled to one end of the liquid crystal element LC. The liquid crystal element LC is coupled, for example, at one end thereof to the drain of the TFT element Tr, and at the other end thereof to the drive electrode COML. In FIG. 7, the drive electrodes COML, the insulating layer 24, and the pixel electrodes 22 are sequentially stacked in this order on the TFT substrate 21. The order of stacking is, however, not limited to this example. The order of stacking on the TFT substrate 21 may be the pixel electrodes 22, the insulating layer 24, and the drive electrodes COML, or the drive electrodes COML and the pixel electrodes 22 may be formed in the same layer with the insulating layer 24 interposed therebetween.

The sub-pixel SPix is mutually coupled through the scan signal line GCL with other sub-pixels SPix belonging to the same row of the liquid crystal display device 20. The scan signal line GCL is coupled to the gate driver 12, and is supplied with the scan signal Vscan from the gate driver 12.

The sub-pixel SPix is mutually coupled through the pixel signal line SGL with other sub-pixels SPix belonging to the same column of the liquid crystal display device 20. The pixel signal line SGL is coupled to the source driver 13, and is supplied with the pixel signal Vpix from the source driver 13.

The sub-pixel SPix is further mutually coupled through the drive electrode COML with other sub-pixels SPix belonging to the same row of the liquid crystal display device 20. The drive electrode COML is coupled to the drive electrode driver 14, and is supplied with the drive signal Vcom from the drive electrode driver 14. This means that the sub-pixels SPix belonging to the same one of the rows share one of the drive electrodes COML in this example.

The drive electrodes COML of the present configuration example extend in parallel with the extending direction of the scan signal lines GCL. The extending direction of the drive electrodes COML is not limited to this direction, but may be, for example, a direction parallel to the extending direction of the pixel signal lines SGL. The extending direction of the touch detection electrodes TDL is not limited to the extending direction of the pixel signal lines SGL, but may be, for example, a direction parallel to the extending direction of the scan signal lines GCL.

The gate driver 12 illustrated in FIG. 2 applies the scan signal Vscan to the gates of the TFT elements Tr of the pixels Pix through the scan signal line GCL illustrated in FIG. 8 so as to sequentially select, as a target of display driving, one row (one horizontal line) of the sub-pixels SPix that are formed in a matrix on the liquid crystal display device 20.

The source driver 13 illustrated in FIG. 2 supplies the pixel signals Vpix to the respective sub-pixels SPix constituting the horizontal line sequentially selected by the gate driver 12 through the pixel signal lines SGL illustrated in FIG. 8. The sub-pixels SPix are configured to display the horizontal line according to the pixel signals Vpix thus supplied.

The drive electrode driver 14 illustrated in FIG. 2 applies the drive signals Vcom to drive the drive electrodes COML on a block-by-block basis, each block being constituted by a predetermined number of drive electrodes COML.

As described above, the gate driver 12 performs driving so as to line-sequentially scan the scan signal lines GCL in a time-division manner, and thus sequentially selects one horizontal line of the liquid crystal display device 20. The source driver 13 supplies the pixel signals Vpix to the sub-pixels SPix belonging to the horizontal line, and thus, the liquid crystal display device 20 performs display for each horizontal line. The drive electrode driver 14 is configured to apply the drive signals Vcom to the blocks including the drive electrodes COIL corresponding to the horizontal line while this display operation is performed.

The liquid crystal layer 6 modulates light passing through electric fields according to the states thereof. When the drive electrodes COML are driven, voltages corresponding to the pixel signals Vpix supplied to the pixel electrodes 22 are applied to the liquid crystal layer 6 and generate the electric fields. As a result, liquid crystals constituting the liquid crystal layer 6 are oriented according to the electric fields, and modulate the light passing through the liquid crystal layer 6.

In this manner, the pixel electrodes 22 and the drive electrodes COML serve as first electrodes and second electrodes that generate the electric fields in the liquid crystal layer 6. That is, the liquid crystal display device 20 serves as the display unit DSP that changes the content of display output according to electric charges applied to the first electrodes and the second electrodes. Although the following description assumes that the pixel electrodes 22 correspond to the first electrodes, and the drive electrodes COML correspond to the second electrodes, these correspondence relations may be reversed. One pixel electrode 22 is arranged at least for each pixel Pix or for each sub-pixel SPix. One drive electrode COML is arranged at least for a plurality of pixels Pix or for a plurality of sub-pixels SPix.

In the present configuration example, a liquid crystal display device using, for example, liquid crystals of the horizontal electric field mode, such as an in-plane switching (IPS) mode including a fringe field switching (FFS) mode, is used as the liquid crystal display device 20. Orientation films may be provided between the liquid crystal layer 6 and the pixel substrate 2 and between the liquid crystal layer 6 and the counter substrate 3, which are illustrated in FIG. 7.

The liquid crystal display device 20 has a configuration according to the horizontal electric field mode, but may have a configuration according to another display mode. For example, the liquid crystal display device 20 may have a configuration according to a mode using a vertical electric field mainly generated between main surfaces of substrates, such as a twisted nematic (TN) mode, an optically compensated bend (OCB) mode, and a vertical aligned (VA) mode. In a display mode using the vertical electric field, for example, a configuration including the pixel electrodes 22 on the pixel substrate 2 and the drive electrodes COML on the counter substrate 3 is applicable.

The counter substrate 3 includes the second insulating substrate 31 and a color filter 32 formed on one surface of the second insulating substrate 31. The other surface of the second insulating substrate 31 is provided with the touch detection electrodes TDL serving as detection electrodes of the touch detection device 30. Furthermore, a polarizing plate 35 is provided on the touch detection electrodes TDL.

The method for mounting the color filter 32 may be what is called a color filter on array (COA) method of forming the color filter 32 on the pixel substrate 2 serving as an array substrate.

In the color filter 32 illustrated in FIG. 7, for example, color regions of the color filter colored in three colors of red (R), green (G), and blue (B) are cyclically arranged, and three color regions 32R, 32G, and 32E are associated with the respective sub-pixels SPix so that the color regions 32R, 32G, and 32B constitute the pixel Pix as one set.

The pixels Pix are arranged in a matrix in a direction parallel to the scan signal lines GCL and a direction parallel to the pixel signal lines SGL, and constitute the display area Ad (to be described later). The color filter 32 faces the liquid crystal layer 6 in the direction orthogonal to the TFT substrate 21. Thus, the sub-pixels SPix are allowed to display a single color.

The color filter 32 may have a combination of other colors as long as being colored in different colors. The color filter 32 may be omitted. Thus, regions may be present in which the color filter 32 is not provided, that is, non-colored sub-pixels SPix may be present. The pixel Pix may include four or more sub-pixels SPix.

FIG. 3 is a perspective view illustrating a configuration example of the drive electrodes and the touch detection electrodes of the display unit with a touch detection function. The drive electrodes COML according to the present configuration example serve as both drive electrodes of the liquid crystal display device 20 and drive electrodes of the touch detection device 30.

The drive electrodes COML face the pixel electrodes 22 in the direction orthogonal to the surface of the TFT substrate 21. The touch detection device 30 is constituted by the drive electrodes COML provided in the pixel substrate 2 and the touch detection electrodes TDL provided in the counter substrate 3.

The touch detection electrodes TDL are constituted by stripe-like electrode patterns extending in the direction intersecting the extending direction of the electrode patterns of the drive electrodes COML. The touch detection electrodes TDL face the drive electrodes COML in the direction orthogonal to the surface of the TFT substrate 21. Each of the electrode patterns of the touch detection electrodes TDL is coupled to an input terminal of the touch detection signal amplifier 42 of the touch detection controller 40.

The electrode patterns of the drive electrodes COML and the touch detection electrodes TDL intersecting each other generate electrostatic capacitances at intersecting portions therebetween. In the touch detection device 30, the drive electrode driver 14 applies the drive signals VcomAC to the drive electrodes COML to allow the touch detection electrodes TDL to output the touch detection signals Vdet, and thus the touch detection is performed.

In other words, each of the drive electrodes COML corresponds to the drive electrode E1, and each of the touch detection electrodes TDL corresponds to the touch detection electrode E2, in the basic principle of the touch detection illustrated in FIGS. 3 to 5. The touch detection device 30 is configured to detect the touch according to this basic principle.

In this manner, the touch detection device 30 includes the touch detection electrodes TDL that forms the electrostatic capacitances with either of the first and second electrodes (for example, the drive electrodes COML as the second electrodes), and performs the touch detection based on a change in the electrostatic capacitances.

The electrode patterns of the drive electrodes COML and the touch detection electrodes TDL intersecting each other constitute capacitive touch sensors in a matrix arrangement. As a result, by scanning the entire input surface IS of the touch detection device 30, the touch detection controller 40 can detect positions and contact areas where the detection target objects OBJ1 and OBJ2 are in contact with or in proximity to the input surface IS.

In other words, when the touch detection device 30 performs the touch detection operation, the drive electrode driver 14 performs driving so as to line-sequentially scan the drive electrode blocks B illustrated in FIG. 6 in a time-division manner. This operation sequentially selects each of the drive electrode blocks 3 (one detection block) of the drive electrodes COML in a scan direction Scan. The touch detection device 30 outputs the touch detection signals Vdet from the touch detection electrodes TDL. The touch detection device 30 is configured to perform the touch detection of one detection block in the above-described manner.

While any relation can be established between the detection block and the number or lines for the display output, a touch detection region corresponding to two lines in the display area Ad serves as one detection block in the present embodiment. In other words, while any relation can be established between the detection block and the pixel electrodes, between the detection block and the scan signal lines, and between the detection block and the pixel signal lines, two pixel electrodes or two scan signal lines correspond to one drive electrode COML in the present embodiment.

The touch detection electrodes TDL or the drive electrodes COML (drive electrode blocks b) are not limited to having the divided stripe-like shapes. The touch detection electrodes TDL or the drive electrodes COML (drive electrode blocks B) may have, for example, comb-tooth shapes. Otherwise, the touch detection electrodes TDL or the drive electrodes COML (drive electrode blocks B) only need to be divided into a plurality of portions. The shape of the slits dividing the drive electrodes COML may be linear or curved.

As an example of an operation method of the display device with a touch detection function 1, the display device with a touch detection function 1 performs the touch detection operation (in a touch detection period) and the display operation (in a display operation period) in a time-division manner. The touch detection operation and the display operation may be separately performed in any manner.

Figure 10:
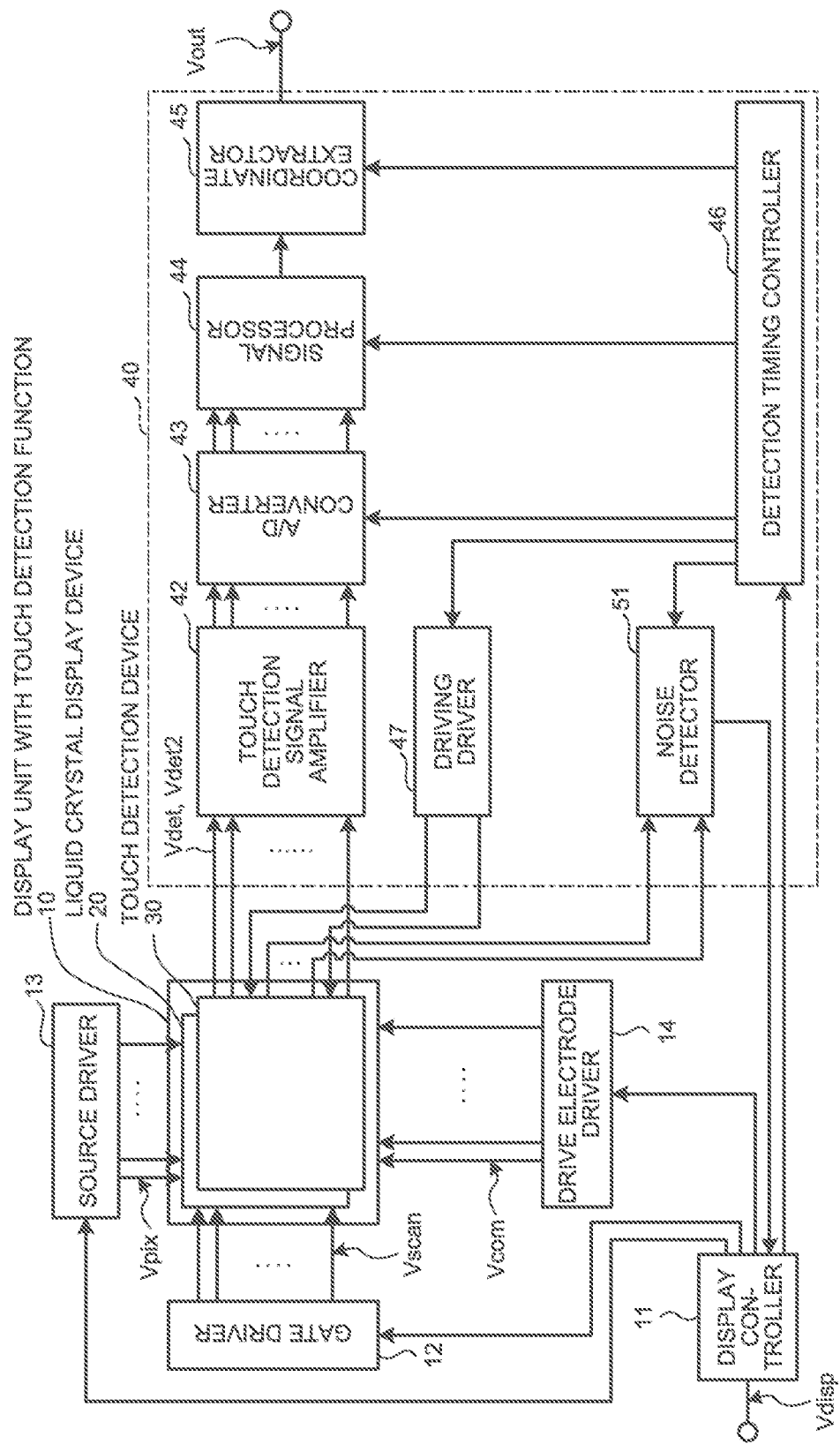
FIG. 10 is a block diagram illustrating a second configuration example of the touch detector and the display unit of the display device with a touch detection function.

Second Configuration Example of Touch Detector and Display Unit of Display Device with a Touch Detection Function FIG. 10 is a block diagram illustrating a second configuration example of the touch detector and the display unit of the display device with a touch detection function. The display device with a touch detection function 1 illustrated in FIG. 10 is a device that performs the touch detection using what is called the self-capacitance method.

The touch detection controller 40 of the display device with a touch detection function 1 further includes a driving driver 47 and a noise detector 51. The driving driver 47 supplies drive signals to the touch detection electrodes TDL when the touch detection operation is performed using the self-capacitance method. The noise detector 51 detects noise superimposed on the touch detection electrodes TDL. Each of the touch detection electrodes TDL outputs a touch detection signal Vdet2 corresponding to a self-capacitance. The touch detection signal Vdet2 is supplied to the touch detection signal amplifier 42. The contact or proximity of the detection target objects is detected by the A/D converter 43, the signal processor 44, and the coordinate extractor 45.

When the touch detection operation is performed using the self-capacitance method, the touch detection controller 40 supplies the drive signals from the driving driver 47 to the touch detection electrodes TDL, but the drive electrodes COML may be in a floating state where no voltage signal is applied and the potential thereof is not fixed. The drive electrodes COML may be supplied with voltage signals at the same level as that of the drive signals supplied to the touch detection electrodes TDL simultaneously therewith.

Each of the touch detection electrodes TDL outputs the touch detection signal Vdet2 to the touch detection signal amplifier 42. The A/D converter 43 converts analog signals output from the touch detection signal amplifier 42 into digital signals. The signal processor 44 receives the signals from the A/D converter 43, and detects whether a touch input has been made.

The noise detector 51 detects the noise superimposed on the touch detection electrodes TDL. If the noise caused by disturbances is transmitted to the touch detection device 30, a malfunction may occur in the touch detection. For example, if an intensity of the noise caused by disturbances is large near the frequency of the drive signals Vcom supplied to the drive electrodes COML, a change in voltage waveform produced by the noise may cause a determination that a touch input has been made, leading to a malfunction. The noise detector 51 detects the noise, and thereby, the operation of touch detection can be appropriately controlled so as not to cause a malfunction.

In the present embodiment, the noise detected by the noise detector 51 includes, for example, external noise entering the display device with a touch detection function 1 from other electrical equipment or the like, noise caused by an AC power supply when the AC power supply is coupled to the display device with a touch detection function 1, and noise caused by the display operation of the liquid crystal display device 20.

Figure 11:
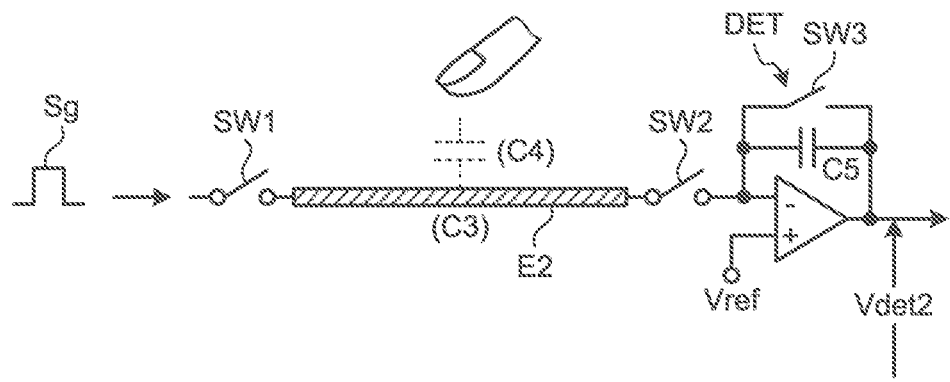
FIG. 11 is an explanatory diagram illustrating an exemplary equivalent circuit of a self-capacitance touch detection device.
Figure 12:
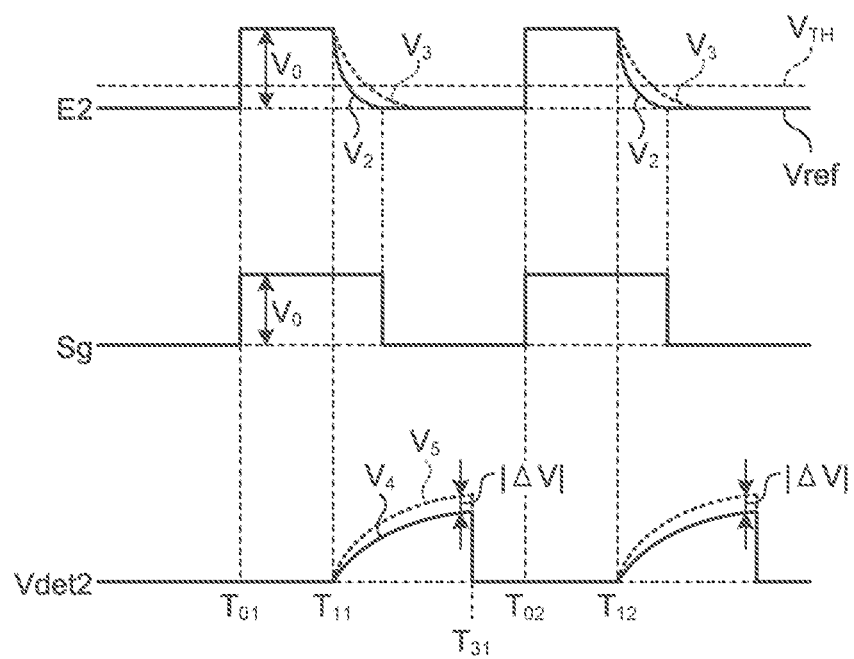
FIG. 12 is a diagram illustrating an example of waveforms of the drive signal and the touch detection signal.

The following describes the basic principle of the self-capacitance touch detection performed by the display device with a touch detection function 1 of the present configuration example, with reference to FIGS. 11 and 12.

FIG. 11 is an explanatory diagram illustrating an exemplary equivalent circuit of a self-capacitance touch detection device. FIG. 12 is a diagram illustrating an example of waveforms of the drive signal and the touch detection signal. FIG. 11 illustrates also the detection circuit.

When the finger is neither in contact with nor in proximity to the touch detection electrode E2, the AC rectangular wave Sg having the predetermined frequency (such as roughly several kilohertz to several hundred kilohertz) is applied to the touch detection electrode E2. The touch detection electrode E2 has an electrostatic capacitance C3, and conducts a current corresponding to the electrostatic capacitance C3. The voltage detector DET converts a variation in current corresponding to the AC rectangular wave Sg into a variation in voltage (waveform $V_4$ of a solid line (refer to FIG. 12)).

As illustrated in FIG. 11, when the finger is in contact with ox in proximity to the touch detection electrode E2, an electrostatic capacitance C4 between the finger and the touch detection electrode E2 is added to the electrostatic capacitance C3 of the touch detection electrode E2. As a result, applying the AC rectangular wave Sg to the touch detection electrode E2 causes a current corresponding to the electrostatic capacitances C3 and C4 to flow.

As illustrated in FIG. 12, the voltage detector DET converts the variation in the current corresponding to the AC rectangular wave Sg into a variation in voltage (waveform $V_5$ of a dotted line). The voltage values of the obtained waveforms $V_4$ and $V_5$ are integrated and compared with each other, and thereby, a determination can be made whether the finger is in contact with or in proximity to the touch detection electrode E2.

For example, alternately, a method of obtaining periods of time until the waveforms $V_2$ and $V_3$ in FIG. 12 drop to a predetermined reference voltage, and comparing the periods with each other may be employed.

Specifically, as illustrated in FIG. 11, the touch detection electrode E2 is configured to be disconnected from a power source by a switch SW1 and from the voltage detector DET by a switch SW2. In FIG. 12, the AC rectangular wave Sg increases a voltage level by an amount equal to a voltage $V_8$, at time $T_{D1}$. At this time, the switch SW1 is turned on, and the switch SW2 is turned off. Hence, the voltage of the touch detection electrode E2 also increases to the voltage $V_0$.

Then, the switch SW1 is turned off before time $T_{11}$. At this time, the touch detection electrode E2 is brought into a floating state, but the potential of the touch detection electrode E2 is maintained at the voltage $V_0$ by the electrostatic capacitance C3 of the touch detection electrode E2 or by an electrostatic capacitance C3+C4 (refer to FIG. 11) obtained by adding the electrostatic capacitance C4 produced by the contact or proximity of the finger or the like to the electrostatic capacitance C3 of the touch detection electrode E2.

Moreover, a switch SW3 is tuned on before time $T_{11}$ end turned off after a lapse of a predetermined time to reset the voltage detector DET. This reset operation sets the touch detection signal Vdet2 to a voltage substantially equal to a reference voltage Vref.

When, subsequently, the switch SW2 is tuned on at time $T_{11}$, the inverting input part of the voltage detector DET is set at the voltage $V_0$ of the touch detection electrode E2, and then, the potential of the inverting input part of the voltage detector DET drops to the reference voltage Vref according the time constant of the electrostatic capacitance C3 (or C3+C4) of the touch detection electrode E2 and a capacitance C5 in the voltage detector DET. At this time, an electric charge stored in the electrostatic capacitance C3 (or C3+C4) of the touch detection electrode E2 moves to the electrostatic capacitance C5 in the voltage detector DET, and hence, the touch detection signal Vdet2 serving as an output voltage of the voltage detector DET increases in level.

When the finger or the like is not in proximity to the touch detection electrode E2, the touch detection signal Vdet2 of the voltage detector DET is represented by the waveform $V_4$ indicated by the solid line, and is given as Vdet2=C3×$V_0$/C5. When a capacitance is added by an influence of the finger or the like, the touch detection signal Vdet2 is represented by the waveform $V_5$ indicated by the dotted line, and is given as Vdet2=(C3+C4)×$V_0$/C5.

Then, at time $T_{31}$ after the electric charge in the electrostatic capacitance C3 (or C3+C4) of the touch detection electrode E2 has sufficiently moved to the electrostatic capacitance C5, the switch SW2 is turned off, and the switches SW2 and SW3 are turned on so as to lower the potential of the touch detection electrode E2 to a low level potential equal to that of the AC rectangular wave Sg and also to reset the voltage detector DET.

In this operation, the switch SW1 can be turned on at any time before time $T_{02}$ after the switch SW2 is turned off. The voltage detector DET can be reset at any time before time $T_{12}$ after the switch SW2 is turned off.

The operation described above is repeated at the predetermined frequency (such as roughly several kilohertz to several hundred kilohertz). The detection can be made as to whether the external proximate object is present (whether the touch is made) based on the absolute value |ΔV| of a difference between the waveforms V4 and V5.

As illustrated in FIG. 12, the potential of the touch detection electrode E2 is represented by the waveform $V_2$ when the finger or the like is not in proximity to the touch detection electrode E2, or represented by the waveform $V_3$ when the electrostatic capacitance C4 is added by the influence of the finger or the like. The detection can also be made as to whether the external proximate object is present (whether the touch is made) by measuring times until voltages of the respective waveforms $V_2$ and $V_3$ drop to a predetermined voltage $V_{TH}$.

In the present configuration example, the touch detection electrodes TDL are supplied with the respective electric charges according to the drive signals supplied from the driving driver 47 illustrated in FIG. 10, and the touch detection device 30 performs the touch detection using the self-capacitance method.

Figure 13:
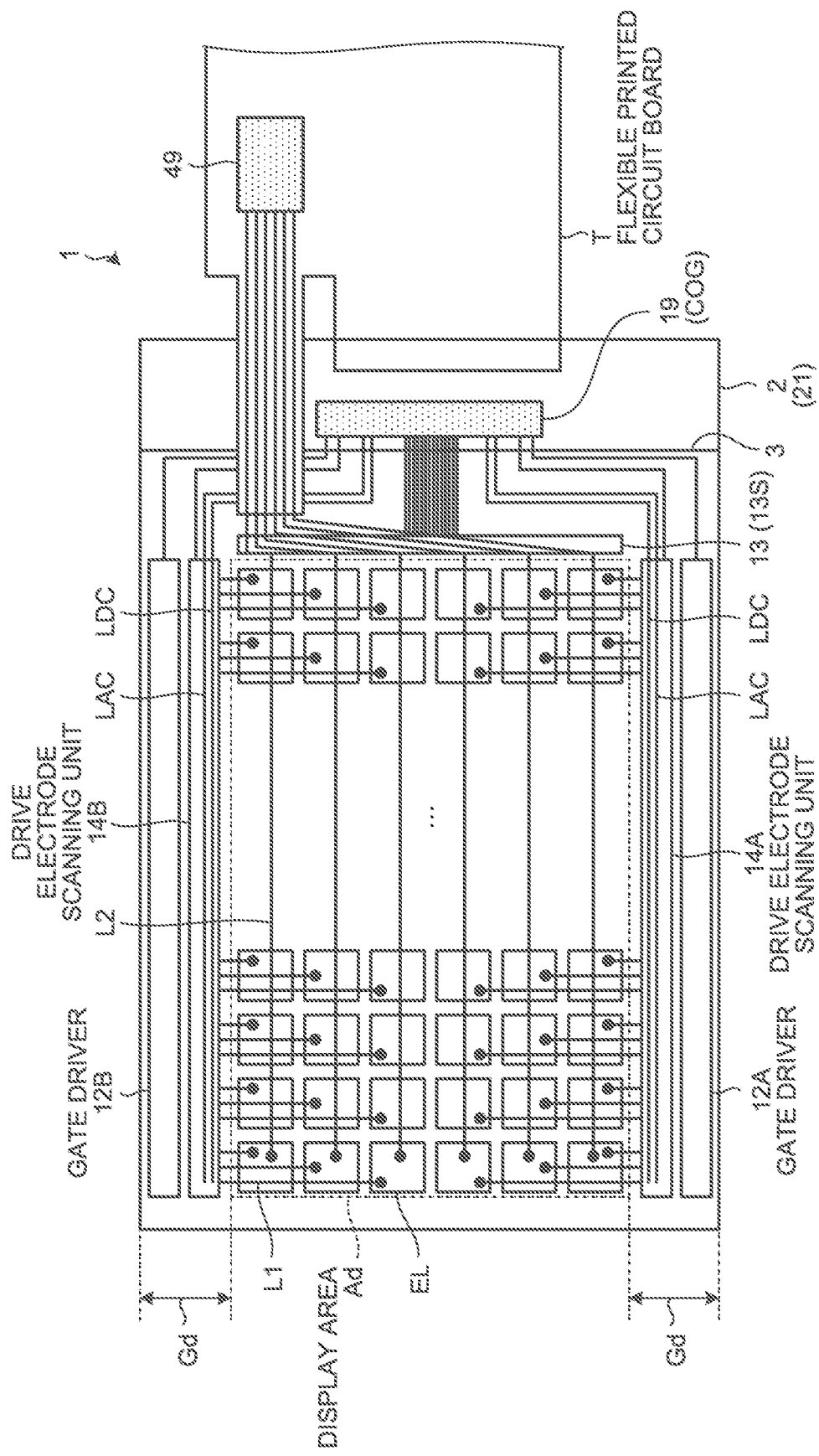
FIG. 13 is a diagram illustrating a second configuration example of the module on which the display device with a touch detection function is mounted.

FIG. 13 is a diagram illustrating a second configuration example of the module on which the display device with a touch detection function is mounted. In the case of the self-capacitance method, a plurality of electrodes EL arranged in a matrix may be used as electrodes serving as both the touch detection electrodes TDL and the drive electrodes COML. In this case, each of the electrodes EL is coupled to the drive electrode scanning units 14A and 14B and the touch detection controller 40 through coupling parts, such as wiring L1 and L2. FIG. 13 illustrates the wiring L2 for only some of the electrodes EL, but actually, all the electrodes EL are individually provided with the coupling parts, including the wiring L2 or the like.

While each of the electrodes EL can have any shape and any size, the size of the electrode SL may correspond to the size of the pixel. In this case, one of the electrodes constituting the pixel (such as each of the pixel electrodes 22 in the pixel of the liquid crystal display device or the drive electrode COML serving as a counter electrode) may be used as the electrode EL. That is, the electrode EL may be used also as an electrode provided in each pixel of the display device having a plurality of such pixels.

First Configuration Example of Force Detector

Figure 14:
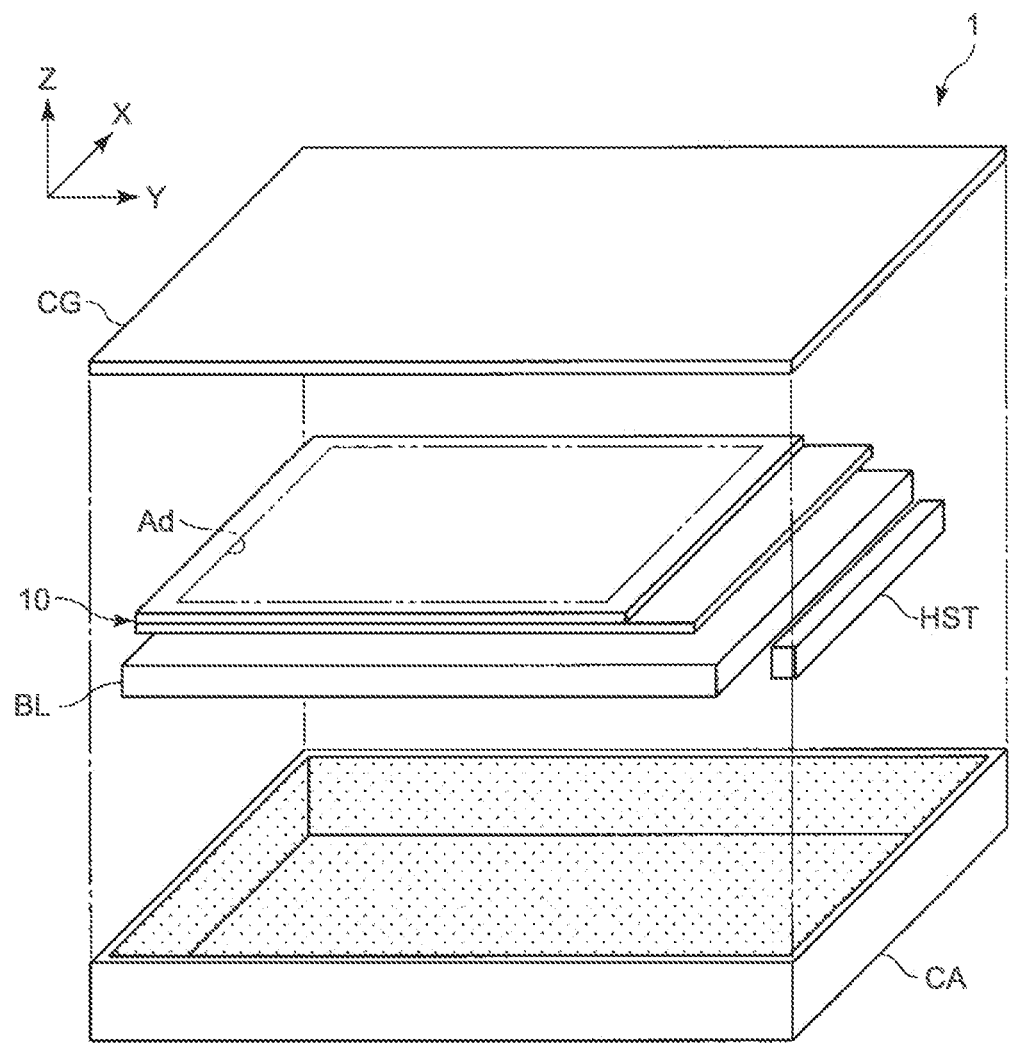
FIG. 14 is an exploded perspective view illustrating a first configuration example of the display device with a touch detection function.

FIG. 14 is an exploded perspective view illustrating a first configuration example of the display device with a touch detection function. As illustrated in FIG. 14, the display device with a touch detection function 1 includes the display unit with a touch detection function 10, an illumination unit (such as a backlight unit BL) for illuminating the display unit with a touch detection function 10, the host HST for controlling the display unit with a touch detection function 10 and the backlight unit BL, a casing CA, and a cover member CG.

The display unit, with a touch detection function 10 has a plane parallel to the X-Y plane defined by the X-direction serving as a first direction and the Y-direction serving as a second direction, the X- and Y-directions intersecting each other at a right angle. In the present configuration example, the X-direction serving as the first direction and the Y-direction serving as the second direction intersect each other at a right angle, but may intersect each other at an angle other than 90 degrees. The Z-direction serving as a third direction intersects each of the X-direction serving as the first direction and the Y-direction serving as the second direction at a right angle. The Z-direction serving as the third direction corresponds to the thickness direction of the display unit with a touch detection function 10.

The casing CA has a box shape having an opening in an upper portion thereof, and accommodates the display unit with a touch detection function 10, the backlight unit BL, and the host HST. The casing CA may be formed of an electrically conductive material, such as a metal, or may be formed of a resin with a metal material formed as a surface layer thereof.

The cover member CG closes the opening of the casing CA, and covers the display unit with a touch detection function 10, the backlight unit BL, and the host HST.

In the X-Y plane view, the dimensions of the cover member CG are larger than the dimensions of the second substrate and the dimensions of the first substrate. Examples of the cover member CG include light transmissive substrates, such as a glass substrate and a resin substrate. When the cover member CG is a glass substrate, the cover member CG is called a cover glass in some cases.

In the Z-direction serving as the third direction, the display unit with a touch detection function 10 and the backlight unit BL are located between the bottom face of the casing CA and the cover member CG, and the backlight unit BL is located between the casing CA and display unit with a touch detection function 10. The backlight unit BL can be disposed with a space from the display unit with a touch detection function 10. The backlight unit BL can also be disposed with a space from the casing CA.

Figure 15:
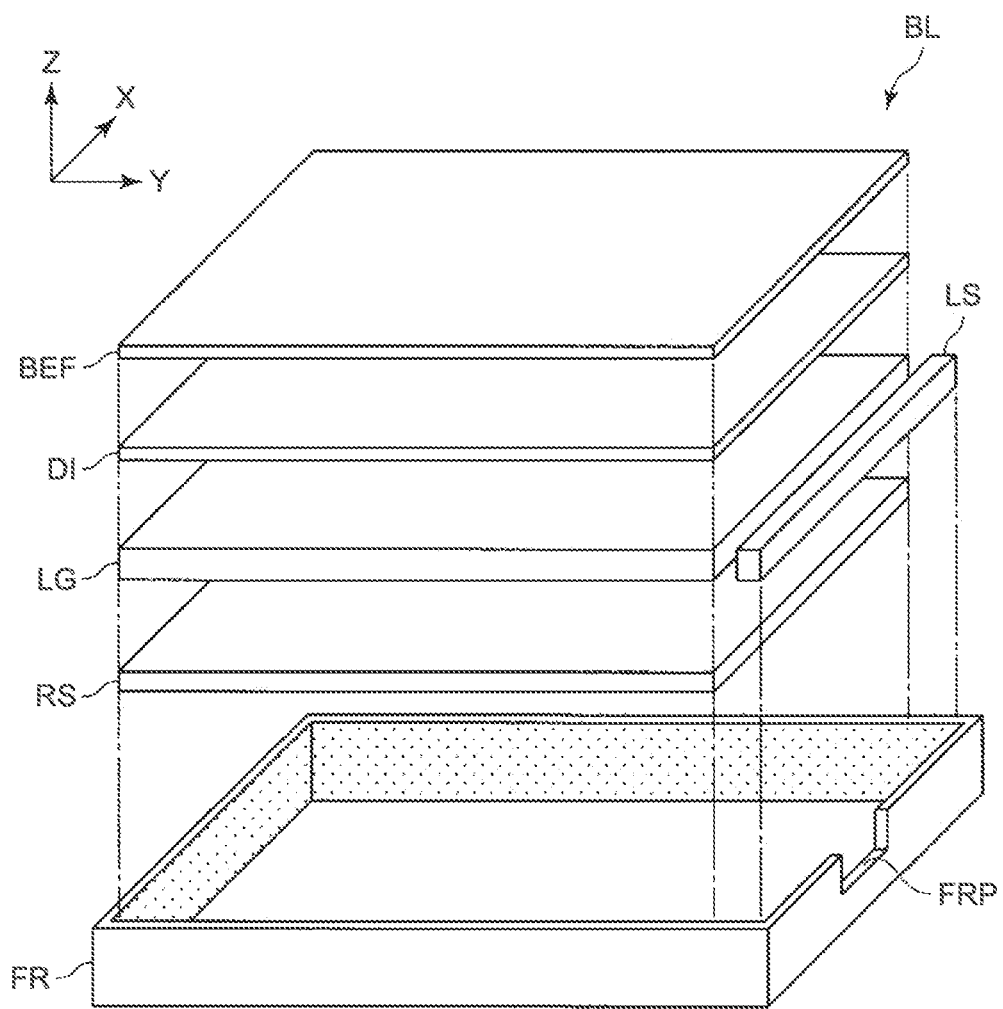
FIG. 15 is an exploded perspective view illustrating a backlight unit.

FIG. 15 is an exploded perspective view illustrating the backlight unit. The backlight unit BL includes a light guide LG, a light source LS, a light reflector RS, a light diffusing sheet DI, a brightness enhancement film BEF, and a frame FR. The backlight unit BL has a shape and a size corresponding to those of the display unit with a touch detection function 10.

The light guide LG is disposed between the display unit with a touch detection function 10 and the casing CA. In the present configuration example, the light guide LG is formed into a flat rectangular shape. The light source LS emits light to the light guide LG. In the present configuration example, the light source LS uses light-emitting-diodes (LEDs), and is disposed facing one side surface of the light guide LG.

The light reflector RS is disposed between the light guide LG and the casing CA. The light reflector RS reflects light emitted from the light guide LG in a direction opposite to the display unit with a touch detection function 10, and emits the reflected light toward the display unit with a touch detection function 10. The light reflector RS can increase the luminance level of a displayed image by reducing loss of the light. In the present configuration example, the light reflector RS is formed into a rectangular sheet-like shape. The light reflector RS has substantially the same area in the Y plane as that of the light guide LG. The light reflector RS may have, for example, a multilayer film structure of a polyester-based resin.

The light diffusing sheet DI is disposed between the light guide LG and the display unit with a touch detection function 10. The light diffusing sheet DI diffuses light entering from the light guide LG side, and emits the diffused light toward the display unit with a touch detection function 10. That is, the light transmitted through the light diffusing sheet DI is diffused, and hence, the light diffusing sheet DI can reduce luminance unevenness of light emitted from the backlight, unit EL in the X-Y plane. In the present configuration example, the light diffusing sheet DI is formed into a rectangular sheet-like shape. The light diffusing sheer DI has substantially the same area in the X-Y plane as that of the light guide LG.

The brightness enhancement film BEF is disposed between the light diffusing sheet DI and the display unit with a touch detection function 10. The brightness enhancement film BEF has a function of increasing the luminance level of the light emitted from the backlight unit BL. In the present configuration example, the brightness enhancement film BEF is formed into a rectangular film-like shape. The brightness enhancement film BEF has substantially the same area in the X-Y plane as that of the light guide LG.

The frame FR is used for modularizing the backlight unit BL. The light guide LG, the light source LS, the light reflector RS, the light diffusing sheet DI, and the brightness enhancement film BEF are mounted on the frame FR. This configuration allows the relative position between the light guide LG and the light source LS to be fixed.

In the present configuration example, the frame FR is formed into a rectangular frame-like shape. The frame FR surrounds in whole the assembly of the light guide LG and the light source LS in the X-Y plane. The frame FR has a path FRP formed therein, through which a flexible printed circuit board coupled to the light source LS passes. The frame FR may be formed of an electrically conductive material, such as a metal.

The shape of the frame FR in the X-Y plane can be variously changed, and only needs to be a shape that does not hinder the illumination of the display unit with a touch detection function 10. Examples of the shape of the frame FR in the X-Y plane include an L-shape facing two adjacent sides of the light guide LG, a π-shape facing three adjacent sides of the light guide LG, and an II-shape facing two opposite sides of the light guide LG.

While FIG. 15 exemplifies the backlight unit BL, various forms are applicable as the backlight unit BL. For example, the backlight unit BL may be provided excluding one or more of the light reflector RS, the light diffusing sheet DI, and the brightness enhancement film BEF, or may be provided with additional optical elements not illustrated in FIG. 15. The backlight unit BL only needs to be configured to emit light to the display unit with a touch detection function 10.

If the display unit with a touch detection function 10 is a reflective liquid crystal display device having a reflective functional layer in which the pixel electrodes are constituted by reflecting electrodes made of a metal, for example, or a display device having a display functional layer using self-luminous elements such as organic light-emitting diodes (OLEDs), the backlight unit BL is omitted. The illumination unit may be constituted by a front-light unit FL that irradiates with light from the front surface of the display unit with a touch detection function 10.

Figure 16:
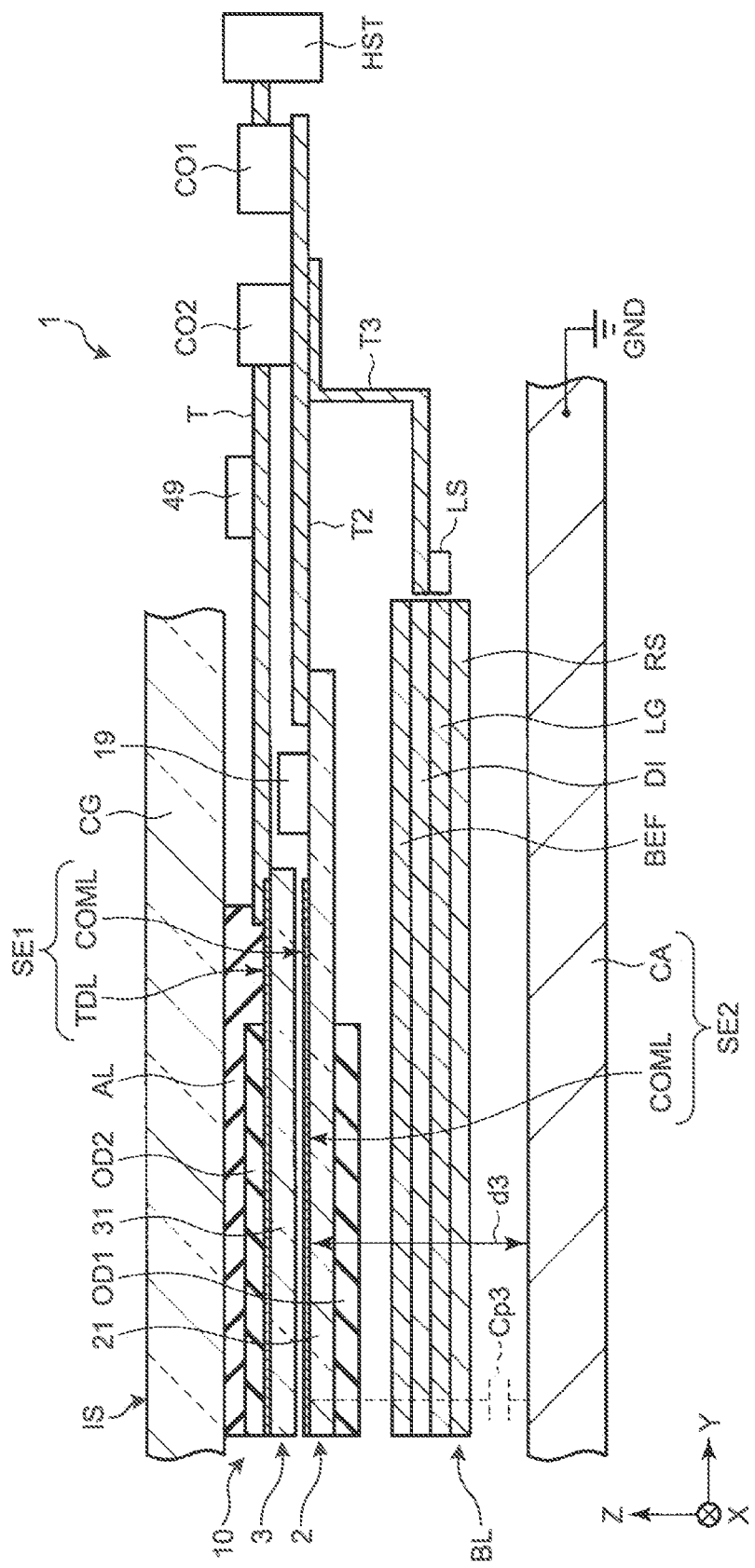
FIG. 16 is a sectional view illustrating a configuration of the display device with a touch detection function illustrated in FIG. 14.

FIG. 16 is a sectional view illustrating a configuration of the display device with a touch detection function illustrated in FIG. 14. As illustrated in FIG. 16, the display device with a touch detection function 1 includes the display unit with a touch detection function 10, the COG 19, the cover member CG, a first optical device OD1, a second optical device OD2, the touch detection electrodes TDL, the touch IC 49, the backlight unit BL, and first, second, and third printed circuit boards (such as flexible printed circuit boards T, T2, and T3).

The COG 19 is mounted on the pixel substrate 2 of the display unit with a touch detection function 10. The flexible printed circuit board T2 is coupled to the pixel substrate 2. A connector CO1 and a connector CO2 are mounted on the flexible printed circuit board T2. The flexible printed circuit board T2 is coupled to the host HST through the connector CO1.

The flexible printed circuit board T couples the touch detection electrodes TDL to the connector CO2. The flexible printed circuit board T3 couples the light source LS to the flexible printed circuit board T2.

The COG 19 and the touch IC 19 are coupled together through the flexible printed circuit board T2, the connector CO2, and the flexible printed circuit board T. As an example of arrangement of the touch IC 49, the touch IC 49 cars be mounted on one of the flexible printed circuit boards T, T2, and T3 and the counter substrate 3, or can be mounted in a divided manner on any two or more of these boards.

The method for coupling the host HST to each of the display unit with a touch detection function 10 and the touch detection electrodes TDL, and the method for coupling the light source LS to the host HST can be variously modified.

For example, a single flexible printed circuit board may be used instead of the three independent flexible printed circuit boards T, T2, and T3 and the connectors CO1 and CO2 described above. In this case, the single flexible printed circuit board can be coupled to the host HST; a first branch part of the single flexible printed circuit board can be coupled to the display unit with a touch detection function 10; a second branch part of the single flexible printed circuit board can be coupled to the touch detection electrodes TDL; and a third branch part of the single flexible printed circuit board can be coupled to the light source LS. The coupling between the flexible printed circuit boards or between the flexible printed circuit board and the host HST or the substrate may be made through a connector, such as the connector CO1 or the connector CO2, or may be made using solder instead of the connector.

The host HST, the COG 19, and the touch IC 49 serve as controllers of the touch detector SE1 that includes the drive electrodes COML and the touch detection electrodes TDL of the display unit with a touch detection function 10.

The host HST can be rephrased as an application processor. The touch IC 49 can provide a timing signal to notify the COG 19 of time for driving the touch detector SE1. Alternatively, the COG 19 can provide a timing signal to notify the touch IC 49 of time for driving the drive electrodes COML. Still alternatively, the host HST can provide a timing signal to each of the COG 19 and the touch IC 49. Such a timing signal can synchronize the driving of the COG 19 and the driving of the touch IC 49 with each other.

The host HST is coupled to the light source LS through the connector CO1 and the flexible printed circuit board T3, and controls driving of the light source LS. The light source LS may be coupled to the COG 19 through the flexible printed circuit boards T3 and T2, and may be controlled by the COS 19. In other words, the display controller 11 may include a light source controller for controlling the light source.

The cover member CG is located outside the display unit with a touch detection function 10, and faces the counter substrate 3. In the present configuration example, the input surface IS of the display device with a touch detection function 1 corresponds to a surface of the cover member CG. The display device with a touch detection function 1 can detect signals (first signal values) corresponding to the position and the contact area of each of the detection target objects OBJ1 and OBJ2 when the detection target objects OBJ1 and OBJ2 are in contact with the input surface IS.

When each of the detection target objects OBJ1 and OBJ2 applies a force to the input surface IS, the display device with a touch detection function 1 can output a signal value corresponding to the force, to the controller CTRL. The signal value corresponding to the force refers to a signal value corresponding to a force applied by each of the detection target objects OBJ1 and OBJ2 to press the input surface IS, and is a signal value (a second signal value) that changes with the intensity of the force (a first force).

The first optical device OD1 is disposed between the pixel substrate 2 and the backlight unit BL. The first optical device OD1 is attached to the pixel substrate 2.

The second optical device OD2 is disposed between the display unit with a touch detection function 10 and the cover member CG. The second optical device OD2 is attached to the counter substrate 3 and the touch detection electrodes TDL.

Each of the first and second optical devices OD1 and OD2 includes at least a polarizing plate, and may include a phase difference plate as needed. The absorption axis of the polarizing plate included in the first optical device OD1 intersects the absorption axis of the polarizing plate included in the second optical device OD2. For example, the absorption axis of the polarizing plate included in the first optical device OD1 intersects the absorption axis of the polarizing plate included in the second optical device OD2 at a right angle.

The cover member CG is attached to the second optical device OD2 via an adhesive layer AL. Examples of the adhesive layer AL include an optically clear resin (OCR). Since the display unit with a touch detection function 10 detects a force, the adhesive layer AL may be elastically deformed, and only needs to be capable of transmitting the force applied from the cover member CG to the second optical device OD2.

The touch detection electrodes TDL are disposed between the drive electrodes COML and the cover member CG. In the present configuration example, the touch detection electrodes TDL are provided above a surface of the counter substrate 3 facing the second optical device OD2. The touch detection electrodes TDL may be in contact with or apart from the counter substrate 3. When the touch detection electrodes TDL is apart, from the counter substrate 3, a member, such as an insulating film (not illustrated), is interposed between the counter substrate 3 and the touch detection electrodes TDL. The touch detection electrodes TDL extend in the Y-direction serving as the second direction.

The drive electrodes COML and the touch detection electrodes TDL constitute the mutual capacitance touch detector SE1. The drive electrodes COML serve as both drive electrodes for display and sensor drive electrodes. The touch detector SE1 is used to detect the positions and the contact areas of the detection target objects OBJ1 and OBJ2.

The backlight unit BL is disposed with a space from the display unit with a touch detection function 10.

In the present configuration example, the casing CA is formed of an electrically conductive material (such as aluminum). The potential of the casing CA is a reference potential. Examples of the reference potential include a ground potential (GND). The casing CA may be electrically coupled to any one of the touch IC 49, the COG 19, and the host HST, for example, through connection wiring, and may be supplied with the reference potential from any one of the touch IC 49, the COG 29, and the host HST.

The casing CA is disposed with a space from the display unit with a touch detection function IC. In the present configuration example, an air layer or a resin layer is interposed between the display unit with a touch detection function 10 and the casing CA. That is, the display device with a touch detection function 1 includes an air layer or a resin layer at least either between the display unit with a touch detection function 10 and the backlight unit BL or between the backlight unit BL and the casing CA.

At least a part of a space between the casing CA and the drive electrodes COML is formed of the air layer or the resin layer. The presence of the air layer or the resin layer makes the distance between the casing CA and the drive electrodes COML changeable according to the intensity of the force applied to the input surface IS. Removing the force having been applied to the input surface IS returns the distance between the casing CA and the drive electrodes COML to the original distance with a lapse of time.

A distance d3 from the casing CA to the drive electrodes COML is a distance in the Z-direction serving as the third direction, and corresponds to the distance from a surface of the casing CA facing the drive electrodes COML to a surface of the drive electrodes COML facing the casing CA. The distance d3 changes according to the intensity of the force applied to the cover member CG and the position where the force is applied.

A capacitance Cp3 is present between the drive electrodes COML and the casing CA. That is, the drive electrodes COML make a capacitance coupling with the casing CA. The capacitance Cp3 changes according to the distance d3. Accordingly, the COG can detect the force information by detecting the change in the capacitance Cp3 corresponding to the distance d3.

The force detection controller 50 drives the drive electrodes COML, and extracts the force information based on the change in distance d3 from the drive electrodes COML. For example, the force detection controller 50 is included in the COG 19, and the COG 19 outputs signals to the drive electrodes COML and reads out signals based on the change in distance d3 between the drive electrodes COML and the casing CA from the drive electrodes COML. The force detection controller 50 may be included in the touch IC 49 or the host HST. The display controller 11, the touch detection controller 40, the force detection controller 50, and the host HST may collaborate with one another to control the touch detector SE1, the display unit DSP, and the force detector SE2.

In the present configuration example, the drive electrodes COML are commonly used by the touch detector SE1, the display unit DSP, and the force detector SE2.

Figure 17:
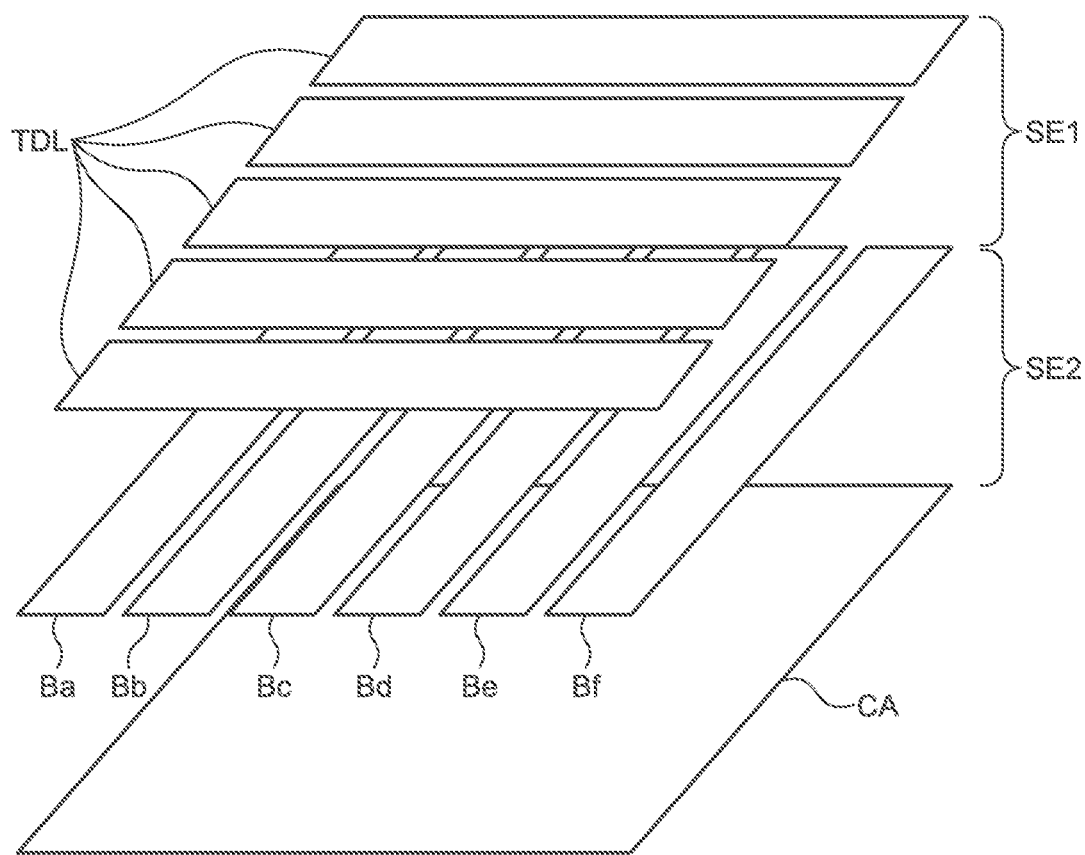
FIG. 17 is a perspective view illustrating the touch detection electrodes, drive electrode blocks, and a casing of the display device with a touch detection function.

FIG. 17 is a perspective view illustrating the touch detection electrodes, the drive electrode blocks, and the casing of the display device with a touch detection function. The touch detection electrodes TDL and drive electrode blocks Ba, Bb, Bc, Bd, Be, and Bf constitute the touch detector SE1 of FIG. 1. Regions corresponding to respective intersections between the touch detection electrodes TDL and the drive electrode blocks Ba, Bb, Bc, Bd, Be, and Bf are touch detecting unit regions each serving as a unit region where the touch detector SE1 detects the touch. Each of intersections of the touch detection electrodes TDL with the drive electrode blocks Ba, Bb, Bc, Bd, Be, and Bf corresponds to one first detector in the present disclosure.

The drive electrode blocks Ba, Bb, Bc, Ed, Be, and Bf and the casing CA constitute the force detector SE2 of FIG. 1. The force detector SE2 has a plurality of regions corresponding to the respective drive electrode blocks Ba, Bb, Bc, Bd, Be, and Bf as force detecting unit regions each serving as a unit region where the force detector SE2 detects the force. That is, the force detector SE2 outputs a signal value corresponding to the force in each of the regions corresponding to the drive electrode blocks Ba, Bb, Bc, Bd, Be, and Bf, to the controller CTRL. In this case, the controller CTRL performs processing (to be described later) on each of the force detecting unit regions. Each of potions where the drive electrode blocks Ba, Bb, Bc, Bd, Be, and Bf face the casing CA corresponds to one second detector in the present disclosure.

Each of the touch detecting unit regions serving as the unit region where the touch detector SE1 detects the touch is smaller than each of the force detecting unit regions serving as the unit region where the force detector SE2 detects the force. The length in the X-direction of each of the touch detecting unit regions is smaller than the length in the X-direction of the each of the force detecting unit regions. In the present embodiment, the touch detector SE1 and the force detector SE2 use the same unit of the drive blocks, but are not limited thereto. For example, the touch detector SE1 may individually drive the drive electrode blocks, and the force detector SE2 may simultaneously drive all the drive electrode blocks, or two or more of the drive electrode blocks. In this case, the drive electrode blocks to be simultaneously driven represent the force detecting unit region.

Figure 18:
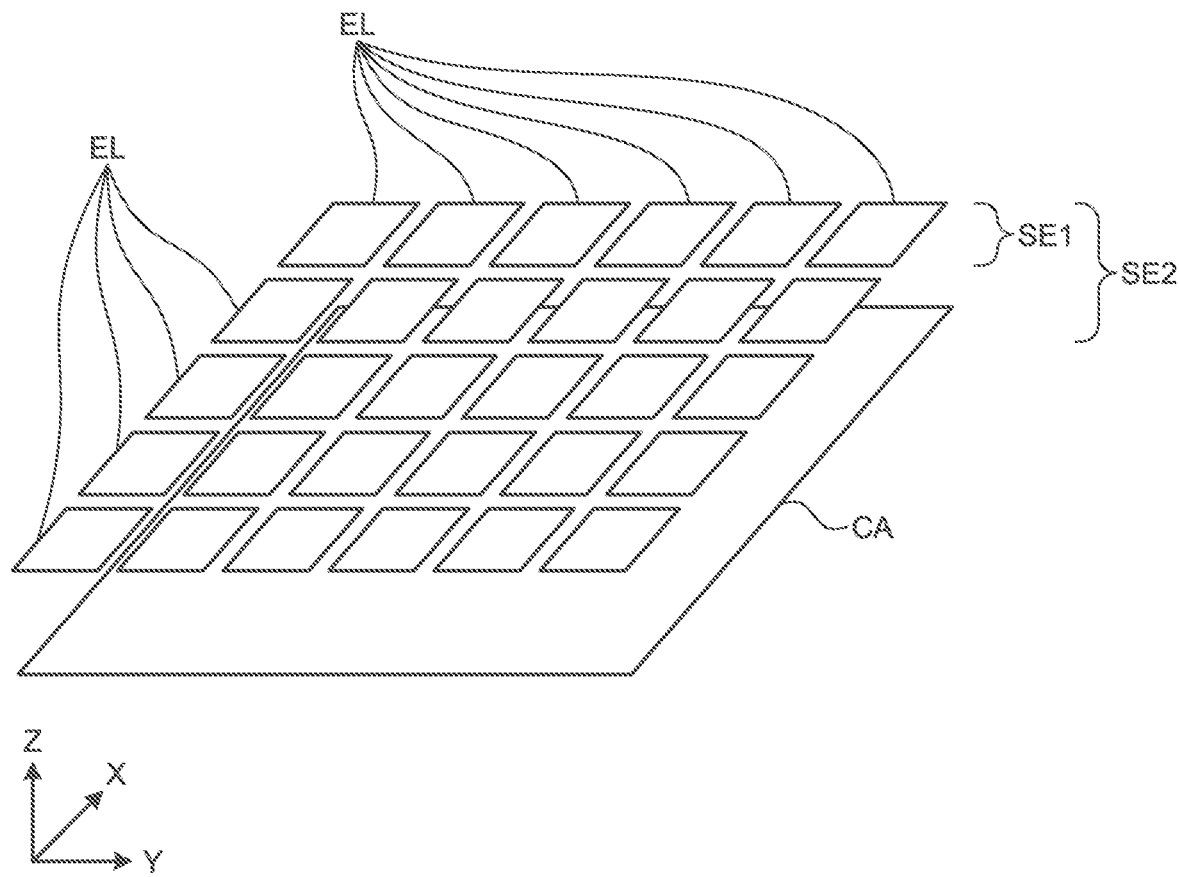
FIG. 18 is a perspective view illustrating configuration example 2 of the touch detection electrodes, the drive electrode blocks, and the casing of the display device with a touch detection function.

FIG. 18 is a perspective view illustrating configuration example 2 of the touch detection electrodes, the drive electrode blocks, and the casing of the display device with a touch detection function.

When the touch detector SE1 and the force detector SE2 include the electrodes EL provided in a matrix as the electrodes serving as both the touch detection electrodes TDL and the drive electrodes COML as illustrated in FIG. 13, the force detector SE2 has a plurality of regions in a matrix corresponding to the electrodes EL provided in a matrix, as the force detecting unit regions. Each of the force detecting unit regions serves as the unit region for detecting the force. That is, the force detector SE2 outputs the signal value corresponding to the force in each of the regions corresponding to the electrodes EL, to the controller CTRL. In this case, the controller CTRL performs the processing (to be described later) on each of the force detecting unit regions. The sectional structure of the display device with a touch detection function 1 can be variously modified. Each of the electrodes EL arranged in a matrix corresponds to one first detector of the present disclosure, and each of portions where the electrodes EL provided in a matrix face the casing CA corresponds to one second detector in the present disclosure.

If a space between the display unit with a touch detection function 10 and the backlight unit BL is denoted as a first space, a space between the backlight unit BL and the casing CA is denoted as a second space, and a space between the backlight unit BL and the frame FR is denoted as a third space, at least one of the first, second, and third spaces includes the air layer or the resin layer. The air layer may be formed by disposing a spacer or the like, for example, in a peripheral area. The resin layer refers to a cushioning material CUS, for example. Only any one of the first, second, and third spaces needs to be included. For example, the backlight unit BL may be in contact with the casing CA without having a space therebetween.

FIGS. 19 to 24 are sectional views illustrating structure examples of the display device with a touch detection function. In the structure example illustrated in FIG. 13, the display unit with a touch detection function 10 and the backlight unit BL are coupled together at ends thereof by spacers SP1 and SP2, and an air gap AG1 is formed between the display unit with a touch detection function 10 and the backlight unit BL. An air gap AG2 is formed between the backlight unit BL and the casing CA. The structure example illustrated in FIG. 19 does not include the frame FR illustrated in FIG. 15.

Figure 19:
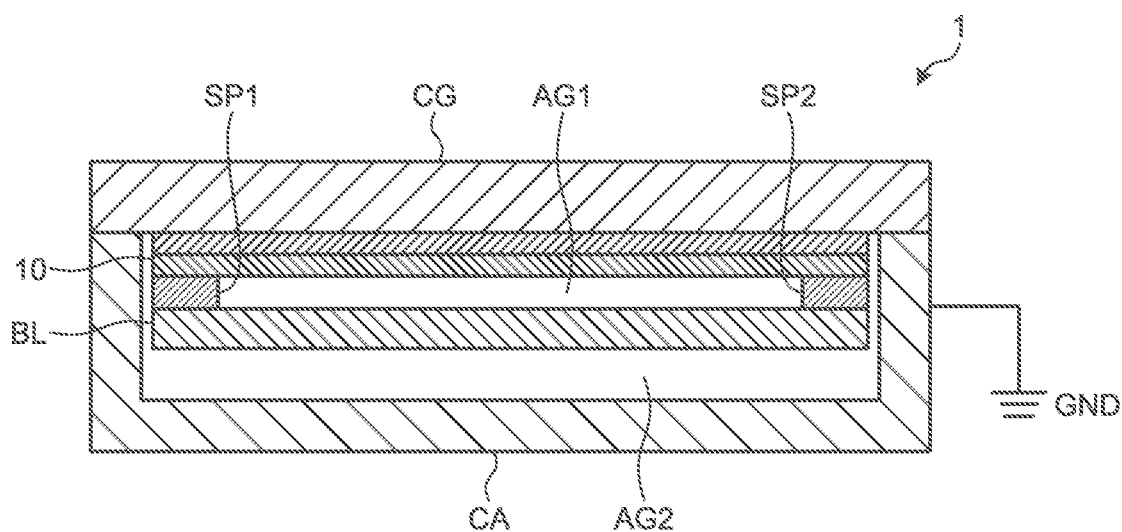
Figure 20:
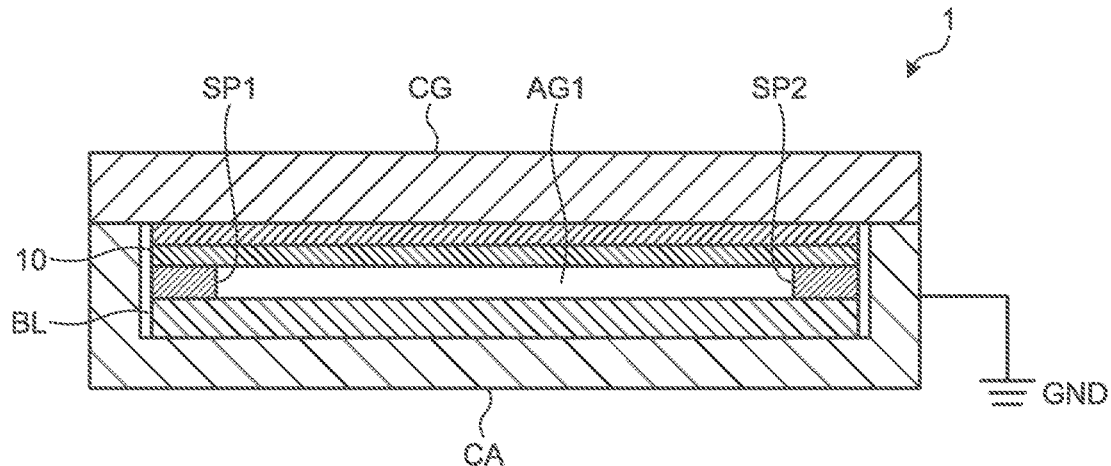
FIG. 20 is a sectional view illustrating another structure example of the display device with a touch detection function.

In the structure example illustrated in FIG. 20, the backlight unit BL is in contact with the casing CA, and the air gap AG2 illustrated in FIG. 19 is not formed therebetween.

Figure 21:
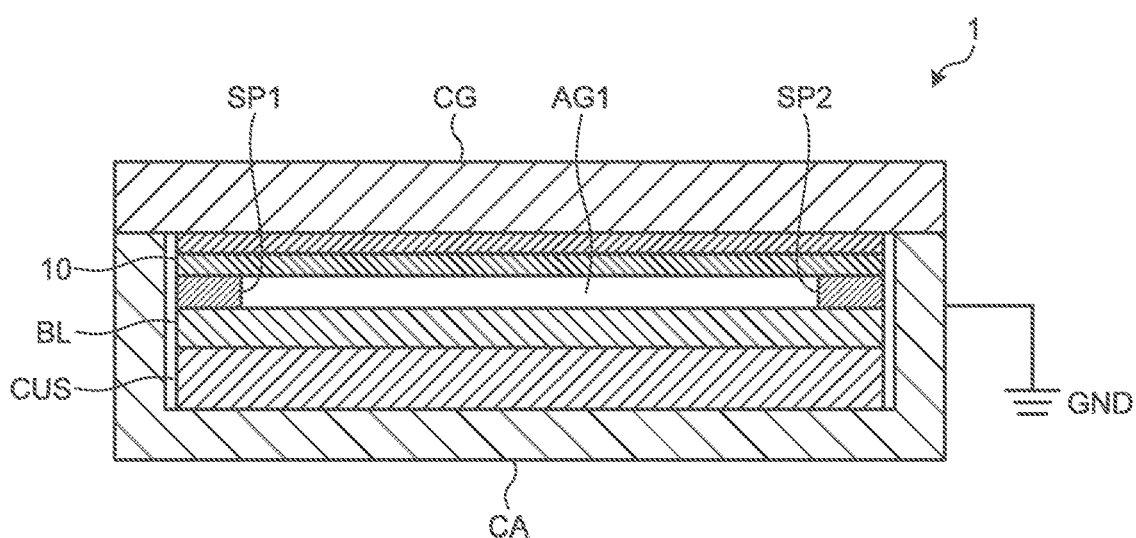
FIG. 21 is a sectional view illustrating still another structure example of the display device with a touch detection function.

In the structure example illustrated in FIG. 21, the cushioning material CUS is interposed between the backlight unit BL and the casing CA, and the air gap AG2 illustrated in FIG. 19 is not formed therebetween.

Figure 22:
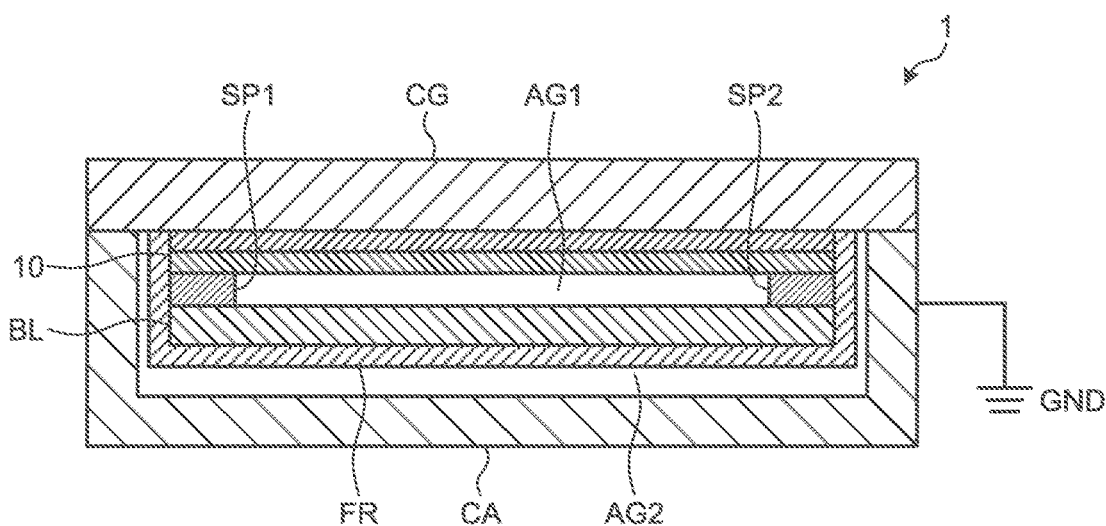
FIG. 22 is a sectional view illustrating still another structure example of the display device with a touch detection function.

In the structure example illustrated in FIG. 22, the frame FR illustrated in FIG. 15 has a bottomed box shape. The backlight unit BL is in contact with the bottom of the frame FR. The air gap AG2 is formed between the bottom of the frame FR and the casing CA.

Figure 23:
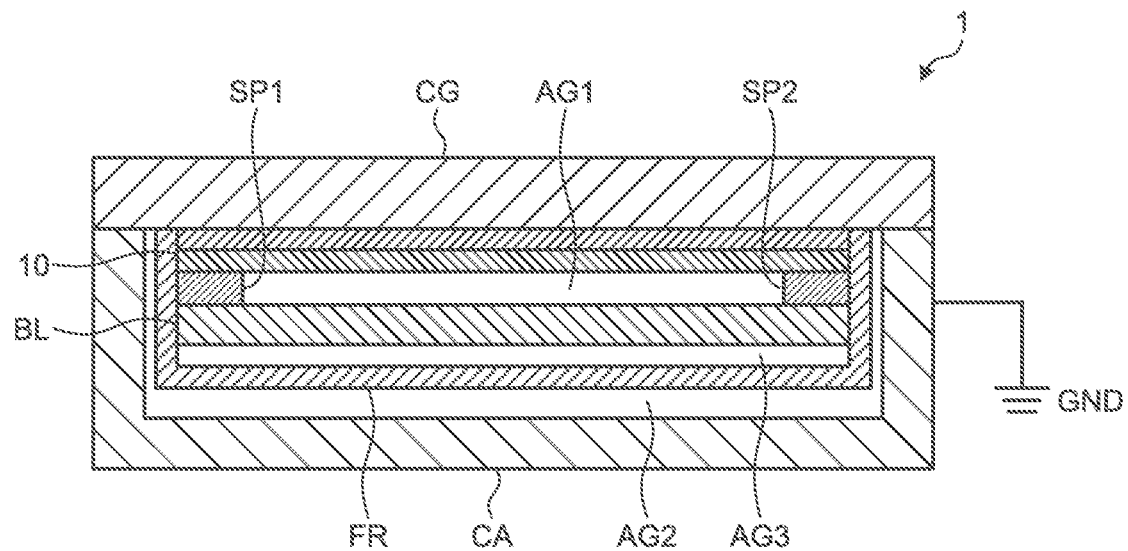
FIG. 23 is a sectional view illustrating still another structure example of the display device with a touch detection function.

In the structure example illustrated in FIG. 23, the air gap AG3 is formed between the backlight unit BL and the bottom of the frame FR.

Figure 24:
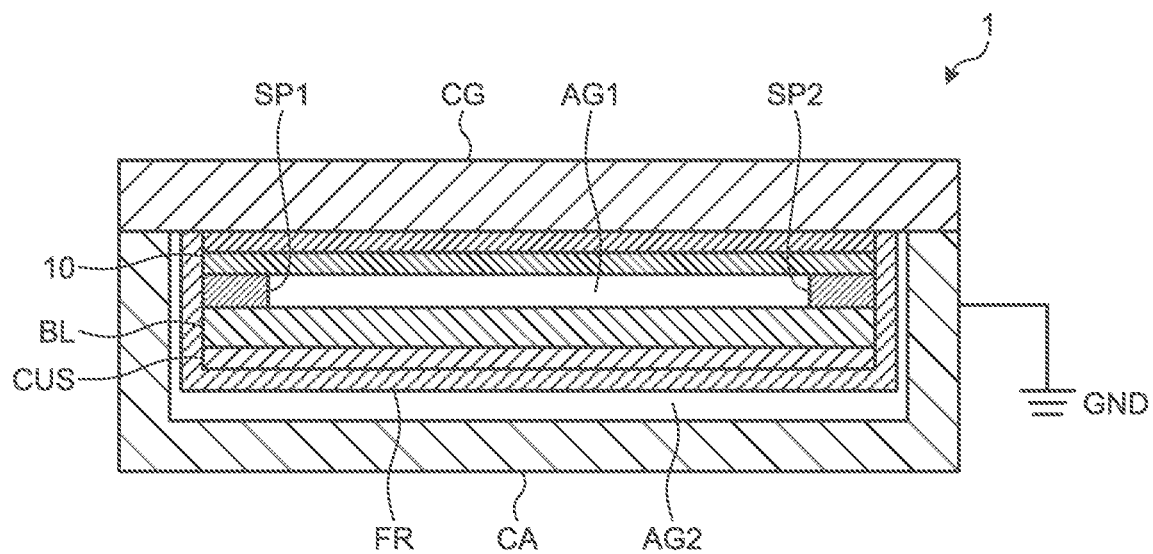
FIG. 24 is a sectional view illustrating still another structure example of the display device with a touch detection function.

In the structure example illustrated in FIG. 24, the cushioning material CUS is disposed between the backlight unit BL and the frame FR, and the air gap AG3 illustrated in FIG. 23 is not formed therebetween.

Second Configuration Example of Force Detector

Figure 25:
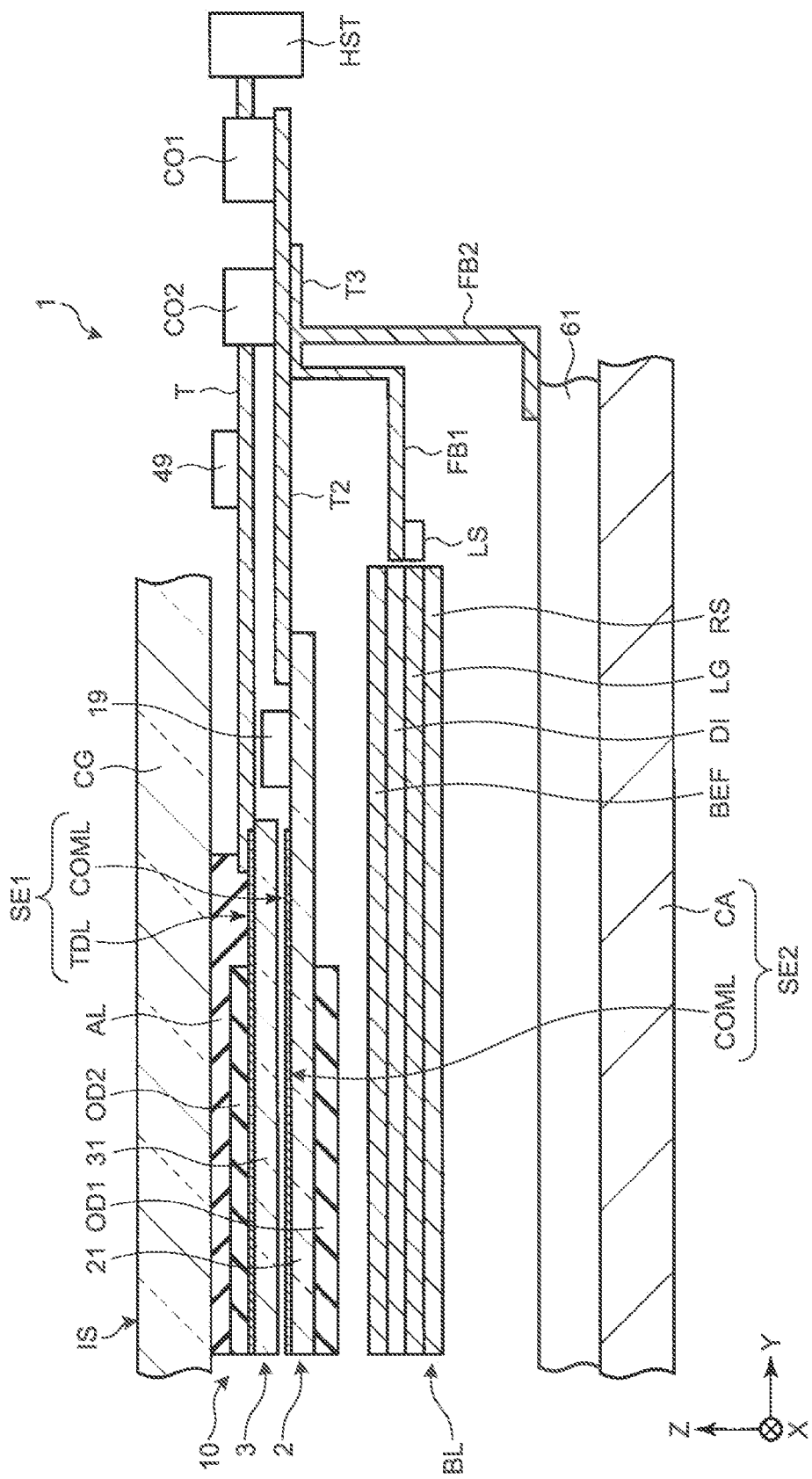
FIG. 25 is a sectional view illustrating a second configuration example of the display device with a touch detection function.

FIG. 25 is a sectional view illustrating a second configuration example of the display device with a touch detection function. As illustrated in FIG. 25, the display device with a touch detection function 1 further includes a force sensor 61, in addition to the display unit with a touch detection function 10, the COG 19, the cover member CG, the first optical device OD1, the second optical device OD2, the touch detection electrodes TDL, the touch IC 49, the backlight unit BL, and the flexible printed circuit hoards T, T2, and T3. The force sensor 61 corresponds to the force detector SE2 of FIG. 1.

The flexible printed circuit board T3 includes a first branch part FB1 and a second branch part FB2. The first branch part FB1 is coupled to the light source LS. The second branch part FB2 is coupled to the force sensor 61.

The force sensor 61 is a sensor that detects air pressure in the casing CA. When the force is applied to the input surface IS, the cover member CG and the display unit with a touch detection function 10 warp towards the inside of the casing CA. When the cover member CG and the display unit with a touch detection function 10 warp towards the inside of the casing CA, the air in the casing CA is compressed to increase the air pressure in the casing CA.

After the force applied to the input surface IS is removed, the warp of the cover member CG and the display unit with a touch detection function 10 is eliminated with a lapse of time. The cover member CG and the display unit with a touch detection function 10 restore the original states thereof. After the cover member CG and the display unit with a touch detection function 10 restore the original states thereof, the air pressure in the casing CA drops to the original air pressure. Accordingly, the controller CTRL can detect the force information by detecting the change in the air pressure in the casing CA.

Figure 26:
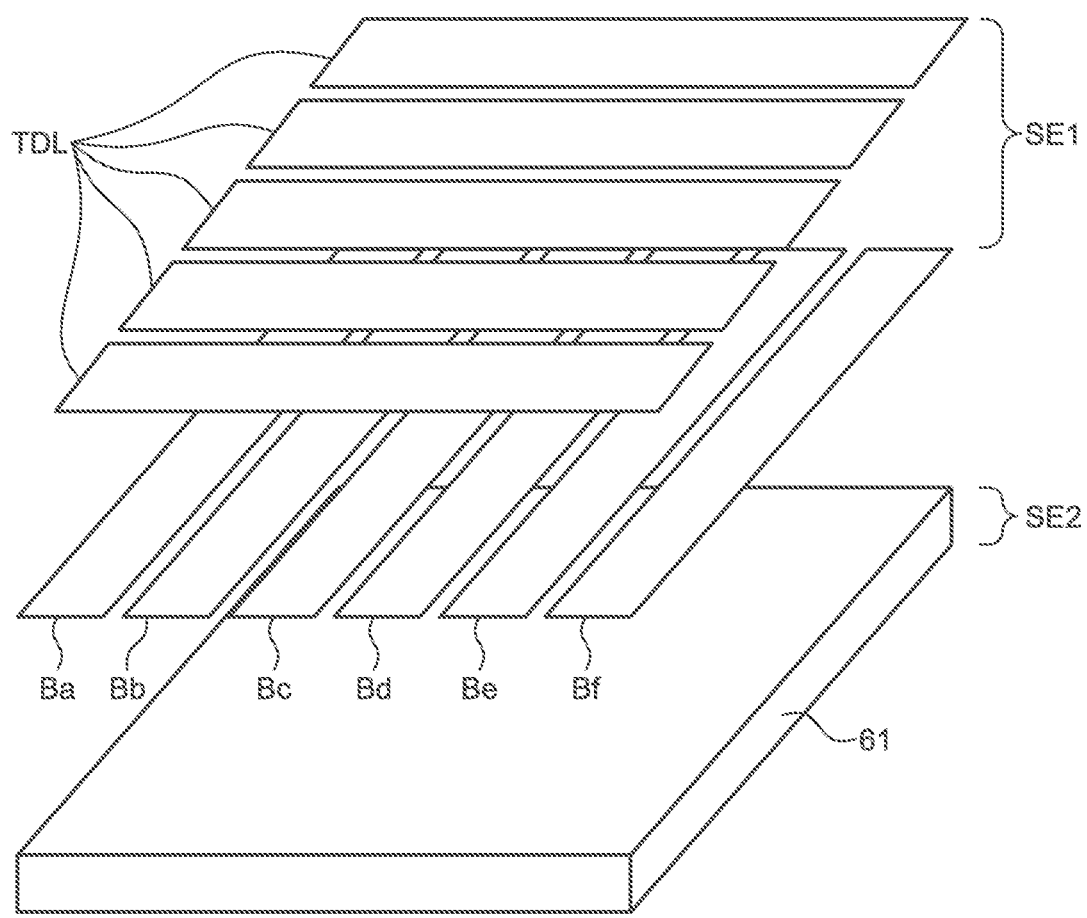
FIG. 26 is a perspective view schematically illustrating the touch detection electrodes, the drive electrode blocks, and a force sensor of the display device with a touch detection function.

FIG. 26 is a perspective view schematically illustrating the touch detection electrodes, the drive electrode blocks, and the force sensor of the display device with a touch detection function.

The touch detection electrodes TDL and the drive electrode blocks Ba, Bb, Bc, Bd, Be, and Bf constitute the touch detector SE1 of FIG. 1. The respective intersections between the touch detection electrodes TDL and the drive electrode blocks Ba, Bb, Bc, Bd, Be, and Bf correspond to the touch detecting unit regions each serving as the unit region where the touch detector SE1 detects the touch. Each of intersections of the touch detection electrodes TDL with the drive electrode blocks Ba, Bb, Bc, Bd, Be, and Bf corresponds to the first detector in the present disclosure.

The force sensor 61 constitutes the force detector SE2 of FIG. 1. The force detector SE2 has one region corresponding to the input surface IS as the force detecting unit region. The force detecting unit region serves as the unit region for detecting the force. That is the force detector SE2 outputs one signal representing a force applied to the entire force detecting unit region, to the controller CTRL. In this case, the controller CTRL performs the processing (to be described later) on the force detecting unit region. The force sensor 61 corresponds to the second detector in the present disclosure.

Each of the touch detecting unit regions serving as the unit region where the touch detector SE1 detects the touch is smaller than each of the force detecting unit regions serving as the unit region where the force detector SE2 detects the force. The length in the X-direction of each of the touch detecting unit regions is smaller than the length in the X-direction of the each of the force detecting unit regions. The length in the Y-direction of each of the touch detecting unit regions is smaller than the length in the Y-direction of the each of the force detecting unit regions.

Instead of the force sensor 61, a strain gauge nay be used that, detects a strain of the display device with a touch detection function 1 based on a change in resistance value. Instead of the force sensor 61, a photodetector may be used that optically detects the strain of the display device with a touch detection function 1. The size of the force sensor 61 can be variously modified.

Figure 27:
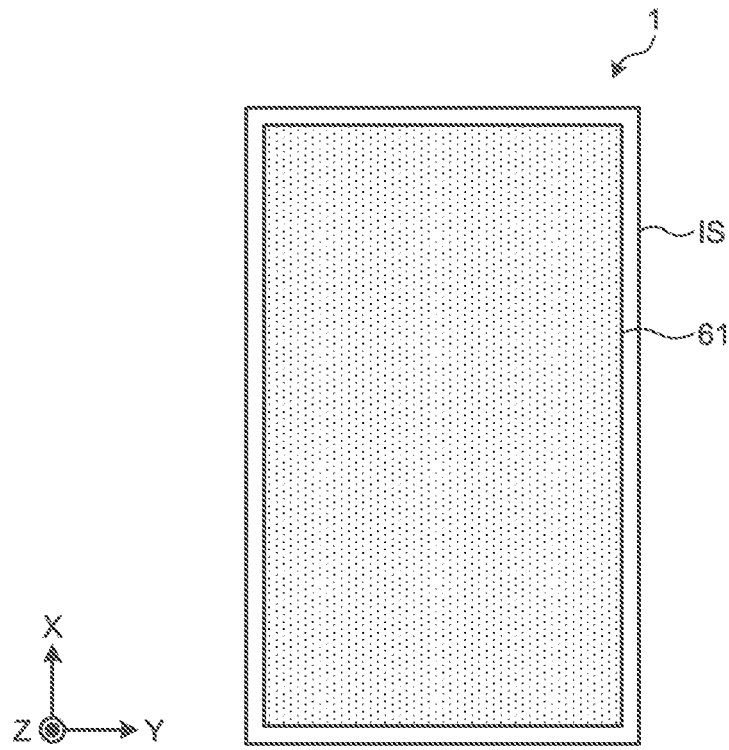
FIG. 27 is a plan view illustrating an example of the force sensor.
Figure 28:
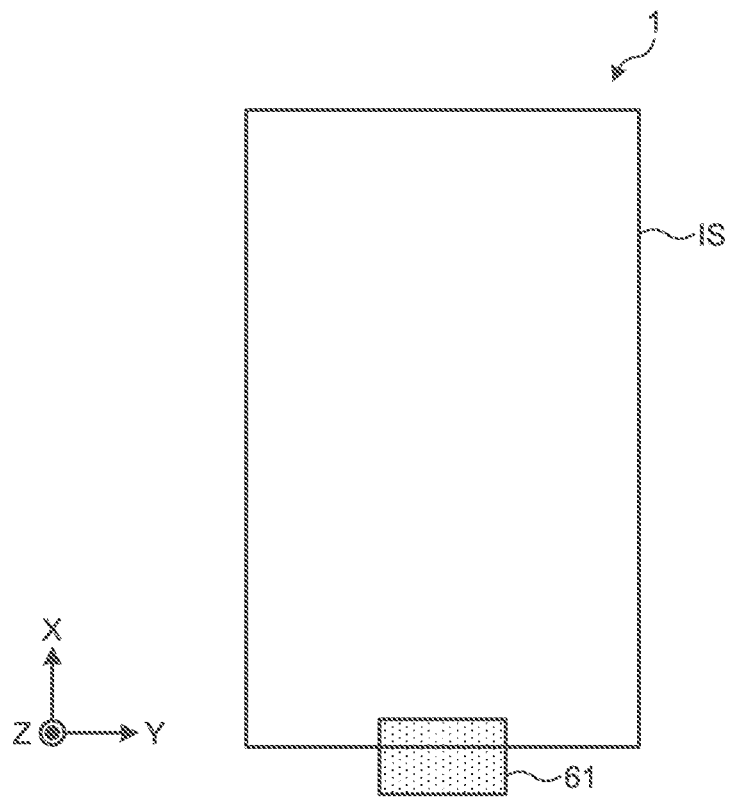

FIGS. 27 and 28 are plan views illustrating examples of the force sensor. The force sensor 61 may have substantially the same size as that of the input surface IS, and may be disposed inside the input surface IS in the plan view, as illustrated in FIG. 27.

The force sensor 61 may have a relatively smaller size than that of the input surface IS, and may be disposed at a place overlapping an outer border of the input surface IS in the plan view, as illustrated in FIG. 26. The force sensor 61 may be disposed at a place overlapping a corner of the input surface IS in the plan view. The force sensor 61 may be disposed inside the input surface IS in the plan view.

Operation of Controller

In the configuration example of the force detector SE2 illustrated in FIG. 26, the force detector SE2 has one force detecting unit region. The force detector SE2 outputs the signal representing the force applied to the force detecting unit region, to the controller CTRL. When the force detector SE2 has one force detecting unit region, the controller CTRL performs the processing on the force detecting unit region.

In the configuration example of the force detector SE2 illustrated in FIG. 17 or 18, the force detector SE2 has a plurality of force detecting unit regions. The force detector SE2 outputs a plurality of signal values representing the forces applied to the respective force detecting unit regions, to the controller CTRL. When the force detector SE2 has a plurality of force detecting unit regions, the controller CTRL performs the processing on each of the force detecting unit regions.

Figure 29:
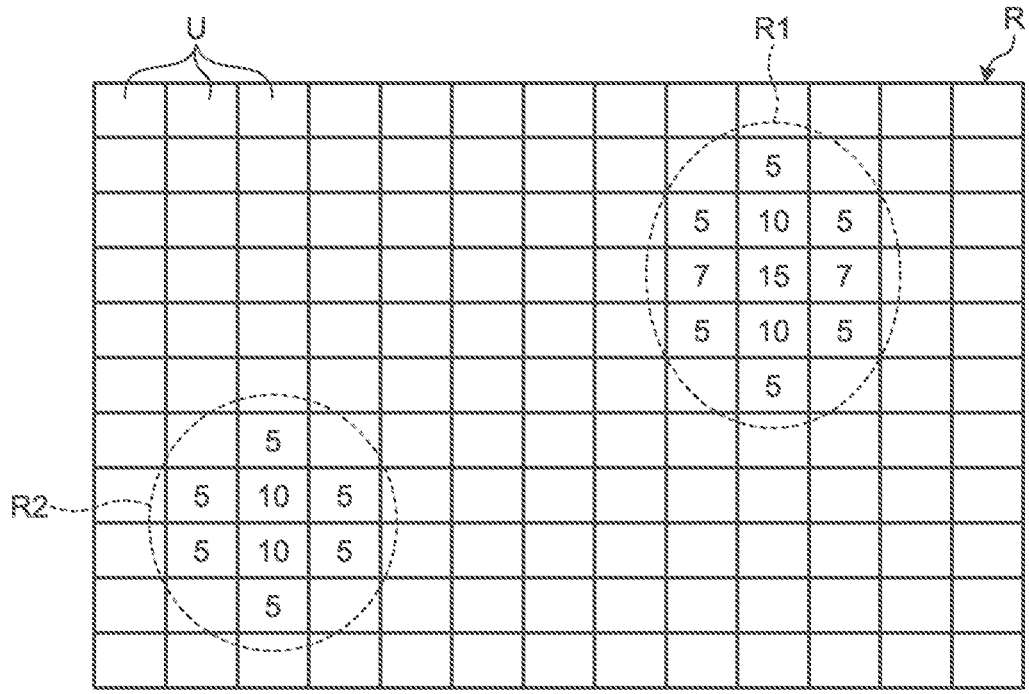
FIG. 29 is a diagram illustrating one force detecting unit region of a force detector.

FIG. 29 is a diagram illustrating the force detecting unit region (second region) of a force detector. In FIG. 29, each square in one force detecting unit region R corresponds to each of the intersections between the touch detection electrodes TDL and the drive electrodes COML, and serves as a touch detecting unit region U (first region) that is a unit region for detecting the touch.

A region R1 in the force detecting unit region R is a region where the detection target object OBJ1 is in contact with the input surface IS. The detection target object OBJ1 is the first type object that, is deformed upon contact with the input surface IS. Examples of the first type object include the finger.

When the detection target object OBJ1 is the first type object, the contact area between the detection target object OBJ1 and the input surface IS increases with increase in the force applied by the detection target object OBJ1 to press the input surface IS. That is, the force applied by the detection target object OBJ1 to press the input surface IS correlates with the contact area between the detection target object OBJ1 and the input surface IS.

In the example illustrated in FIG. 29, the controller CTRL can count the number of the touch detecting unit regions U in the region R1 as "11". The controller CTRL can calculate the actual contact area between the detection target object OBJ1 and the input surface IS by multiplying "11" by the area per one touch detecting unit region U.

If the touch detector SE1 uses the self-capacitance method or the mutual capacitance method, the touch detector SE1 can detect a signal value representing an electrostatic capacitance (corresponding to the capacitive element C2 of FIG. 3 or the capacitive element C4 of FIG. 11) added by the detection target object OBJ1 for each of the touch detecting unit regions U in the region R2.

When the detection target object OBJ1 is an object that is deformed upon contact with the input surface IS, the electrostatic capacitance between the detection target object OBJ1 and the touch detection electrodes TDL increases with increase in the force applied by the detection target object OBJ1 to press the input surface IS. That is, the force applied by the detection target object OBJ1 to press the input surface IS correlates with the electrostatic capacitance between the detection target object OBJ1 and the touch detection electrodes TDL.

In the example illustrated in FIG. 29, the controller CTRL can perform counting such that the region R1 includes one of the touch detecting unit regions U having a signal value of "15" corresponding to the electrostatic capacitance therein, two of the touch detecting unit regions U each having a signal value "10" corresponding to the electrostatic capacitance therein, two of the touch detecting unit regions U each having a signal value "7" corresponding to the electrostatic capacitance therein, and six of the touch detecting unit regions U each having a signal value "5" corresponding to the electrostatic capacitance therein.

If the touch detector SE1 uses the mutual capacitance method or the self-capacitance method, the signal values according to the contact in the region R1 include one signal value of "15" corresponding to the electrostatic capacitance, two signal values of "10" each corresponding to the electrostatic capacitance, two signal values of "7" each corresponding to the electrostatic capacitance, and six signal values of "5" each corresponding to the electrostatic capacitance.

If the touch detector SE1 uses the resistive film method, the signal value according to the contact in the region R1 is equal to the number of the touch detecting unit regions U, "11", in the region R1.

The signal value, such as the signal value of "15" corresponding to the electrostatic capacitance or the signal value of "10" corresponding to the electrostatic capacitance, may represent a value of an added capacitance, or may represent a current flowing in the electrostatic capacitance (corresponding to the current $I_2$ of FIG. 4) added by the detection target object OBJ1, or a voltage (corresponding to the voltage ($V_0$-$V_1$) of FIG. 5 or the voltage ($|\Delta V|=V_5-V_4$) of FIG. 12). Alternatively, a value detected by the touch detector SE1 may be converted into a corresponding value, for example, in the following manner: The signal value is set to "1" corresponding to the electrostatic capacitance if the current detected by the touch detector SE1 is from a ampere to b ampere, or the signal value is set to "2" corresponding to the electrostatic capacitance if the current detected is from b ampere to compare.

The controller CTRL can count the sum of the signal values corresponding to the electrostatic capacitances in the region R1 as "79", and can count the number of the touch detecting unit regions U in the region R1 as "11". Accordingly, the controller CTRL can calculate the average value of the signal values each corresponding to the electrostatic capacitance per one touch detecting unit region U in the region R1 as "7.19".

A region R2 in the force detecting unit region R is a region where the detection target object OBJ2 is in contact with the input surface IS. The detection target object OBJ2 is the first type object that is deformed upon contact with the input surface IS. Examples of the first type object include the finger.

When the detection target object OBJ2 is the first type object, the contact area between the detection target object OBJ2 and the input surface IS increases with increase in the force applied by the detection target object OBJ2 to press the input surface IS. That is, the force applied by the detection target object OBJ2 to press the input surface IS correlates with the contact area between the detection target object OBJ2 and the input surface IS.

In the example illustrated in FIG. 29, the controller CTRL can count the number of the touch detecting unit regions U in the region R2 as "8". The controller CTRL can calculate the actual contact area between the detection target object OBJ2 and the input surface IS by multiplying "8" by the area per one touch detecting unit region U.

When the detection target object OBJ2 is the first type object, the electrostatic capacitance between the detection target object OBJ2 and the touch detection electrodes TDL increases with increase in the force applied by the detection target object OBJ2 to press the input surface IS. That is, the force applied by the detection target object OBJ2 to press the input surface IS correlates with the electrostatic capacitance between the detection target object OBJ2 and the touch detection electrodes TDL.

In the example illustrated in FIG. 29, the controller CTRL can perform counting such that the region R2 includes two of the touch detecting unit regions U each having a signal value "10" corresponding to the electrostatic capacitance therein and six of the touch detecting unit regions U each having a signal value "5" corresponding to the electrostatic capacitance therein.

If the touch detector SE1 uses the mutual capacitance method or the self-capacitance method, the signal values according to the contact in the region R2 include two signal values of "10" each corresponding to the electrostatic capacitance and six signal values of "5" each corresponding to the electrostatic capacitance.

If the touch detector SE1 uses the resistive film method, the signal value according to the contact in the region R2 is equal to the number of the touch detecting unit regions U, "8", in the region R2.

The controller CTRL can count the sum of the signal values corresponding to the electrostatic capacitances in the region R2 as "50", and can count the number of the touch detecting unit regions U in the region R2 as "8". Accordingly, the controller CTRL can calculate the average value of the signal values each corresponding to the electrostatic capacitance per one touch detecting unit region U in the region R2 as "6.25".

When the detection target object OBJ1 is the first type object, the force applied by the detection target object OBJ1 to press the input surface IS correlates with the average value of the signal values corresponding to the electrostatic capacitances in the region R1. In the same manner, when the detection target object OBJ2 is the first type object, the force applied by the detection target object OBJ2 to press the input surface IS correlates with the average value of the signal values corresponding to the electrostatic capacitances in the region R2. Therefore, in the example illustrated in FIG. 29, the force applied by the detection target object OBJ1 to press the input surface IS is larger than the force applied by the detection target object OBJ2 to press the input surface IS.

Assume that the force detector SE2 has detected a signal value "134" corresponding to forces applied by the detection target objects OBJ1 and OBJ2 to the entire force detecting unit region R. In that case, based on the average value "7.19" of the signal values corresponding to the electrostatic capacitances in the region R1 and the average value "6.25" of the signal values corresponding to the electrostatic capacitances in the region R2, the controller CTRL proportionally distributes the signal value "134" corresponding to the forces detected by the force detector SE2 between the regions R1 and R2. As a result, the controller CTRL can calculate the signal value corresponding to the force applied by the detection target object OBJ1 to press the input surface IS as "72" and the signal value corresponding to the force applied by the detection target object OBJ2 to press the input surface IS as "62".

Although the average value of the signal values (touch detection signal values) corresponding the electrostatic capacitances in the region R1 is simply obtained in the present embodiment, the present invention is not limited to this method. For example, touch detection signals having a certain value or lower may be determined to be noise, and regions corresponding to such signal values may be removed from the region R1. A weighted calculation may be performed according to the touch detection signal values or a distribution of the touch detection signal values. For example, the following may be performed: Touch detecting unit regions with the touch detection signal values equal to or larger than a certain threshold are each treated as one unit region; touch detecting unit regions with the touch detection signal values smaller than the certain threshold are each treated as a 0.8 unit region, and the signal values of such regions are increased by 1.25 times; and, an average value for one unit region of each of the regions R1 and R2 is calculated.

If the touch detector SE1 uses the resistive film method, and the distance in the Z-direction between electrodes is constant, the touch detector SE1 cannot detect the signal values that vary between the touch detecting unit regions U, so that the signal values of all the touch detecting unit regions U in the R1 and R2 have the same value. A plurality of distances in the Z-direction between electrodes may be provided in one touch detecting unit region U so as to be capable of obtaining touch detection signals that vary corresponding to the force. In this case, the touch detection signal values change with the force regardless of whether the detection target object is the first type object or the second type object. However, while the area of the touch detecting unit regions U where the touch detection signals are detected changes if the detection target object is the first type object, the area of the touch detecting unit regions U where the touch detection signals are detected does not change if the detection target object is the second type object.

In this case, based on the number of the touch detecting unit regions U in the region R1, i.e., a signal value corresponding to the area of the region R1, and on the number of the touch detecting unit regions U in the region R2, i.e., a signal value corresponding to the area of the region R2, the controller CTRL proportionally distributes the signal value corresponding to the forces detected by the force detector SE2 between the regions R1 and R2. As a result, the controller CTRL can calculate the signal value corresponding to the force applied by the detection target object OBJ1 to press the input surface IS and the signal value corresponding to the force applied by the detection target object OBJ2 to press the input surface IS.

Figure 30:
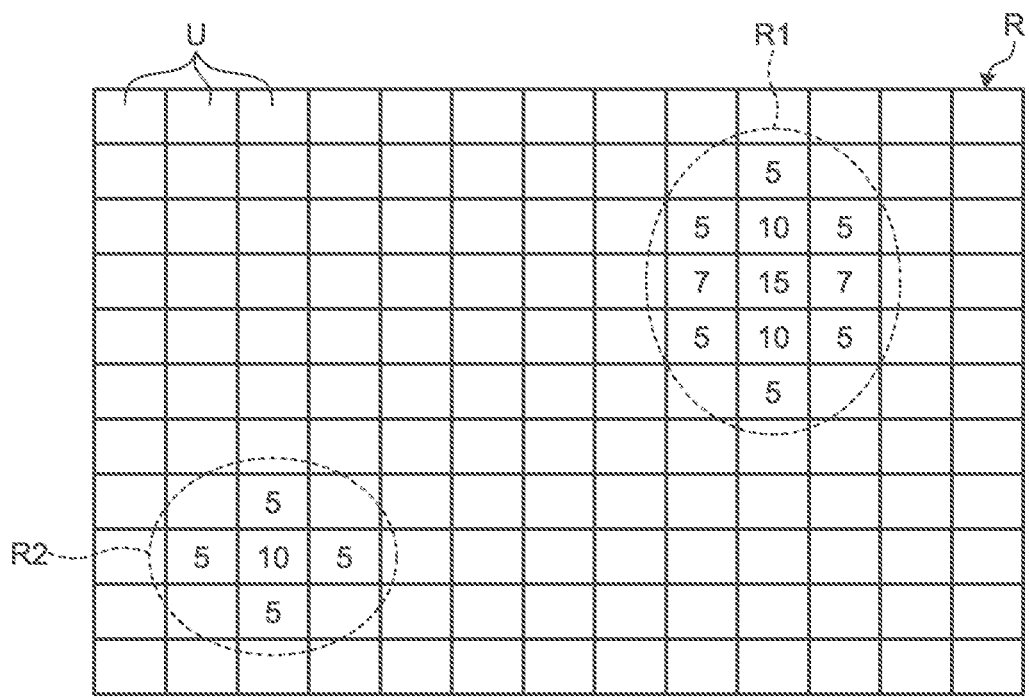
FIG. 30 is a diagram illustrating the force detecting unit, region of the force detector.

FIG. 30 is a diagram illustrating the force detecting unit region of the force detector. The region R2 in the force detecting unit region R is a region where the detection target object OBJ2 is in contact with the input surface IS. The detection target object OBJ2 is the second type object that is not deformed, or is deformed by a relatively smaller amount than the first type object, upon contact with the input surface IS. Examples of the second type object include the stylus pen of a resin or a metal.

The values corresponding to the electrostatic capacitances in the region R2 in contact with the second type object represent relative values corresponding to the currents or the voltages detected, in the same manner as the values corresponding to the electrostatic capacitances in the region R1 in contact with the first type object. The relative values in the case of the contact with the first type object may differ from the relative values in the case of the contact with the second type object. For example, in the case of the contact with the first type object, if the current detected by the couch detector SE1 is from a ampere to b ampere, the current may be converted into a signal value "1" corresponding to the electrostatic capacitance; or in the case of the contact with the second type object, if the current detected by the touch detector SE1 is from 2a ampere to 2b ampere, the current may be converted into a signal value "1" corresponding to the electrostatic capacitance.

When the detection target object OBJ2 is the second type object, even if the force applied from the detection target object OBJ2 to press the input surface IS increases, the contact area between the detection target object OBJ2 and the input surface IS does not increase, or increases by a relatively smaller amount than in the case of the first type object. That is, the correlation between the force applied by the detection target object OBJ2 to press the input surface IS and the contact area between the detection target object OBJ2 and the input surface IS differs from the correlation therebetween obtained when the detection target object OBJ2 is the first type object.

When the detection target object OBJ2 is the second type object, even if the force applied from the detection target object OBJ2 to press the input surface IS increases, the electrostatic capacitance between the detection target object OBJ2 and the touch detection electrodes TDL does not increase, or increases by a relatively smaller amount than in the case of the first type object. That is, the correlation between the force applied by the detection target object OBJ2 to press the input surface IS and the electrostatic capacitance between the detection target object OBJ2 and the touch detection electrodes TDL differs from the correlation therebetween obtained when the detection target object OBJ2 is the first type object.

Therefore, if the detection target object OBJ2 is the second type object in FIG. 30, the controller CTRL cannot appropriately calculate the signal value corresponding to the force applied by the detection target object OBJ1 to press the input surface IS and the signal value corresponding to the force applied by the detection target object OBJ2 to press the input surface IS by proportionally distributing the signal value corresponding to the forces detected by the force detector SE2 between the regions R1 and R2, based on the average value of the signal values corresponding to the electrostatic capacitances in the region R1 or the signal value corresponding to the area of the region R1, and on the average value of the signal values corresponding to the electrostatic capacitances in the region R2 or the signal value corresponding to the area of the region R2.

The controller CTRL performs processing described below so as to be able to appropriately calculate the signal value corresponding to the force applied by the detection target object OBJ1 to press the input surface IS and the signal value corresponding to the force applied by the detection target object OBJ2 to press the input surface IS even if the detection target object OBJ2 is the second type object.

Figure 31:
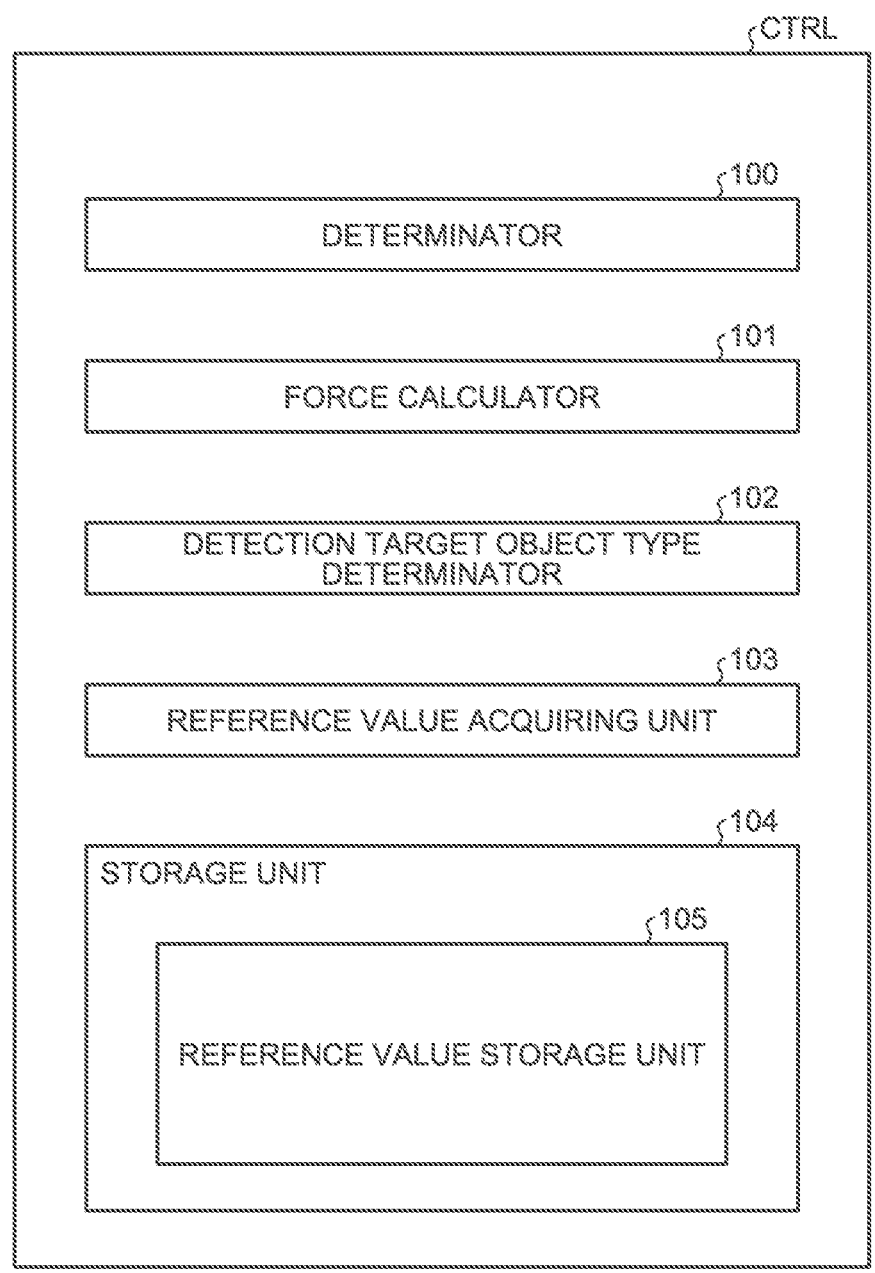
FIG. 31 is a diagram illustrating functional blocks of a controller.

FIG. 31 is a diagram illustrating functional blocks of the controller. The controller CTRL includes a determinator 100, a force calculator 101, a detection target object type determinator 102, a reference value acquiring unit 103, and a storage unit 104. The storage unit 104 includes a reference value storage unit 105.

The determinator 100, the force calculator 101, the detection target object type determinator 102, and the reference value acquiring unit 103 are implemented by execution of a program by the COG 19, the touch IC 49, or the host HST.

Alternatively, the determinator 100, the force calculator 101, the detection target object type determinator 102, and the reference value acquiring unit 103 are implemented by cooperative execution of programs by two or more of the COG 19, the touch IC 49, and the host HST.

The determinator 100 determines whether a touch made is a multiple touch or a single touch, that is, whether a plurality of contact objects are present or only one contact object is present.

The force calculator 101 calculates at least one third signal value corresponding to at least one second force applied by at least one of the detection target objects to press at least, one second region, based on a plurality of first signal values corresponding to the contact of the detection target objects with a plurality of first regions, at least one second signal value corresponding to at least one first force applied by the detection target objects to press at least one second region corresponding to the first regions, and at least one reference value corresponding to a third force per at least one of the plurality of first signal values detected from at least one of the first regions.

Eased on the signal values corresponding to the contact on the respective regions where the detection target objects are in contact with the input surface IS, the detection target object type determinator 102 determines whether the detection target objects are objects of different types.

The reference value acquiring unit 103 acquires the reference values for respective types of the detection target objects, each of the reference values corresponding to a change in the signal value generated by the force.

Examples of the storage unit 104 include a volatile memory and a nonvolatile memory. Examples of the volatile memory include a random access memory (RAM). Examples of the nonvolatile memory include a flash memory (registered trademark).

The reference value storage unit 105 stores the reference values used for calculation of at least one third signal value corresponding to at least one second force applied by at least one of the detection target objects to press at least one second region. Each of the reference values corresponds to a signal value corresponding to a force per signal value according to the contact on each of the regions when the touch detector SE1 detects the detection target object OBJ1 or OBJ2.

The reference value corresponds to a signal value corresponding to a force per average value of the electrostatic capacitances in the region R1 or the region R2 if the touch detector SE1 uses the mutual capacitance method or the self-capacitance method. The reference value corresponds to a signal value corresponding to a force per one area in the region R1 or the region R2 if the touch detector SE1 uses the resistive film method.

Figure 32:
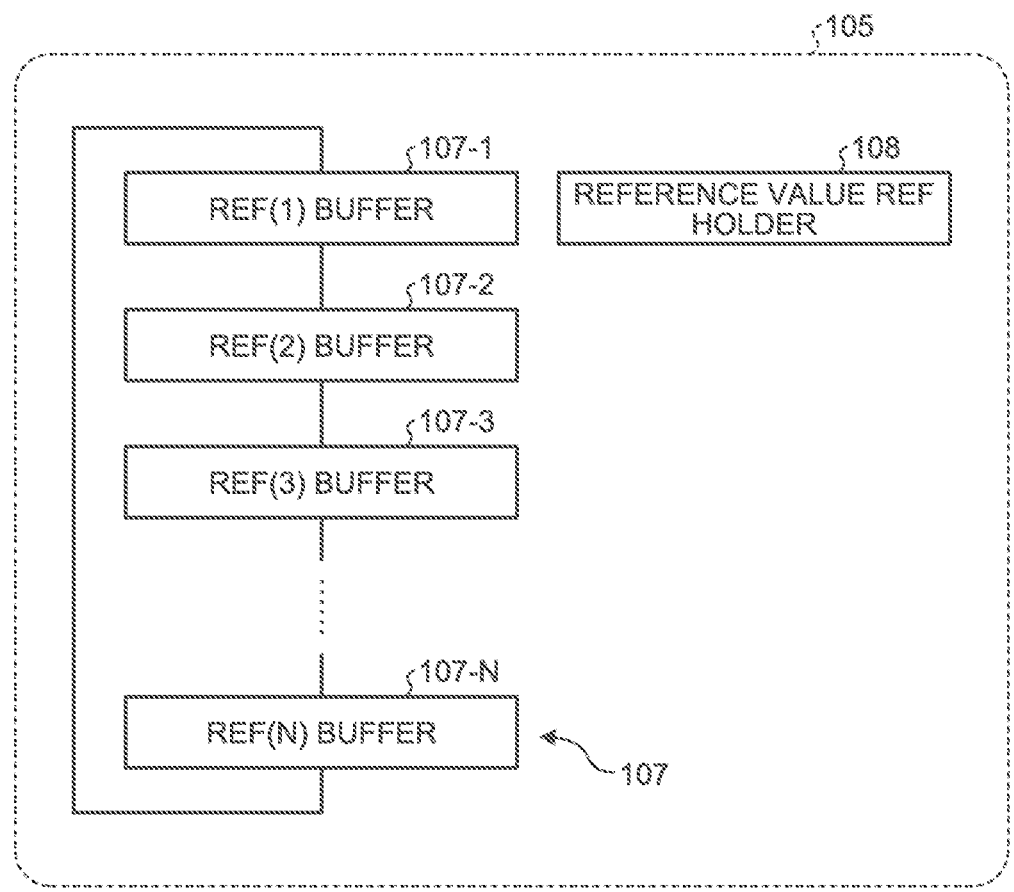
FIG. 32 is a diagram illustrating a first example of a reference value storage unit.

FIG. 32 is a diagram illustrating a first example of the reference value storage unit. The reference value storage unit 105 includes a ring buffer 107 and a reference value REF holder 106. The ring buffer 107 includes N buffers, i.e., REF(1) buffer 107-1 to REF(N) buffer 107-N. The number of references N is a positive constant set in advance. In the present embodiment, the number of references N is set to "3".

If the touch detector SE1 uses the mutual capacitance method or the self-capacitance method, the reference value acquiring unit 103 sequentially stores the signal values each corresponding to the force per average value of the electrostatic capacitances in the region R1 or the region R2 into the REF(1) buffer 107-1 to the REF(N) buffer 107-N in the reference value storage unit 105.

After the signal values each corresponding to the force per average value of the electrostatic capacitances in the region R1 or the region R2 have been stored into the buffers up to the REF(N) buffer 107-N in the reference value storage unit 105, at the next acquisition time of the reference value, the reference value acquiring unit 103 stores the signal value corresponding to the force per average value of the electrostatic capacitances in the region R1 or the region R2 into a buffer storing the oldest signal value, i.e., the REF(1) buffer 107-1.

If the touch detector SE1 uses the resistive film method, the reference value acquiring unit 103 sequentially stores the signal values each corresponding to the force per one area in the region R1 or the region R2 into the REF(1) buffer 107-1 to the REF(N) buffer 107-N in the reference value storage unit 105.

After the signal values each corresponding to the force per one area in the region R1 or the region R2 have beer, stored into the buffers op to the REF(N) buffer 107-N in the reference value storage unit 105, at the next acquisition time of the reference value, the reference value acquiring unit 103 stores the signal value corresponding to the force per one area in the region R1 or the region R2 into a buffer storing the oldest signal value, i.e., the REF(1) buffer 107-1.

The reference value acquiring unit 103 uses Expression (1) below to calculate a reference value REF, and stores the result into the reference value REF holder 108.

$$REF = (REF(1) + REF(2) + \ldots + REF(N))/N \quad (1)$$

Instead of being calculated by the reference value acquiring unit 103, the reference value REF may be predetermined and stored in the reference value REF holder 108 in advance, and may be acquired from the reference value REF holder 108. In this case, the ring buffer 107 is not needed.

Figure 33:
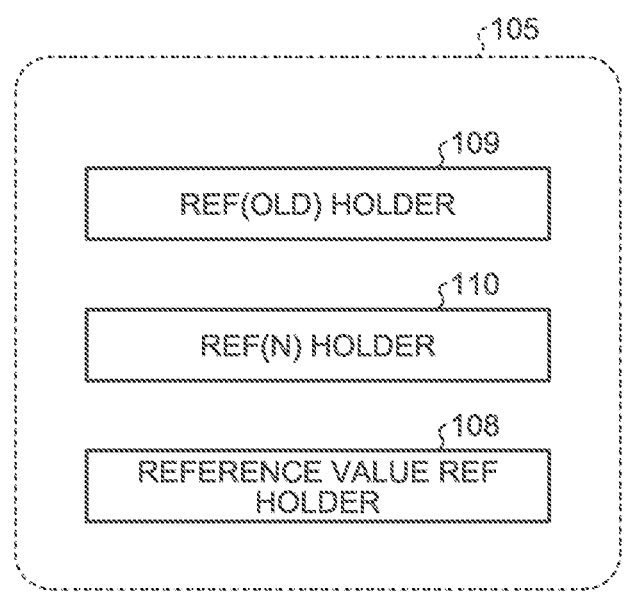
FIG. 33 is a diagram illustrating a second example of the reference value storage unit.

FIG. 33 is a diagram illustrating a second example of the reference value storage unit. The reference value storage unit 105 includes a REF(OLD) holder 105, a REF(N) holder 110, and the reference value REF holder 108.

If the touch detector SE1 uses the mutual capacitance method or the self-capacitance method, the reference value acquiring unit 103 stores the signal values each corresponding to the force per average value of the electrostatic capacitances in the region R1 or the region R2 into the REF(N) holder 110 of the reference value storage unit 105.

If the touch detector SE1 uses the resistive film method, the reference value acquiring unit 103 stores the signal values each corresponding to the force per one area in the region R1 or the region R2 into the REF(N) holder 110 of the reference value storage unit 105.

The REF(OLD) holder 109 stores signal values each corresponding to the force that nave been obtained before the signal values each corresponding to the force read from the reference value REF holder 108 and stored in the REF(N) holder 110. The reference value acquiring unit 103 uses Expression (2) below to calculate the reference value REF, and stores the result into the reference value REF holder 108.

$$REF = REF(OLD)*(1-\alpha) + REF(N)*\alpha \quad (2)$$

In Expression (2), α satisfies 0<α<1. The value of α may be a predetermined constant value. The value of α may be variable. For example, an α-value switching controller may be provided so as to set α to a relatively higher value if the noise detector 51 determines that the noise is high, or to set α to a relatively lower value if the noise is determined to be low.

That is to say, the reference value acquiring unit 103 calculates the reference value REF using an infinite impulse response (IIR). The reference value acquiring unit 103 may calculate the reference value REF by calculating a progressive average.

The reference value storage unit 10S may include a reset unit for resetting the reference value held in the reference value REF holder 108. For example, the reset unit may reset the reference value when the frequency of the touch signal is changed, or when the touch detection signal starts to be output. By this operation, even if the noise generated in the touch detection signal has changed with a change in a use environment, for example, a more appropriate reference value can be acquired in the environment.

Instead of calculating the reference value REF, the reference value acquiring unit 103 may store in advance a predetermined reference value into the reference value REF holder 108, and may acquire the reference value from the reference value REF holder 108.

Figure 34:
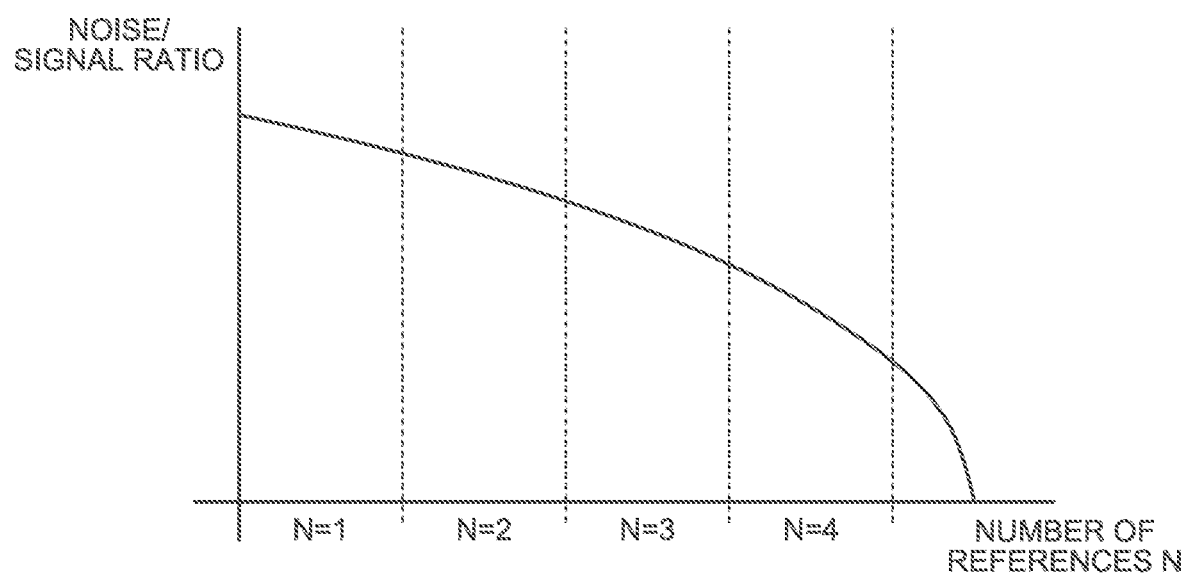
FIG. 34 is a diagram illustrating a relation between the number of references and a noise/signal ratio.

FIG. 34 is a diagram illustrating a relation between the number of references and a noise/signal ratio. As illustrated in FIG. 34, the number of references N is a number of times the reference value is calculated, and is a positive constant set in advance. The noise/signal ratio decreases with increase in the number of references N. That is, the increase in the number of references N can reduce the influence of the noise, and thus enables appropriate calculation of the force applied by each of the detection target objects OBJ1 and OBJ2 to press the input surface IS. For example, a more appropriate calculation is enabled when the number of references N is four or more.

Figure 35:
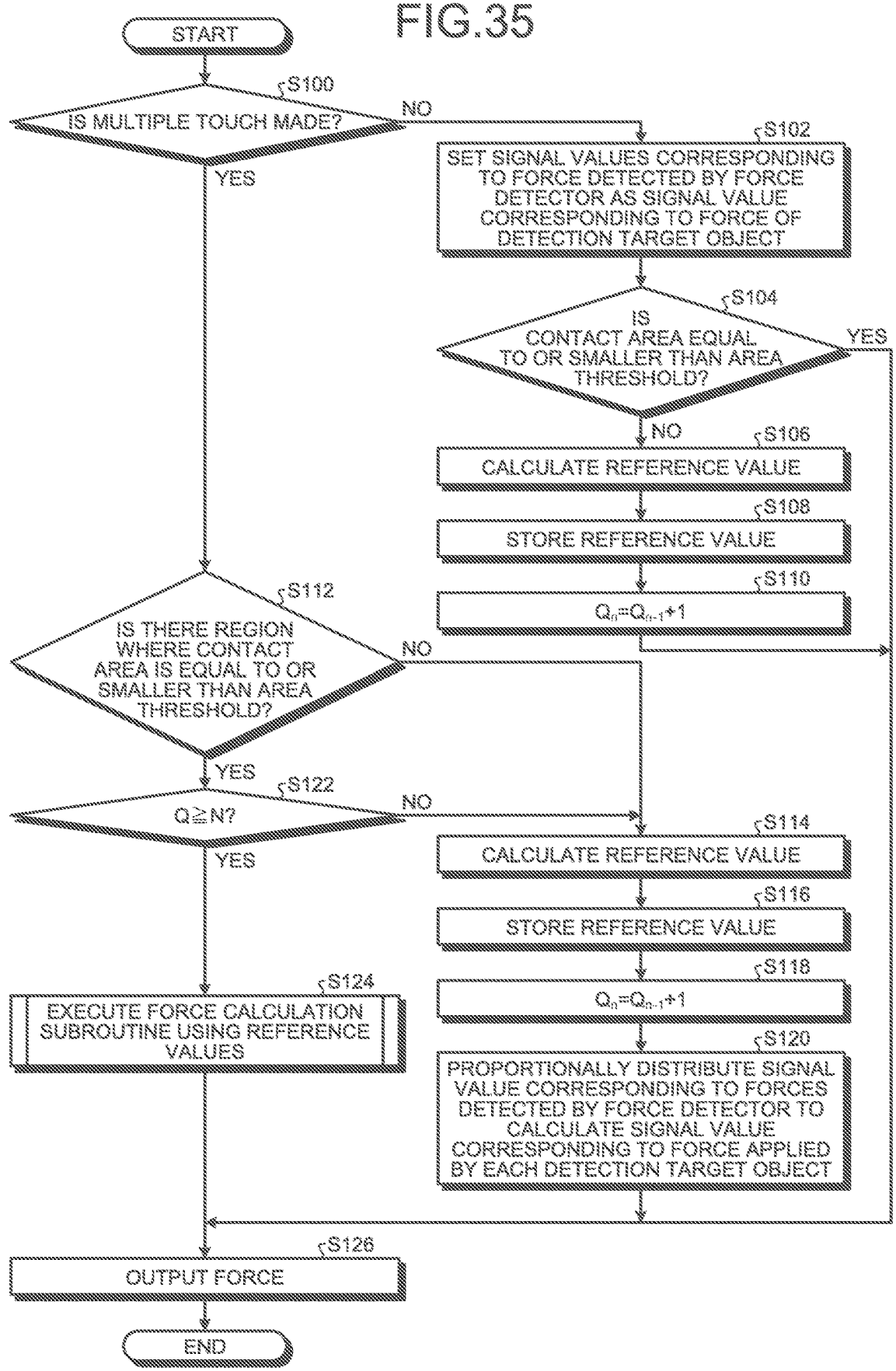
FIG. 35 is a flowchart illustrating processing executed by the controller.

FIG. 35 is a flowchart illustrating processing executed by the controller. In the configuration example of the force detector SE2 illustrated in FIG. 26, the force detector SE2 has one force detecting unit region. When the force detector SE2 has one force detecting unit region, the controller CTRL repeatedly performs the processing illustrated in FIG. 35 on the force detecting unit region at constant intervals of time.

In the configuration example of the force detector SE2 illustrated in FIG. 17 or 18, the force detector SE2 has a plurality of force detecting unit regions. When the force detector SE2 has a plurality of force detecting unit regions, the controller CTRL repeatedly performs the processing illustrated in FIG. 35 on each of the force detecting unit regions at constant intervals of time.

At Step S100, the determinator 100 determines whether a touch made is a multiple touch or a single touch, that is, whether a plurality of contact objects are present or only one contact object is present. In other words the determinator 100 determines whether signal values are detected in a plurality of regions. If the determinator 100 determines that the touch made is not a multiple touch, i.e., only one contact object is present (No at Step S100), the process goes to Step S102. If the determinator 100 determines that the touch made is a multiple touch (Yes at Step S100), the process goes to Step S112.

At Step S102, the force calculator 101 sets the signal values corresponding to the forces detected by the force detector SE2 as the signal values corresponding to the forces of one detection target object.

At Step S104, the detection target object type determinator 102 determines whether the contact area between the detection target object and the input surface IS is equal to or smaller than a predetermined area threshold.

In general, the contact area between the second type object, exemplified by the stylus pen, and the input surface IS is smaller than the contact area between the first type object, exemplified by the finger, and the input surface IS. Therefore, the detection target object type determinator 102 can determine whether the detection target object is the second type object by determining whether the contact area between the detection target object and the input surface IS is equal to or smaller than the predetermined area threshold.

The detection target object type determinator 102 determining whether the detection target object is the second type object by determining whether the contact area between the detection target object and the input surface IS is equal to or smaller than the predetermined area threshold is merely an example. The way of the determination is not limited to this example. The detection target object type determinator 102 may perform the processing illustrated in FIG. 35 a plurality of times, for example, and then may determine that the detection target object is the second type object if amounts of change in signal values corresponding to the electrostatic capacitances of the touch detecting unit regions U in the region where the detection target object is in contact with the input surface IS are equal to or smaller than a predetermined change amount threshold. In the present embodiment, the area threshold is set to "5".

If the detection target object type determinator 102 determines that the contact area between the detection target object and the input surface IS is not equal to or smaller than the predetermined area threshold (No at Step S104), the process goes to Step S106. If the detection target object type determinator 102 determines that the contact area between the detection target object and the input surface IS is equal to or smaller than the predetermined area threshold (Yes at Step S104), the process goes to Step S126.

At Step S106, the reference value acquiring unit 103 calculates the signal values each corresponding to the force per average value of the electrostatic capacitances in the region where the detection target object is in contact with the input surface IS or the signal values each corresponding to the force per one area in the region where the detection target object is in contact with the input surface IS, and calculates the reference value REF using Expression (1) or (2) given above.

At Step S108, the reference value acquiring unit 103 stores the reference value REF into the reference value REF holder 103.

At Step S110, the reference value acquiring unit 103 increments by one the number of acquired references Q that is the number of times of acquisition of the signal values, based on which the reference value REF is calculated. The reference value acquiring unit 103 then shifts the process to Step S126.

Consequently, when the touch made is a single touch, the reference value acquiring unit 103 calculates the reference value REF if the detection target object is the first type object.

However, when the touch made is a single touch, the reference value acquiring unit 103 does not calculate the reference value REF if the detection target object is the second type object. The reason for this will be described below.

If the detection target object is the second type object, the signal values each corresponding to the force per average value of the electrostatic capacitances in the region where the detection target object is in contact with the input surface IS or the signal values each corresponding to the force per one area in the region where the detection target object is in contact with the input surface IS do not change or change by a relatively smaller amount than in the case of the first type object, corresponding to the force applied by the detection target object to press the input surface IS. Consequently, if the touch made is a single touch and the detection target object is the second type object, the reference value acquiring unit 103 cannot appropriately obtain the signal values each corresponding to the force per average value of the electrostatic capacitances in the region where the detection target object is in contact with the input surface IS or the signal values each corresponding to the force per one area is in the region where the detection target object is in contact with the input surface IS, and cannot obtain the appropriate reference value REF.

If the determinator 100 determines that the touch made is a multiple touch (Yes at Step S100), the detection target object type determinator 102 determines at Step S112 whether there is a region where the contact area between the detection target object OBJ1 or OBJ2 and the input surface IS is equal to or smaller than the predetermined area threshold, i.e., whether the detection target object OBJ1 or OBJ2 is the second type object.

If the detection target object type determinator 102 determines that there is no region where the contact area between the detection target object OBJ1 or OBJ2 and the input surface IS is equal to or smaller than the predetermined area threshold, i.e., the detection target objects OBJ1 and OBJ2 are the first type objects (No at Step S112), the process goes to Step S114. If the detection target object type determinator 102 determines that, there is the region where the contact area between the detection target object OBJ1 or OBJ2 and the input surface IS is equal to or smaller than the predetermined area threshold, i.e., the detection target object OBJ1 or OBJ2 is the second type object (Yes at Step S312), the process goes to Step S122.

At Step S114, the reference value acquiring unit 103 calculates the signal values each corresponding to the force per average value of the electrostatic capacitances in the region where each of the detection target objects OBJ1 and OBJ2 is in contact with the input surface IS or the signal values each corresponding to the force per one area in the region where each of the detection target objects OBJ1 and OBJ2 is in contact with the input surface IS, and calculates the reference value REF using Expression (1) or (2) given above.

At Step S116, the reference value acquiring unit 103 stores a plurality of such reference values REF into the reference value REF holder 108.

At Step S118, the reference value acquiring unit 103 increments by one the number of acquired references Q. The reference value acquiring unit 103 then shifts the process to Step S120.

At Step S120, based on the average value of the signal values corresponding to the electrostatic capacitances in the region R1 where the detection target object OBJ1 is in contact with the input surface IS or the signal value corresponding to the area of the region R1, and on the average value of the signal values corresponding to the electrostatic capacitances in the region R2 where the detection target object OBJ2 is in contact with the input surface IS or the signal value corresponding to the area of the region R2, the force calculator 101 proportionally distributes the signal value corresponding to the forces detected by the force detector SE2 between the regions R1 and R2 to calculate the signal value corresponding to the force applied by the detection target object OBJ1 to press the input surface IS and the signal value corresponding to the force applied by the detection target object OBJ2 to press the input surface IS.

If the detection target object type determinator 102 determines that there is the region where the contact area between the detection target object OBJ1 or OBJ2 and the input surface IS is equal to or smaller than the area threshold, i.e., the detection target object OBJ1 or OBJ2 is the second type object (Yes at Step S112), the force calculator 101 determines at Step S122 whether the number of acquired references Q is equal to or larger than the predetermined number of references N. If the force calculator 101 determines that the number of acquired references Q is equal to or larger than the predetermined number of references N (Yes at Step S122), the process goes to Step S124. If the force calculator 101 determines that the number of acquired references Q is not equal to or larger than the predetermined number of references N (No at Step S122), the process goes to Step S114.

If the force calculator 101 determines that the number of acquired references Q is not equal to or larger than the predetermined number of references N (No at Step S122), the processing from Step S114 to Step S120 described above are performed. Thus, based on the average value of the signal values corresponding to the electrostatic capacitances in the region R1 where the detection target object OBJ1 is in contact with the input surface IS or the signal value corresponding to the area of the region R1, and on the average value of the signal values corresponding to the electrostatic capacitances in the region R2 where the detection target object OBJ2 is in contact with the input surface IS or the signal value corresponding to the area of the region R2, the force calculator 101 proportionally distributes the signal value corresponding to the forces detected by the force detector SE2 between the regions PI and R2 to calculate the signal value corresponding to the force applied by the detection target object OBJ1 to press the input surface IS and the signal value corresponding to the force applied by the detection target object OBJ2 to press the input surface IS. The reason for this will be described below.

As illustrated in FIG. 34, the noise/signal ratio increases with decrease in the number of times of acquisition of the reference value. That is, if the number of acquired references Q is not equal to or larger than the predetermined number of references N (No at Step S122), the reference values PEP include large noise. Therefore, a force value with little noise can be obtained by calculating the force based on the signal value corresponding to the average value according to the area or the electrostatic capacitance of each of the detection target objects, without using the reference values REF including large noise.

At Step S124, the force calculator 101 executes a force calculation subroutine that uses the reference values REF to calculate the signal value corresponding to the force applied by the detection target object OBJ1 to press the input surface IS and the signal value corresponding to the force applied by the detection target object OBJ2 to press the input surface IS. The reason for this will be described below.

As illustrated in FIG. 34, the noise/signal ratio decreases with increase in the number of times of acquisition of the reference value. Therefore, if the number of acquired references Q is equal to or larger than the predetermined number of references M (Yes at Step S122), the reference values REF include little noise, and consequently, the force calculator 101 can appropriately calculate the signal value corresponding to the force applied by the detection target object OBJ1 to press the input surface IS and the signal value corresponding to the force applied by the detection target object OBJ2 to press the input surface IS, using the reference values REF.

Figure 36:
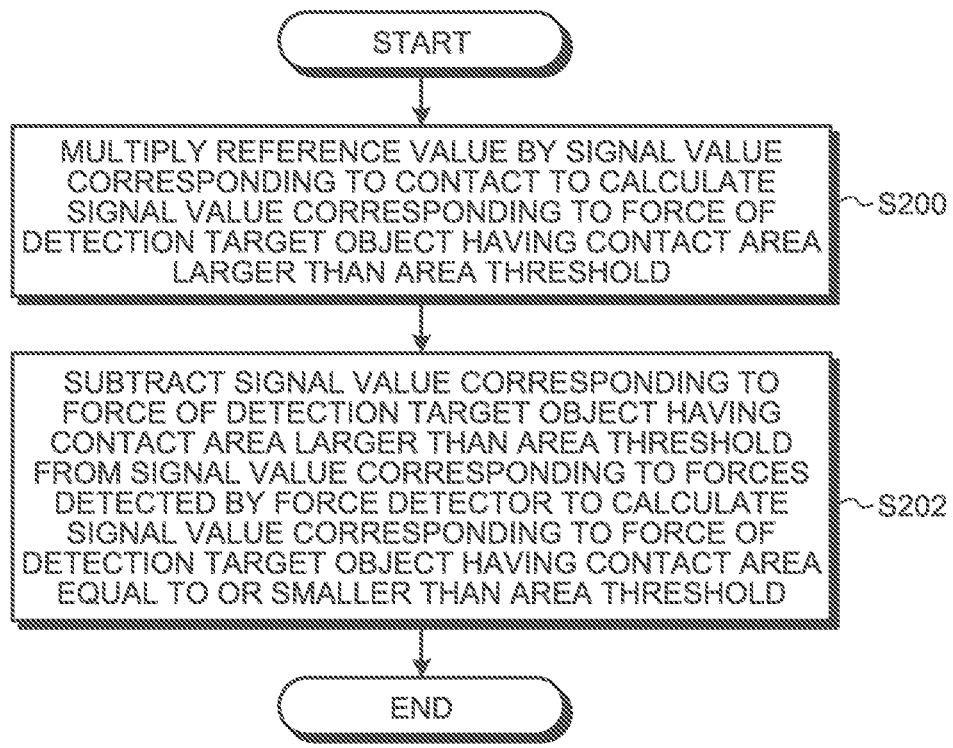
FIG. 36 is a flowchart illustrating the processing executed by the controller.

FIG. 36 is a flowchart illustrating the processing executed by the controller. FIG. 36 is the flowchart illustrating the force calculation subroutine of FIG. 35.

At Step S200, the force calculator 101 multiplies the reference value REF by the average value of the electrostatic capacitances in a region having a contact area larger than the area threshold or the area to calculate the signal value corresponding to the force of the detection target object having a contact area larger than the area threshold. In other words, the force calculator 101 calculates the signal value corresponding to the force of the first type detection target object based on the reference value REF corresponding to the first type detection target object.

At Step S202, the force calculator 201 subtracts the signal value corresponding to the force of the detection target object having a contact area larger than the area threshold from the signal value corresponding to the forces detected by the force detector SE2 to calculate the signal value corresponding to the force of the detection target object having a contact area equal to or smaller than the area threshold, and ends the force calculation subroutine.

Referring again to FIG. 35, at Step S126, the controller CTRL outputs the signal value corresponding to the force applied by each of the detection target objects OBJ1 and OBJ2 to press the input surface IS, and ends the process.

The following describes, by way of a specific example, the calculation of the signal value corresponding to the force applied by each of the detection target objects OBJ1 and OBJ2 to press the input surface IS.

Figure 37:
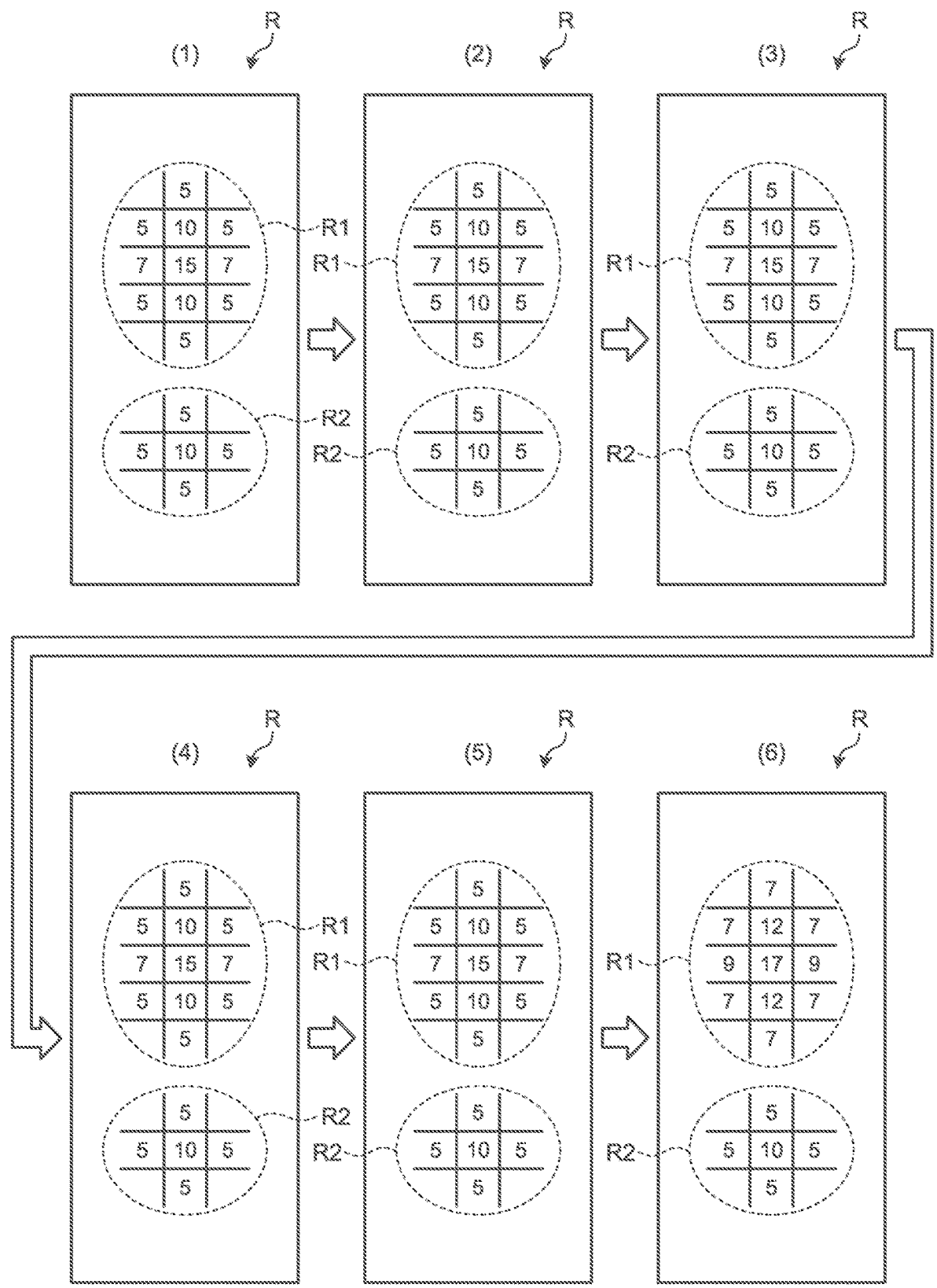
FIG. 37 is a diagram illustrating the force detecting unit, region in a time series.

FIG. 37 is a diagram illustrating the force detecting unit region in a time series. Assume that, in FIG. 37, the region R1 corresponds to the contact area between the detection target object OBJ1 serving as the first type object and the input surface IS, and the region R2 corresponds to the contact area between the detection target object OBJ2 serving as the second type object and the input surface IS. The region R1 corresponds to a first object region in the present disclosure. The region R2 corresponds to a second object region in the present disclosure.

Assume that, in FIG. 37(1) illustrating first processing time, the force detector SE2 detects a signal value "130" corresponding to forces applied to the force detecting unit region R. The force applied by the detection objects OBJ1 and OBJ2 represented by the signal value "130" corresponds to the first force in the present disclosure.

In FIG. 37(1) illustrating the first processing time, the number of the touch detecting unit regions U in the region PI is "11". The region R1 includes one of the touch detecting unit regions U having a signal value "15" corresponding to the electrostatic capacitance therein, two of the touch detecting unit regions U each having a signal value "10" corresponding to the electrostatic capacitance therein, two of the touch detecting unit regions U each having a signal value "7" corresponding to the electrostatic capacitance therein, and six of the touch detecting unit regions U each having a signal value "5". The average value of the signal values corresponding to the electrostatic capacitances in the region R1 is "7.19".

In FIG. 37(1) illustrating the first processing time, the number of the touch detecting unit regions U in the region R2 is "5". The region R2 includes one of the touch detecting unit regions U having signal value "10" corresponding to the electrostatic capacitance therein and four of the touch detecting unit regions U each having a signal value "5" corresponding to the electrostatic capacitance therein. The average value of the signal values corresponding to the electrostatic capacitances in the region R2 is "6".

In FIG. 37(1) illustrating the first processing time, the touch made is a multiple touch (Yes at Step S100), there is the region R2 where the contact area is equal to or smaller than the area threshold (Yes at Step S112), and the number of acquired references Q (=0") is not equal to or larger than the number of references N (="3") (No at Step S122). Consequently, the reference value acquiring unit 103 calculates the reference value REF at Step S114.

Specifically, based on the average value "7.19" of the signal, values corresponding to the electrostatic capacitances in the region R1 and the average value "6" of the signal values corresponding to the electrostatic capacitances in the region R2, the reference value acquiring unit 103 proportionally distributes the signal value "130" corresponding to the forces detected by the force detector SE2 between the regions R1 and R2. As a result, the reference value acquiring unit 103 can calculate the signal value corresponding to the force applied by the detection target object OBJ1 to press the input surface IS as "70.9" and the signal value corresponding to the force applied by the detection target object OBJ2 to press the input surface IS as "59.1". The force applied by the detection target OBJ1 represented by the signal "70.9", and the force applied by the detection target OBJ2 represented by the signal "59.1" each correspond to the second force in the present disclosure.

Consequently, the reference value acquiring unit 103 stores, into the REF(1) buffer 107-1, a value "9.05" obtained by dividing the signal value "70.9" corresponding to the force applied by the detection target object OBJ1 to press the input surface IS by the average value "7.19" of the signal values corresponding to the electrostatic capacitances in the region R1. This value "9.65" corresponds to the signal value corresponding to the force per average value of the electrostatic capacitances in the region R1 in FIG. 37(1) illustrating the first processing rime. The force represented by the signal "9.85 corresponds to the third force in the present disclosure.

In FIG. 37(1) illustrating the first processing time, the reference value acquiring unit 103 stores the reference value RER (=9.85") calculated using Expression (1) or (2) into the reference value REF holder 108, at Step S116.

In FIG. 37(1) illustrating the first processing time, at Step S120, based on the average value "7.19" of the signal values corresponding to the electrostatic capacitances in the region R1 and on the average value "6" of the signal values corresponding to the electrostatic capacitances in the region R2, the force calculator 101 proportionally distributes the signal value "130" corresponding to the forces detected by the force detector SE2 between the regions R1 and R2 to calculate the signal value corresponding to the force applied by the detection target object OBJ1 to press the input surface IS as "70.9", and to calculate the signal value corresponding to the force applied by the detection target object OBJ2 to press the input surface IS as "59.1".

Assume that, in FIG. 37(2) illustrating second processing time, the force detector SE2 detects a signal value "130" corresponding to the forces applied to the force detecting unit region R.

In FIG. 37(2) illustrating the second processing time, the number of the touch detecting unit regions U and the signal value corresponding to the electrostatic capacitance in each of the respective touch detecting unit regions U in the region R1 are the same as those in FIG. 37(1) illustrating the first processing time. The number of the touch detecting unit regions U and the signal value corresponding to the electrostatic capacitance in each of the respective touch detecting unit regions U in the region R2 are the same as those in FIG. 37(1) illustrating the first processing time.

In FIG. 37(2) illustrating the second processing time, the touch made is a multiple touch (Yes at Step S100), there is the region R2 where the contact area is equal to or smaller than the area threshold (Yes at Step S112), and the number of acquired references Q (="1") is not equal to or larger than the number of references N (="3") (No at Step S122). Consequently, the reference value acquiring unit 103 stores the signal value "9.85" corresponding to the force per average value of the electrostatic capacitances in the region R1 at the second processing time into the REF(2) buffer 107-2, at Step S114.

In FIG. 37(2) illustrating the second processing time, the reference value acquiring unit 103 stores the reference value REF(="9.65") calculated using Expression (1) or (2) into the reference value REF holder 103, at Step S116.

In FIG. 37(2) illustrating the second processing time, at Step S120, based on the average value "7.19" of the signal values corresponding to the electrostatic capacitances in the region R1 and on the average value "6" of the signal values corresponding to the electrostatic capacitances in the region R2, the force calculator 101 proportionally distributes the signal value "130" corresponding to the forces detected by the force detector SE2 between the regions R1 and R2 to calculate the signal value corresponding to the force applied by the detection target object OBJ1 to press the input surface IS as "70.9, and to calculate the signal value corresponding to the force applied by the detection target object OBJ2 to press the input surface ZS as "59.1".

Assume that in FIG. 37(3) illustrating third processing time, the force detector SE2 detects a signal value "130" corresponding to the forces applied to the force detecting unit region R.

In FIG. 37(3) illustrating the third processing time, the number of the touch detecting unit regions U and the signal value corresponding to the electrostatic capacitance in each of the respective touch detecting unit regions U in the region R1 are the same as those in FIG. 37(1) illustrating the first processing time and FIG. 37(2) illustrating the second processing time. The number of the touch detecting unit regions U and the signal value corresponding to the electrostatic capacitance in each of the respective touch detecting unit regions U in the region R2 are the same as those in FIG. 37(1) illustrating the first processing time and FIG. 37(2) illustrating the second processing time.

In FIG. 37(3) illustrating the third processing time, the touch made is a multiple touch (Yes at Step S100), there is the region R2 where the contact area is equal to or smaller than the area threshold (Yes at Step S112), and the number of acquired references Q (="2") is not; equal to or larger than the number of references N (="3") (No at Step S122). Consequently, the reference value acquiring unit 103 stores the signal value "9.85" corresponding to the force per average value of the electrostatic capacitances in the region R1 at the third processing time into the REF(3) buffer 107-3, at Step S114.

In FIG. 37(3) illustrating the third processing time, the reference value acquiring unit 103 stores the reference value REF (="9.85") calculated using Expression (1) or (2) into the reference value REF holder 108, at Step S116.

In FIG. 37(3) illustrating the third processing time, at Step S120, based on the average value "7.19" of the signal values corresponding to the electrostatic capacitances in the region R1 and on the average value of the signal values corresponding to the electrostatic capacitances in the region R2, the force calculator 101 proportionally distributes the signal value "130" corresponding to the forces detected by the force detector SE2 between the regions R1 and R2 to calculate the signal value corresponding to the force applied by the detection target object OBJ1 to press the input surface IS as "70.9" and to calculate the signal value corresponding to the force applied by the detection target object OBJ2 to press the input surface IS as "59.1".

Assume that, in FIG. 37(4) illustrating fourth processing time, the force detector SE2 detects a signal value "150" corresponding to the forces applied to the force detecting unit region R.

In FIG. 37(4) illustrating the fourth processing time, the number of the touch detecting unit regions U and the signal value corresponding to the electrostatic capacitance in each of the respective touch detecting unit regions U in the region R1 are the same as those in FIG. 37(1) illustrating the first processing time to FIG. 37(3) illustrating the third processing time. The number of the touch detecting unit regions U and the signal value corresponding to the electrostatic capacitance in each of the respective touch detecting unit regions U in the region R2 are the same as those in FIG. 37(1) illustrating the first processing time to FIG. 37(3) illustrating the third processing time.

In FIG. 37(4) illustrating the fourth processing time/the touch made is a multiple touch (Yes at Step S100), there is the region R2 where the contact area is equal to or smaller than the area threshold (Yes at Step S112), and the number of acquired references Q (="3") is equal to or larger than the number of references N (m "3") (Yes at Step S122). Consequently, the force calculator 101 executes the force calculation subroutine using the reference values, at Step S124.

At Step S200, the force calculator 101 multiplies the reference value REF (="9.85") by the average value "7.19" of the signal values corresponding to the electrostatic capacitances in the region R1 to calculate the signal value corresponding to the force applied by the detection target, object OBJ1 to press the input surface IS as "70.9".

At Step S202, the force calculator 101 subtracts the signal value "70.9" corresponding to the force applied by the detection target object OBJ1 to press the input surface IS from the signal value "150" corresponding to the forces detected by the force detector SE2 to calculate the signal value corresponding to the force applied by the detection target object OBJ2 to press the input surface IS as "79.1".

By comparing FIGS. 37(1) to 37(3) with FIG. 37(4), the signal values corresponding to the electrostatic capacitances in the region R1 nave not changed, but the signal value corresponding to the forces detected by the force detector SE2 has increased from "130" to "150". Accordingly, the amount of increase "20" in the signal value corresponding to the forces detected by the force detector SE2 can be considered to be the amount of increase in the signal value corresponding to the force applied by the detection target object OBJ2 serving as the first type object to press the input surface IS.

As described above, in the present embodiment, the force calculator 101 calculates the signal value corresponding to the force applied by the detection target object OBJ2 to press the input, surface IS as "79.1" in FIG. 37(4). Since the signal value corresponding to the force applied by the detection target object OBJ2 to press the input surface IS has been calculated as "59.1" in FIGS. 37(1) to 37(3), the amount of increase in the signal value corresponding to the force applied by the detection target object OBJ2 to press the input surface IS is "20". That is, the force calculator 101 can calculate the amount of increase "20" in the signal value corresponding to the forces detected by the force detector SE2 as the amount of increase in the signal value corresponding to the force applied by the detection target object OBJ2 to press the input surface IS.

Assume that, in FIG. 37(5) illustrating fifth processing time, the force detector SE2 detects a signal value "190" corresponding to the forces applied to the force detecting unit region R.

In FIG. 37(5) illustrating the fifth processing time, the number of the touch detecting unit regions U and the signal value corresponding to the electrostatic capacitance in each of the respective touch detecting unit regions U in the region R1 are the same as those in FIG. 37(1) illustrating the first processing time to FIG. 37(4) illustrating the fourth processing time. The number of the touch detecting unit regions U and the signal value corresponding to the electrostatic capacitance in each of the respective touch detecting unit regions U in the region R2 are the same as those in FIG. 37(1) illustrating the first processing time to FIG. 37(4) illustrating the fourth processing time.

In FIG. 37(5) illustrating the fifth processing time, the touch made is a multiple touch (Yes at Step S100), there is the region R2 where the contact area is equal to or smaller than the area threshold (Yes at Step S112), and the number of acquired references Q (="3") is equal to or larger than the number of references N (="3") (Yes at Step S122). Consequently, the force calculator 101 executes the force calculation subroutine using the reference values, at Step S124.

At Step S200, the force calculator 201 multiplies the reference value REF (="9.85") by the average value "7.19" of the signal values corresponding to the electrostatic capacitances in the region R1 to calculate the signal value corresponding to the force applied by the detection target object OBJ1 to press the input surface IS as "70.9".

At Step S202, the force calculator 101 subtracts the signal value "70.9" corresponding to the force applied by the detection target object OBJ1 to press the input surface IS from the signal value "190" corresponding to the forces detected by the force detector SE2 to calculate the signal value corresponding to the force applied by the detection target object OBJ2 to press the input surface IS as "119.1".

By comparing FIG. 37(4) with FIG. 37(5), the signal values corresponding to the electrostatic capacitances in the region R1 have not changed, but the signal value corresponding to the forces detected by the force detector SE2 has increased from "150" to "190". Accordingly, the amount of increase "40" in the signal value corresponding to the forces detected by the force detector SE2 can be considered to be the amount of increase in the signal value corresponding to the force applied by the detection target object OBJ2 to press the input surface IS.

As described above, in the present embodiment, the force calculator 101 calculates the signal value corresponding to the force applied by the detection target object OBJ2 to press the input surface IS as "119.1" in FIG. 37(5) illustrating the fifth processing time. Since the signal value corresponding to the force applied by the detection target object OBJ2 to press the input surface IS has been calculated as "79.1" in FIG. 37(4) illustrating the fourth processing time, the amount of increase in the signal value corresponding to the force applied by the detection target object OBJ2 to press the input surface IS is "40". That is, the force calculator 101 can calculate the amount of increase "40" in the signal value corresponding to the forces detected by the force detector SE2 as the amount of increase in the signal value corresponding to the force applied by the detection target object OBJ2 to press the input surface IS.

Assume that, in FIG. 37(6) illustrating sixth processing time, the force detector SE2 detects a signal value "165" corresponding to the forces applied to the force detecting unit region R.

In FIG. 37(6) illustrating the sixth processing time, the signal value corresponding to the electrostatic capacitance in each of the respective touch detecting unit regions U in the region R1 differs from those in FIG. 37(1) illustrating the first processing time to FIG. 37(4) illustrating the fourth processing time.

In FIG. 37(6) illustrating the sixth processing time, the number of the touch detecting unit regions U in the region R1 is "11". The region R1 includes one of the touch detecting unit regions U having a signal value "17" corresponding to the electrostatic capacitance therein, two of the touch detecting unit regions U each having a signal value "12" corresponding to the electrostatic capacitance therein, two of the touch detecting unit regions U each having a signal value "9" corresponding to the electrostatic capacitance therein, and six of the touch detecting unit regions U each having a signal value "7" corresponding to the electrostatic capacitance therein. The average value of the signal values corresponding to the electrostatic capacitances in the region R1 is "9.18".

The number of the touch detecting unit regions U and the signal value corresponding to the electrostatic capacitance in each of the respective touch detecting unit regions U in the region R2 are the same as those in FIG. 37(1) illustrating the first processing time to FIG. 37(5) illustrating the fifth processing time.

In FIG. 37(6) illustrating the sixth processing time, the touch made is a multiple touch (Yes at Step S100), there is the region R2 where the contact area is equal to or smaller than the area threshold (Yes at Step S112), and the number of acquired references Q (="3") is equal to or larger than the number of references N (="3") (Yes at Step S122). Consequently, the force calculator 101 executes the force calculation subroutine using the reference values, at Step S124.

At Step S200, the force calculator 101 multiplies the reference value REF (="9.85") by the average value "9.18" of the signal values corresponding to the electrostatic capacitances in the region R1 to calculate the signal value corresponding to the force applied by the detection target object OBJ1 to press the input surface IS "90.4".

At Step S202, the force calculator 101 subtracts the signal value "90.4" corresponding to the force applied by the detection target object OBJ1 to press the input surface IS from the signal value "165" corresponding to the forces detected by the force detector SE2 to calculate the signal value corresponding to the force applied by the detection target object OBJ2 to press the input surface IS as "74.6".

By comparing FIG. 37(5) with FIG. 37(6), the average value of the signal values corresponding to the electrostatic capacitances in the region R1 has increased from "7.19" to "9.18", and the signal value corresponding to the forces detected by the force detector SE2 has decreased from 190" to "165". Accordingly it can be considered that the signal value corresponding to the force applied by the detection target object OBJ1 to press the input surface IS has increased, and the signal value corresponding to the force applied by the detection target object OBJ2 to press the input surface IS has decreased.

As described above, in the present embodiment, the force calculator 101 calculates the signal value corresponding to the force applied by the detection target object OBJ1 to press the input surface IS as "90.4" in FIG. 37(6) illustrating the sixth processing time. The signal value corresponding to the force applied by the detection target object OBJ1 to press the input surface IS has been calculated as "70.9" in FIG. 37(5) illustrating the fifth processing time. That is, the force calculator 101 can calculate such that the signal value corresponding to the force applied by the detection target object OBJ1 to press the input surface IS increases.

As described above, in the present embodiment, the force calculator 101 calculates the signal value corresponding to the force applied by the detection target object OBJ2 to press the input surface IS as "74.6" in FIG. 37(6) illustrating the sixth processing time. The signal value corresponding to the force applied by the detection target object OBJ2 to press the input surface IS has been calculated as "119.1" in FIG. 37(5) illustrating the fifth processing time. That is, the force calculator 101 can calculate such that the signal value corresponding to the force applied by the detection target object OBJ2 to press the input surface IS increases.

In FIG. 37(6) illustrating the sixth processing time, assume that, based on the average value "9.85" of the signal values corresponding to the electrostatic capacitances in the region R1 and on the average value "6" of the signal values corresponding to the electrostatic capacitances in the region R2, the signal value "165" corresponding to the forces detected by the force detector SE2 is proportionally distributed between the regions R1 and R2. In that case, the signal value corresponding to the force applied by the detection target object OBJ1 to press the input surface IS is calculated as "102.5", and the signal value corresponding to the force applied by the detection target object OBJ2 to press the input surface IS is calculated as "62.5".

Various studies conducted by the inventors of the present invention have found that the signal value "102.5" corresponding to the force applied by the detection target object OBJ1 to press the input surface IS, which is calculated by proportional distribution, is larger than the actual value, and that the signal value "62.5" corresponding to the force applied by the detection target object OBJ2 to press the input surface IS, which is calculated by proportional distribution, is smaller than the actual value.

The studies have also found that the signal value "90.4" corresponding to the force applied by the detection target object. OBJ1 to press the input surface IS and the signal value "74.6" corresponding to the force applied by the detection target object OBJ2 to press the input surface IS, which are calculated by the display device with a touch detection function 1 according to the present embodiment, are closer to the actual values.

As described above, when the detection target objects OBJ1 and OBJ2 press the force detecting unit region, the display device with a touch detection function 1 can appropriately calculate the force applied by each of the detection target objects OBJ1 and OBJ2 to press the force detecting unit region.

While the preferred embodiment of the present invention has been described above, the present invention is not limited to the embodiment described above. The content disclosed in the embodiment is merely an example, and can be variously modified within the scope not departing from the gist of the present invention. Any modifications appropriately made within the scope not departing from; the gist of the present invention naturally belong to the technical scope of the present invention.

For example, if the touch detector SE1 uses the mutual capacitance method or the self-capacitance method, the reference value REF may be a signal value corresponding to the force per electrostatic capacitance in the region R1 or the region R2, and the force calculator 101 may multiply the reference value REF by the total of the electrostatic capacitances in one of the regions having a contact area larger than the area threshold to calculate the signal value corresponding to one of the defection target objects having a contact area larger than the area threshold, at Step S200.

In the above-described embodiment, the reference value acquiring unit 103 calculates the reference value PEP only when the detection target object is the first type object, but the present disclosure is not limited thereto. The reference value acquiring unit 103 may calculate the reference value REF when the detection target object is the second type object in addition to the case of the first type object. In this case, the reference value storage unit 105 may store the reference value REF in accordance with a type of the detection target object. That is, the reference value REF may include a sub-reference value when the detection target object is the first type object, and another sub-reference value when detection target object is the second type object. The force calculator 101 may calculate the third signal based on at least one sub-reference value of the sub-reference values in accordance with a type of the detection target object determined by the detection target object type determinator 102, and the first signal values, and at least one second signal value.

What is claimed is:

1. A touch detection device comprising:
    a first detector configured to detect a first contact area of a plurality of detection target objects with a plurality of first areas that, overlap an input surface in a direction perpendicular to the input surface, the first detector outputting a plurality of first signal values that correspond to the contact of each of the detection target objects with a corresponding first area including a plurality of first detection regions;
    a second detector configured to detect a second contact area in at least one of a plurality of second detection regions, the second detector outputting a second signal value caused by pressing respective second detection regions of the second detection regions, each including the first detection regions; and
    a controller configured to calculate an object signal value corresponding to each of the detection target objects, based on:
        the first signal values;
        the second signal value; and
        a reference value corresponding to the second signal value per the first signal values detected from the first, detection regions,
    wherein
    each of the first detection regions is a unit region to allow the first detector to output first signal values,
    each of the second detection regions is a unit region to allow the second detector to output a second signal value, and
    each of the first detection regions is smaller than each of the second detection regions.

2. The touch detection device according to claim 1,
    the reference value is stored according to a type of each of the detection target objects, and
    the controller comprises:
        a detection target object type determinator configured to determine the type of each of the detection target objects based on the first, signal values detected from the first detection regions; and
        a force calculator configured to calculate the object signal value, based on:
            the reference value corresponding to the type of each of the detection target objects determined by the detection target object type determinator;
            the first signal values; and
            the second signal value.

3. The touch detection device according to claim 2, further comprising a plurality of first electrodes,
    wherein the first electrodes are each configured to:
        serve as one of the first electrodes to allow the first detector to output the first signal values, and
        serve as one of the first electrodes to allow the second detector to output the second signal value.

4. The touch detection device according to claim 3, wherein the first detector outputs the first signal values based on changes in self-capacitance of the first electrodes.

5. The touch detection device according to claim 3, wherein
    the first detector further comprises a plurality of second electrodes, and
    the first detector outputs the first signal values based on changes in capacitance between the first electrodes and the second electrodes.

* * * * *